US012381731B2

(12) United States Patent
Lupowitz et al.

(10) Patent No.: US 12,381,731 B2
(45) Date of Patent: *Aug. 5, 2025

(54) METHOD, CONTROLLER, AND COMPUTER-READABLE MEDIUM OF A DISTRIBUTED LEDGER NETWORK FOR INITIATING A NET TRANSMISSION AMONG A PLURALITY OF CLIENTS OF THE DISTRIBUTED LEDGER NETWORK

(71) Applicant: Tassat Group Inc., New York, NY (US)

(72) Inventors: Kevin Lupowitz, New York, NY (US);
Eric Couillard, New York, NY (US);
Glendy Kam, New York, NY (US);
Andre Frank, Irvington, NY (US);
Sanjaya Kulkarni, Edison, NJ (US);
Joe Grastara, Toms River, NJ (US)

(73) Assignee: Tassat Group Inc., New York, NY (US)

( * ) Notice: Subject to any disclaimer, the term of this patent is extended or adjusted under 35 U.S.C. 154(b) by 80 days.

This patent is subject to a terminal disclaimer.

(21) Appl. No.: 18/325,505

(22) Filed: May 30, 2023

(65) Prior Publication Data
US 2024/0235837 A1    Jul. 11, 2024

Related U.S. Application Data

(63) Continuation-in-part of application No. 17/722,171, filed on Apr. 15, 2022, now abandoned.
(Continued)

(51) Int. Cl.
*G06F 21/00* (2013.01)
*H04L 9/32* (2006.01)
*H04L 67/1097* (2022.01)

(52) U.S. Cl.
CPC ........ *H04L 9/3213* (2013.01); *H04L 67/1097* (2013.01)

(58) Field of Classification Search
CPC ............ H04L 67/1097; H04L 2209/56; H04L 9/3297; H04L 9/50
See application file for complete search history.

(56) References Cited

U.S. PATENT DOCUMENTS 11,271,908 B2 * 3/2022 Soundararajan ...... H04L 9/0643
11,477,005 B1 * 10/2022 Lupowitz .............. H04L 9/3213
(Continued)

OTHER PUBLICATIONS

International Search Report and Written Opinion cited in PCT/US23/61904 dated Jun. 23, 2023; 13 Pages.

*Primary Examiner* — Kendall Dolly
(74) *Attorney, Agent, or Firm* — GREENBERG TRAURIG, LLP

(57) ABSTRACT

A controller, method, and computer-readable medium for initiating a net transmission among clients of a distributed ledger network including receiving instructions to perform transmissions, writing one or more transmissions in the transmissions to one or more new blocks on a transmission blockchain of the distributed ledger network, storing a net entity asset differential between each entity of the distributed ledger network and the distributed ledger network, storing a current block height corresponding to a quantity of new blocks added to the transmission blockchain since a previous net transmission process, storing a duration value corresponding to a time elapsed since the previous net transmission process, determining a required transmission quantity indicating a quantity of transmissions necessary to complete a net transmission process, determining predicted required transmission quantities corresponding time intervals, and initiating a net transmission process based on detection of one or more conditions.

24 Claims, 31 Drawing Sheets

Related U.S. Application Data

(60) Provisional application No. 63/306,378, filed on Feb. 3, 2022.

(56) References Cited

U.S. PATENT DOCUMENTS

| | | | | |
|---|---|---|---|---|
| 2014/0229737 | A1* | 8/2014 | Roth | H04L 9/0618 |
| | | | | 713/176 |
| 2019/0068365 | A1* | 2/2019 | Wright | H04L 9/0838 |
| 2019/0349203 | A1* | 11/2019 | Scherrer | H04L 9/3239 |
| 2020/0034839 | A1* | 1/2020 | Soundararajan | G06Q 20/4014 |
| 2020/0160319 | A1* | 5/2020 | Smith | G06Q 20/36 |
| 2020/0167769 | A1* | 5/2020 | Green | G06Q 20/3825 |
| 2020/0302429 | A1* | 9/2020 | Anton | H04L 9/3255 |
| 2020/0396065 | A1* | 12/2020 | Gutierrez-Sheris | |
| | | | | H04L 9/3297 |
| 2021/0021597 | A1* | 1/2021 | Salman | H04L 63/0823 |
| 2021/0342826 | A1* | 11/2021 | Miller | G06Q 20/389 |
| 2022/0075892 | A1* | 3/2022 | Jayaram | G06Q 20/3829 |
| 2022/0130005 | A1* | 4/2022 | Xu | G06Q 30/00 |
| 2022/0261882 | A1* | 8/2022 | Youb | G06Q 50/16 |
| 2022/0311613 | A1* | 9/2022 | Barakat | G06F 16/9024 |
| 2023/0246852 | A1* | 8/2023 | Lupowitz | H04L 9/50 |
| | | | | 713/162 |
| 2024/0111788 | A1* | 4/2024 | Shah | G06F 16/217 |
| 2024/0153022 | A1* | 5/2024 | Fields | G06Q 50/18 |

\* cited by examiner

NETWORK

| Bank 1 | | |
|---|---|---|
| SSA | RSA | Net |
| 100.00 | | |
| | 1000.00 | |
| | | |
| | | |
| 100.00 | 1000.00 | (900.00) |

| Bank 2 | | |
|---|---|---|
| SSA | RSA | Net |
| 500.00 | | |
| | 600.00 | |
| 1000.00 | | |
| | | |
| 1500.00 | 600.00 | 900.00 |

| Bank 3 | | |
|---|---|---|
| SSA | RSA | Net |
| | 100.00 | |
| | 500.00 | |
| 1000.00 | | |
| 600.00 | 1000.00 | |
| | 2000.00 | |
| 1600.00 | 3600.00 | (2000.00) |

| Bank 4 | | |
|---|---|---|
| SSA | RSA | Net |
| 600.00 | | |
| | | |
| 600.00 | 0.00 | 600.00 |

| Bank 5 | | |
|---|---|---|
| SSA | RSA | Net |
| | 600.00 | |
| 2000.00 | | |
| 2000.00 | 600.00 | 1400.00 |

| Bank Name |
|---|
| Accounts/Wallets |
| Send 100 From Bank 1 to Bank 3 |
| Send 500 From Bank 2 to Bank 3 |
| Send 600 from Bank 4 to Bank 2 |
| Send 1000 from Bank 3 to Bank 1 |
| Send 600 from Bank 3 to Bank 5 |
| Send 100 from Bank 2 to Bank 3 |
| Send 2000 from Bank 5 to Bank 3 |

METHOD, CONTROLLER, AND COMPUTER-READABLE MEDIUM OF A DISTRIBUTED LEDGER NETWORK FOR INITIATING A NET TRANSMISSION AMONG A PLURALITY OF CLIENTS OF THE DISTRIBUTED LEDGER NETWORK

CLAIM TO PRIORITY

This application is a continuation-in-part of U.S. Nonprovisional application Ser. No. 17/722,171, filed Apr. 15, 2022, which claims priority to U.S. Provisional Application No. 63/306,378, filed on Feb. 3, 2022, the disclosures of which are hereby incorporated by reference in their entirety.

FIELD OF TECHNOLOGY

The present disclosure generally relates to computer-based platforms and/or systems for asynchronous and parallel network operations, including parallel initiation and execution of a blockchain operation in parallel with a corresponding network operation where the network operation is performed asynchronously with the blockchain operation for batch processing.

SUMMARY OF THE DISCLOSURE

In some aspects, the present disclosure relates to a method executed by one or more computing devices of a controller of a distributed ledger network for initiating a net transmission among a plurality of clients of the distributed ledger network, the method including: receiving, by the controller, a plurality of instructions to perform a plurality of transmissions, each transmission comprising instruction parameters for movement of a first quantity of first entity-specific tokens corresponding to a first entity that is a client of the distributed ledger network to a second quantity of second entity-specific tokens corresponding to a second entity that is a client of the distributed ledger network, wherein the first entity-specific tokens are stored on a first entity-specific blockchain and the second entity-specific tokens are stored on a second entity-specific blockchain; writing, by the controller, one or more transmissions in the plurality of transmissions to one or more new blocks on a transmission blockchain of the distributed ledger network, each new block storing a subset of the plurality of transmissions; storing, by the controller, a net entity asset differential between each entity in the plurality of entities that are clients of the distributed ledger network and the distributed ledger network, each net entity asset differential being determined based at least in part on quantities of tokens transferred between a corresponding entity and the plurality of entities during the one or more transmissions; storing, by the controller, a current block height corresponding to a quantity of new blocks added to the transmission blockchain since a previous net transmission process; storing, by the controller, a duration value corresponding to a time elapsed since the previous net transmission process; determining, by the controller, a required transmission quantity indicating a quantity of transmissions necessary to complete a net transmission process between the plurality of entities that are clients of the distributed ledger network; determining, by the controller, one or more predicted required transmission quantities corresponding to one or more time intervals, each predicted required transmission quantity indicating a predicted quantity of transmissions necessary to complete a net transmission process between the plurality of entities that are clients of the distributed ledger network after a corresponding time interval; and initiating, by the controller, a net transmission process between a plurality of entities that are clients of the distributed ledger network based at least in part on detection of one or more conditions in a plurality of conditions, the plurality of conditions comprising: the duration value exceeding a threshold duration value; the current block height meeting or exceeding a threshold block height; the net entity asset differential exceeding a threshold entity asset differential; and the required transmission quantity matching or exceeding the one or more predicted required transmission quantities.

The step of initiating a net transmission process between a plurality of entities that are clients of the distributed ledger network based at least in part on detection of one or more conditions in a plurality of conditions can include initiating the net transmission process between the plurality of entities that are clients of the distributed ledger network based at least in part on a determination that at least one net entity asset differential exceeds the threshold entity asset differential.

The step of determining one or more predicted transfer quotients corresponding to one or more time intervals can include determining a plurality of predicted required transmission quantities corresponding to a plurality of time intervals.

The step of initiating a net transmission process between a plurality of entities that are clients of the distributed ledger network based at least in part on detection of one or more conditions in a plurality of conditions can include: determining whether that the plurality of predicted required transmission quantities are less than the required transmission quantity; and initiating the net transmission process between the plurality of entities that are clients of the distributed ledger network based at least in part on a determination that the plurality of predicted required transmission quantities are not less than the required transmission quantity.

The step of initiating a net transmission process between a plurality of entities that are clients of the distributed ledger network based at least in part on detection of one or more conditions in a plurality of conditions can include: determining whether that the plurality of predicted required transmission quantities are less than the required transmission quantity; initiating a delay of the net transmission process for a variable time period based at least in part on a determination that at least one predicted required transmission quantity in the plurality of predicted required transmission quantities is less than the required transmission quantity; and initiating the net transmission process between the plurality of entities that are clients of the distributed ledger network after the delay.

The method can further include the step of storing, by the controller, at least one net entity-pair asset differential between at least one pair of entities in a plurality of entities that are clients of the distributed ledger network, the at least one net entity-pair asset differential being determined based at least in part on quantities of tokens transferred between at least two or more entities in the plurality of entities during the one or more transmissions; wherein the plurality of conditions further comprise the at least one net entity-pair asset differential exceeding a threshold entity-pair asset differential.

The step of storing at least one net entity-pair asset differential between at least one pair of entities in a plurality of entities that are clients of the distributed ledger network can include storing a plurality of net entity-pair asset differentials between all pairs of entities in the plurality of entities that are clients of the distributed ledger network.

The step of initiating a net transmission process between a plurality of entities that are clients of the distributed ledger network based at least in part on detection of one or more conditions in a plurality of conditions can include initiating the net transmission process between the plurality of entities that are clients of the distributed ledger network based at least in part on a determination that at least one net entity-pair asset differential in the plurality of net entity-pair asset differentials exceeds a threshold entity-pair asset differential.

In some aspects, the present disclosure relates to a controller of a distributed ledger network for initiating a net transmission among a plurality of clients of the distributed ledger network. The controller includes one or more processors; and one or more memories operatively coupled to at least one of the one or more processors and having instructions stored thereon that, when executed by at least one of the one or more processors, cause at least one of the one or more processors to perform any of the methods described above.

In some aspects, the present disclosure relates to at least one non-transitory computer-readable medium storing computer-readable instructions for initiating a net transmission among a plurality of clients of a distributed ledger network that, when executed by one or more computing devices of a controller of the distributed ledger network, cause the controller to perform any of the methods described above.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 8 illustrates an example of the net entity asset differential determination process according to an exemplary embodiment.

DETAILED DESCRIPTION

Figure 1:
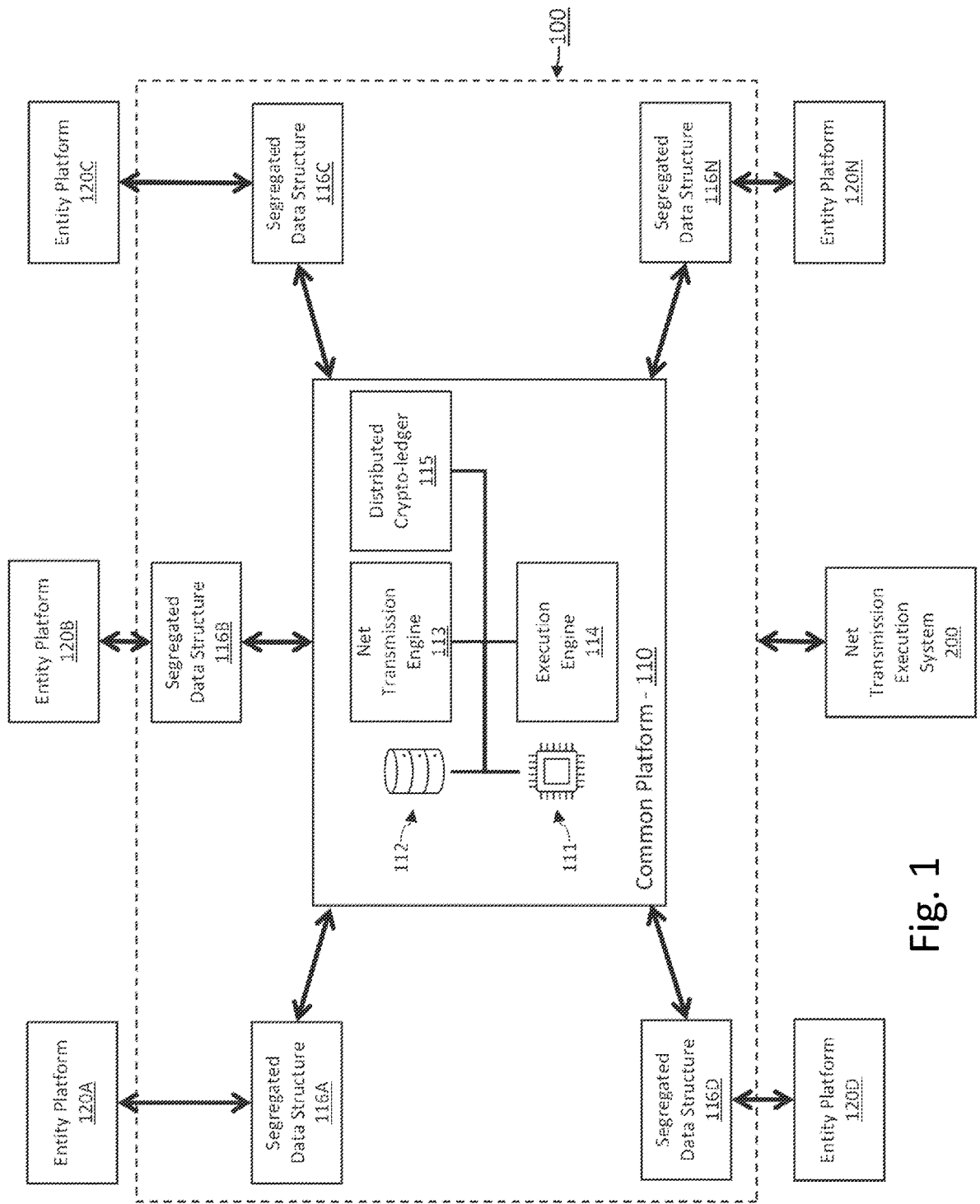
FIG. 1 is a block diagram of a network of platforms associated with distributed segregated data structures for network-wide net transmissions of assets to satisfy aggregates of tokenized asset transfers between each platform in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 10 illustrate systems and methods of tokenized item operations using parallel networks of a blockchain network and a computer network. The following embodiments provide technical solutions and technical improvements that overcome technical problems, drawbacks and/or deficiencies in the technical fields involving item operation efficiency over a computer network when paired with a corresponding blockchain operation with a tokenized item. As explained in more detail, below, technical solutions and technical improvements herein include aspects of improved reconciliation between each blockchain of a multitude of blockchain operations with each item operation over a parallel network of a multitude of item operations such that the item operations are performed using intelligent batching to improve the efficiency of the network operations while ensuring reconciliation with blockchain operations of corresponding tokenized items. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of a network of platforms associated with distributed segregated data structures for network-wide net transmissions of assets to satisfy aggregates of tokenized asset transfers between each platform in accordance with one or more embodiments of the present disclosure.

In some embodiments, a distributed asset network 100 includes a common platform 110 in communication with a network of segregated data structures including segregated data structure 116A, segregated data structure 116B, segregated data structure 116C, segregated data structure 116D through segregated data structure 116N (hereinafter, collectively referred to as "segregated data structures 116A through 116N"). In some embodiments, the segregated data structures 116A through 116N may be nodes in the distributed asset network 100 associated with the common platform.

In some embodiments, the common platform 110 may include hardware components such as a processor 111, which may include local or remote processing components. In some embodiments, the processor 111 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 111 may include data-processing capacity provided by the microprocessor. In some embodiments, the microprocessor may include memory, processing, interface resources, controllers, and counters. In some embodiments, the microprocessor may also include one or more programs stored in memory.

Similarly, the common platform 110 may include a datastore 112, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the datastore 112 may include, e.g., a suitable non-transient computer readable medium such as, e.g., random access memory (RAM), read only memory (ROM), one or more buffers and/or caches, among other memory devices or any combination thereof.

In some embodiments, the common platform 110 may implement computer engines for initiating a net transmission to satisfy one or more batches of tokenized asset transfer operations using a net transmission engine 113, executing each individual tokenized asset transfer operation using an execution engine 114, and administer a distributed cryptoledger 115 to record and execute each individual tokenized asset transfer of each individual tokenized asset transfer operation. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, entity platform 120A, entity platform 120B, entity platform 120C, entity platform 120D through entity platform 120N (hereinafter, collectively referred to as "entity platforms 120A through 120N") may include a respective segregated data structure 116A through 116N of the distributed asset network 100. In some embodiments, the segregated data structures 116A through 116N provide a schema for storing assets on behalf of a remote platform and/or system and/or entity. Each segregated data structure 116A through 116N may also be a node of the distributed asset network 100 in communication with the common platform 110. Thus, the segregated data structures 116A through 116N provide a distributed network of nodes for moving both assets and tokenized assets across the distributed asset network 100.

In some scenarios, local or internal asset movements are more efficient than asset movements to and/or from an external entity, system and/or platform. For example, transferring funds between accounts of a single banking system is faster and more efficient than transferring funds between an account of one banking system to an account of another banking system. Similarly, transferring data files between accounts and/or storage locations of a single database system uses fewer computational and network resources than transferring the same data files to and/or from an external or remote account/storage location.

Therefore, pairing each entity platform 120A through 120N with a respective segregated data structure 116A through 116N enables a data structure dedicated to external/remote transfers to be implemented locally to each entity platform 120A through 120N. By configuring the segregated data structure 116A through 116N to be a part of the distributed asset network 100, each entity platform 120A through 120N may initiate transfers to external or remote platforms by transferring assets to the distribute asset network 100 via the segregated data structure 116A through 116N. In some embodiments, in parallel, each entity platform 120A through 120N may access the common platform 110 via the segregated data structures 116A through 116N to transfer tokenized assets associated with each asset being transferred.

In some embodiments, platforms may be linked for communication across multiple networks. In some embodiments, the common platform 110 provides a parallel network for interoperability between entity platforms 120A through 120C. The common platform 110 may include an interoperability layer than can interface with each entity platforms 120A through 120C of member entities, e.g., a first entity platforms 120A through 120C of a first member entity, a second entity platforms 120A through 120C of a second member entity, among other entity platforms 120A through 120C of additional member entities. Communications over a traditional network between the entity platforms 120A through 120C may be slow, costly, resource intensive, or otherwise deficient for continuous and/or real-time interactions between users on different entity platforms 120A through 120C. For example, if a first user intends to perform an operation with a second user, and the first user in the first entity platforms 120A through 120C while the second user is on the second-entity specific platform, the operation may face technical hurdles such as slow communication between the entity platforms 120A through 120C, incompatibilities between data on the first entity platforms 120A through 120C and on the second entity platforms 120A through 120C, third-party operations for facilitating, regulating and performing fraud/security checks on the operation, among other hurdles. Such technical hurdles make performing the operation inefficient and unreliable and with lag between initiating the operation and completion of the operation.

Accordingly, in some embodiments, the first entity platforms 120A through 120C and the second entity platforms 120A through 120C may interface with the common platform 110 to perform parallel real-time operations over a distributed crypto-ledger 115. The distributed crypto-ledger 115 may employ encrypted storage for each entity to effectuate token-based operations between the entities via the use of crypto-tokens that represent the data of the operation between the users.

In some embodiments, the exemplary distributed crypto-ledger 115 may be configured interact and/or to store data in one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible.

In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices may be configured to affect transactions involving Bitcoins and other cryptocurrencies into one another and also into (or between) so-called FIAT money or FIAT currency and vice versa.

In some embodiments, the exemplary distributed blockchain-type ledger implementations of the present disclosure with associated devices are configured to utilize self-executing programming objects, e.g., smart contracts, that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

In some embodiments, the operation may include a transfer of data, such as, e.g., an internet message communication, an SMS/MMS/RCS message, a file transfer, an electronic financial transfer (e.g., a money wire via, e.g., ACH or FedWire, etc.), among other transfers. Accordingly, the entity platforms 120A through 120C may use the common platform 110 to perform parallel transfers of tokenizations of the data for secure, immutable, and real-time transfer between the entity platforms 120A through 120N.

In some embodiments, the common platform 110 allows users of a member entity to send confirmed real-time data to users of other member entities. The common platform 110 may convey the data via a tokens or tokenized data representing the data between the member entities. For example, for payment operations, the common platform 110 may use tokens representing currency, such as, e.g., any suitable crypto-tokens, including bitcoin, Ether, Dogecoin, a stablecoin, or other suitable crypto-token or any suitable combination thereof.

Upon transferring the tokens and/or tokenized data between the member entities, the transfer of the original data may be reconciled with the transfer of the tokens and/or tokenized data to verify the completion and integrity of the operation.

In some embodiments, where the operation is a financial monetary transfer, the transfer of the original data may include a physical and/or digital transfer of the currency. Reconciliation of the transfer of the tokens and/or tokenized data and the transfer of the currency may take the form of settlement, e.g., via FedWire. FedWire may be a slow, computationally expensive, and financially expensive such that each operation cannot be feasibly performed in real-time. Thus, common platform 110 provides the real-time transfer which may then be settled after the fact with the transfer of the currency. Accordingly, the transfer of the currency may be performed at any suitable time after the real-time transfer of tokens representing the currency. As a result, currency transfers may be batched based on aggregated amounts between entities to consolidate many transfers into one operation over the network between the entity platforms 120A through 120C.

In some embodiments, the common platform 110 may convey payment instructions between member entities for currency settlement (e.g., US Dollar settlement, or other currency or combination of currencies) between member entities may be performed over FedWire or other suitable wiring service. In some embodiments, the distributed crypto-ledger 115 the common platform 110 utilizes a private permissioned blockchain. In some embodiments, the common platform 110 may issue payment instructions and may utilize tokens that include or do not include stablecoins. In some embodiments, the common platform 110 permits permissioned self-executing programming objects, such as, e.g., smart contracts, and documentation to be attached to the instructions. In some embodiments, the common platform 110 architecture allows third parties to develop permissioned applications (e.g., for vertical markets, healthcare, receivables, mortgages, trade) that benefit from utilizing the common platform 110 infrastructure.

In some embodiments, access to the common platform 110 is limited to regulated member entities. Thus, in some embodiments, every member entity on the common platform 110 is approved by an administrator or group of administrators (such as a Board of Directors) of the common platform 110 and is subject to the governance requirements set by the common platform 110. In some embodiments, every member entity may be required to meet all requirements set by the common platform 110, e.g., regulatory compliance, solvency, transparency, KYC, etc. Additionally, in some embodiments, the common platform 110 will be able to provide Regulators with access to all necessary data for transparency, compliance and regulatory purpose as requested and agreed by the common platform 110 and regulators.

In some embodiments, the regulators may be provided with transparency into the common platform 110 operations as well as operations between the entity platforms 120A through 120C. Thus, regulators are provided with total transparency on all transactions as well as the tokens in the common platform 110 systems, and the assets (e.g., funds) held in the digital inter-entity common platform 110 segregated accounts ("segregated accounts") across member entities and associated entity platforms 120A through 120N of the common platform 110. Accordingly, permissions on the common platform 110 may include requirements of member entities regarding the regulators, such as being in good standing with applicable regulators, submitting to oversight of the requirements for all member entities, including KYC/AML policies, procedures and protocols, ensuring minimum KYC requirements are provided through parameters defined by the administrators of the common platform 110 and the regulators, among other requirements or any combination thereof.

In some embodiments, a user may trigger a transfer instruction, such as a payment instruction, message instruction, data transfer instruction, etc. The transfer instruction may be originated through a member entity's core system (e.g., FIS, Fiserv), or through an approved and permissioned platform, including an approved and permissioned payments platform or other platform for performing transfers. In some embodiments, the member entity's platform communicates instructions to the common platform 110 to effectuate the transfer via a token transfer on the distributed crypto-ledger 115. Such an arrangement may enable the member entities to have total transparency into the tokens and the dollars held in segregated accounts across the common platform 110. The transfer may then be settled via batch transfers in parallel, for example using FedWire or other suitable service.

In some embodiments, at regular intervals, there is an automated net settlement between the segregated accounts at member entities. In some embodiments, the common platform 110 may use predictive analytics based on machine learning/AI that include information such as risk tolerance of each member first member entity and transaction history for intraday settlement instruction. In addition, the system may trigger close of day "true-up" settlement instructions that also optimize for parallel network blackouts, so there is no disruption of the common platform 110 service during afterhours/weekends/etc. In some embodiments, in the context of financial transfer, real-time reconciliation of summed segregated accounts to blockchain balance may prove constant 1:1 US Dollar backing.

In some embodiments, every token minted on the distributed crypto-ledger 115 is backed by a corresponding asset unit (e.g., US dollars, corresponding files and/or messages, etc.) in a segregated account at the originating member entity. In some embodiments, receiving member entities (and regulators) have assurance through real-time reporting that every Transfer Token is backed 100% by the asset on deposit in a segregated account at the originating member entity.

In some embodiments, when deposits are made into the segregated account, Transfer Tokens are minted (upon instruction by the system) on the distributed crypto-ledger 115 and the corresponding the asset backing the Transfer Tokens are blocked in the segregated account. Upon receipt of the asset at the receiving entity (e.g., through FedWire for financial transfers) the common platform 110's system may burn (extinguishment) the equivalent number of Transfer Token in the receiving member entity's wallet.

In some embodiments, the distributed crypto-ledger 115 of the common platform 110 may employ distributed crypto-ledger 115-specific crypto-tokens (e.g., "Transfer Tokens") that represent payment instructions. In some embodiments, one transfer token may represent one data item being transferred. For example, 1 transfer token may be equivalent to 1 US dollar. However, other equivalencies may be employed, such as, e.g., 100 transfer tokens may be equivalent to 1 US dollar, or other suitable equivalency. In some embodiments, the transfer tokens only exist at participant member entities within the distributed crypto-ledger 115. Thus, the member entities are not permissioned to self-custody the transfer tokens. Rather, the common platform 110 allows for backing funds in legal tender.

Therefore, in some embodiments, the common platform 110 may use the execution engine 114 to transfer tokenized assets between entity platforms 120A through 120N across the distributed asset network 100 of the segregated data structures 116A through 116N. Thus, tokenized assets may be transferred in real-time across the distributed asset network 100 using distributed storage and operations, e.g., using the distributed crypto-ledger 115.

In some embodiments, a sending entity platform may use a respective sending segregated data structure to instruct an asset to be transferred to a receiving entity platform. The common platform 110 may use the execution engine 114 to access and/or create a tokenized asset associated with the asset to be transferred and execute a transfer of the tokenized asset to a receiving segregated data structure of the receiving entity platform. For example, the execution engine 114 may write, in real-time in response to the instruction to transfer the asset, a cryptographic immutable entry to the distributed crypto-ledger 115, thus reassigning the tokenized asset to the receiving segregated data structure.

In some embodiments, the common platform 110 may implement the execution engine 114 and the distributed crypto-ledger 115 to enable real-time execution of each transfer instructed by each segregated data structure 116A through 116N on the distributed asset network 100. Thus, secure transfer of the tokenized assets can be efficiently performed.

In some embodiments, the associated assets of the tokenized assets transferred across the distributed asset network 100 may be transferred separately. In some embodiments, a separate net transmission execution system 200 may be employed to transfer assets between entity platforms 120A through 120N. Because the transfer of assets is less efficient and slower than the transfer of tokenized assets using the common platform 110, the transfer of assets can be performed in batches, e.g., at periodic, predetermined and/or dynamically determined intervals of time to satisfy the transfer of tokenized assets representing each asset. In some embodiments, the net transmission engine 113 of the common platform 110 may interface with the segregated data structures 116A through 116N and a net transmission execution system 200.

In some embodiments, the net transmission engine 113 may aggregate the transfers of tokenized assets between each entity platform 120A through 120N for a given interval of time and trigger a net transmission to satisfy the transfers with one or more transfers of associated assets or equivalents of the associated assets. For example, in transfers of monetary funds, the tokenized assets may include cryptographic tokens ("crypto-tokens" or "tokens") which are transferred across the distributed asset network 100 in real-time via the distributed crypto-ledger 115. The value of monetary funds may be performed in bulk settlement operations with the net transmission execution system 200 including a monetary settlement system such as, e.g., FedWire or other suitable system.

In some embodiments, the net transmission engine 113 may determine a net quantity, value, amount, magnitude, or other attribute of the transfers of tokenized assets between any two entity platforms 120A through 120N to determine the aggregate assets to transfer between the two entity platforms 120A through 120N. The segregated data structures 116A through 116N of the entity platforms 120A through 120N may communicate with the net transmission execution system 200 according to instructions by the net transmission engine 113 to execute a net transmission the moves the aggregate assets between the two entity platforms 120A through 120N.

In some embodiments, the net transmission engine 113 may determine a time to initiate the net transmissions. For example, the net transmission engine 113 may initiate the net transmissions on a scheduled period of time (e.g., every minute, every five minutes, every ten minute, every 15 minutes, every 20 minutes, every 25 minutes, every 30 minutes, every 45 minutes, every hour, every two hours, every three hours, every four hours, every five hours, every six hours, every seven hours, every eight hours, every nine hours, every ten hours, every 11 hours, every 12 hours, once per day, once per week, once per two weeks, once per month, once per two months, once per three months, once per four months, once per six months, oncer per year, etc.). In some embodiments, the scheduled period of time may be adjusted and/or configured based on a volume of transfers being conducted over the distributed asset network 100 or by any other suitable metric to balance minimizing a number of net transmissions and minimizing a quantity of unsatisfied tokenized asset transfers, where an unsatisfied tokenized asset transfer refers to a transfer of a tokenized asset(s) without a transmission of the associated asset and/or asset amount/quantity/value/etc.

In some embodiments, the net transmission engine 113 may initiate the net transmissions may dynamically and/or algorithmically determine to initiate a net transmission based on the balance minimizing a number of net transmissions and minimizing a quantity of unsatisfied tokenized asset transfers. For example, where a quantity of unsatisfied tokenized asset transfers to or from a particular entity platform 120A through 120N exceeds a predetermined value, the net transmission engine 113 may initiate the net transmissions, or where a ratio of: unsatisfied tokenized asset transfers from a first particular entity platform to second particular entity platform; and, unsatisfied tokenized asset transfers from the second particular entity platform to the first particular entity platform, exceeds a predetermined value, the net transmission engine 113 may initiate the net transmissions.

Thus, in some embodiments, the distributed network of segregated data structures 116A through 116N enables operations to move tokenized assets and assets separately for asynchronous transfers.

Figure 2:
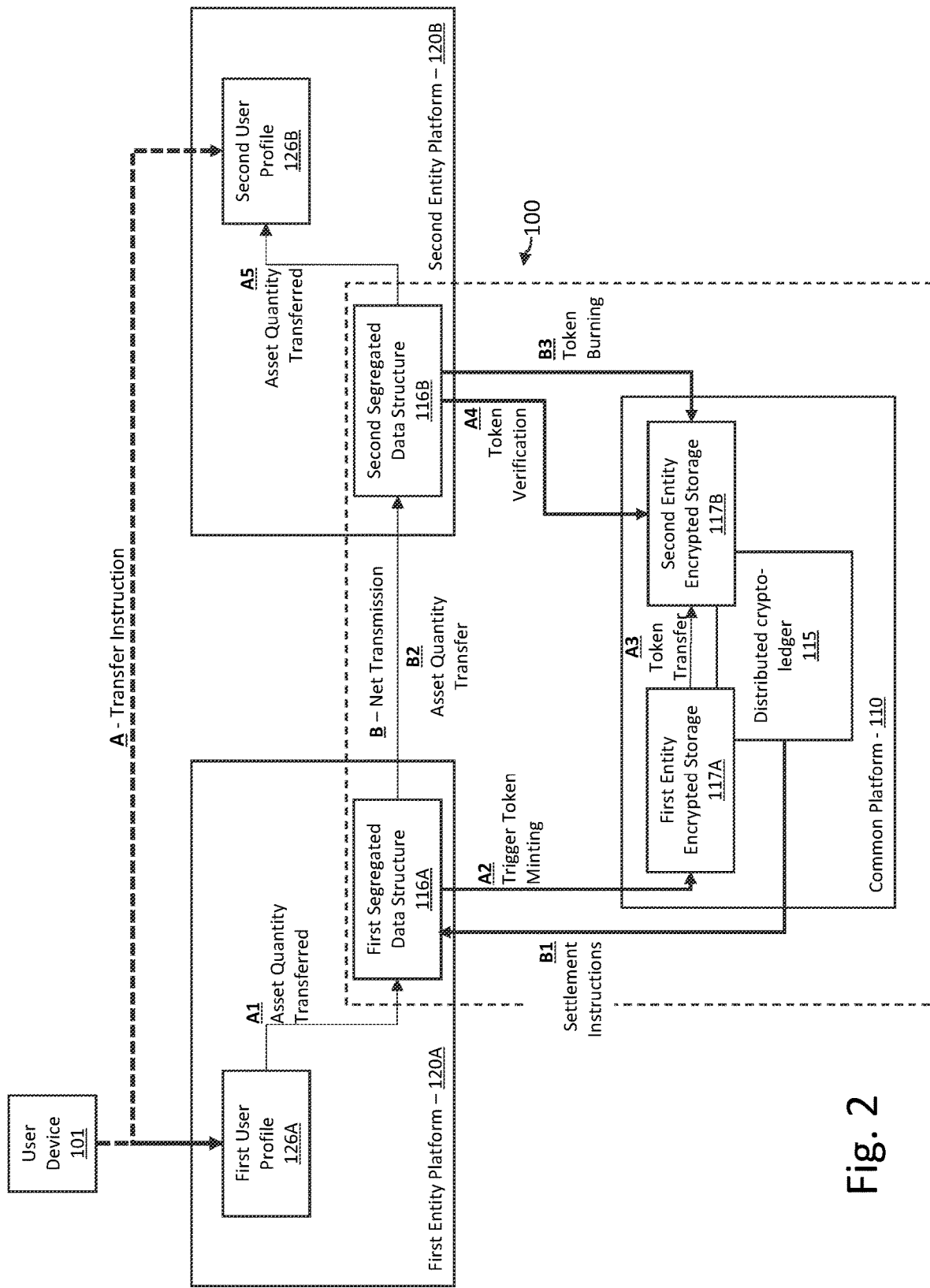
FIG. 2 depicts a diagram of the distributed asset network 100 for implementing net transmissions to satisfy a batch of individual tokenized asset transfers between a first entity platform 120A and a second entity platform 120B in accordance with one or more aspects of embodiments of the present disclosure.

FIG. 2 depicts a diagram of the distributed asset network 100 for implementing net transmissions to satisfy a batch of individual tokenized asset transfers between a first entity platform 120A and a second entity platform 120B in accordance with one or more aspects of embodiments of the present disclosure.

In some embodiments, the distributed asset network 100 may be employed for a transfer of a tokenized asset and later net transmission to satisfy a batch of transfers. The transfer may include a first entity platform 120A and a second entity platform 120B. The first entity platform 120A may include a first user profile 126A and a first segregated data structure 116A. Similarly, the second entity platform 120B may include a second user profile 126B and a second segregated data structure 116B.

In some embodiments, the first segregated data structure and the second segregated data structure may each include a database schema configured for storing and/or recording assets and asset quantities segregated from the entity of the associated entity platform 120A through 120N and destined for a recipient in an asset transfer or transmission. are segregated bank accounts on a network of segregated bank accounts. The database schema may include a customized, e.g., navigational database, hierarchical database, network database, graph database, object database, relational database, object-relational database, entity-relationship database, enhanced entity-relationship database, document database, entity-attribute-value database, star schema database, or any other suitable database schema customized and configured for storing and/or recording assets and asset quantities segregated from the entity of the associated entity platform 120A through 120N and combinations thereof. For example, the database may include database technology such as, e.g., a centralized or distributed database, cloud storage platform, decentralized system, server, or server system, among other storage systems.

In some embodiments, the first user may desire to send a quantity of the asset to a second user. Accordingly, the first user may initiate a transfer instruction at process A to initiate the transfer of the quantity of the asset by selecting and/or inputting, via a user interface of a user device 101, user defined parameters defining a movement of the asset from the first user profile 126A of the first user to a second user profile 126B of the second user, a quantity of the asset to be moved, among other user defined parameters or any combination thereof.

In some embodiments, the user device 101 may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, in response to the user input and/or selection, the user device 101 may communicate the user defined parameters, e.g., using key-value pairs, structured table or list or vector or array, or any combination thereof, to the first entity platform 120A, to the common platform 110, to a separate application layer and/or application server, or to any other suitable computing system.

In some embodiments, the computing system may receive the user defined parameters and generate a transfer instruction having instruction parameters derived from the user-defined parameters. In some embodiments, the instruction parameters may include a sender network address and recipient network address associated with the first entity platform 120A and the second entity platform 120B, respectively, on the distributed asset network 100. In some embodiments, the sender and recipient addresses may be for the first entity platform 120A and second entity platform 120B, respectively, and/or for the first segregated data structure 116A and the second segregated data structure 116B. In some embodiments, the first user profile 126A and the second user profile 126B may have addresses on the distributed asset network 100 or on another network linked to the distributed asset network 100, or any combination thereof. Accordingly, the sender and recipient addresses may include the addresses of the first user profile 126A and the second user profile 126B.

In some embodiments, the distributed asset network 100 may receive the transfer instruction, including the transfer instruction parameters. In some embodiments, the common platform 110, the first entity platform 120A, and/or a separate application layer and/or application server, or to any other suitable computing system, may receive the transfer instruction. A controller, e.g., of the common platform 110 may control the first entity platform 120A and the second entity platform 120B to perform the transfer instruction (Process A depicted in FIG. 2).

In some embodiments, based on the instruction parameters, the first entity platform 120A, e.g., as instructed by the common platform 110 and/or a controller of the first entity platform 120A, may move the quantity of the asset of the transfer from the first user profile 126A to the first segregated data structure 116A. In some embodiments, moving the quantity of the asset into the first segregated data structure 116A moves the quantity of the asset from a data structure controlled by the first entity platform 120A to a data structure controlled by the distributed asset network 100. Thus, the quantity of the asset is segregated from the first entity of the first entity platform 120A.

In some embodiments, the common platform 110 may verify the presence of the quantity of the asset in the first segregated data structure 116A in order to ensure a transfer of a token represented a tokenization of the quantity of the asset may be performed across the distributed asset network 100. Moreover, because the first segregated data structure 120A is a node of the distributed asset network 100, including a node on the distributed crypto-ledger 115, the first segregated data structure 120A may verify the transfer instruction by verifying the quantity of the first asset, and trigger the common platform 110 to mint, at step A2, the token associated with the quantity of the asset.

In some embodiments, the common platform 110 may mint the token in a first entity encrypted storage 117A associated with the first segregated data structure 116A. The first entity encrypted storage 117A may thus hold tokens representative of assets and quantities thereof that are attributable to the first segregated data structure 116A. In some embodiments, the first entity encrypted storage 117A may include, e.g., a blockchain wallet, or any other suitable cryptographic storage location addressed on the distributed crypto-ledger 115.

In some embodiments, at step 1A, the first entity platform 120A transfers the quantity of the asset from the first user profile 126A to the first segregated data structure 116A. Thus, the quantity of the asset is pulled for transfer between the first entity platform 120A and the second entity platform 120B. In some embodiments, the common platform 110 may constantly and/or periodically reconcile all minted tokens on the distributed crypto-ledger 115, e.g., in real-time, to ensure compliance with token transfer equivalence to the asset.

In some embodiments, at step 3A, the distributed crypto-ledger 115 may transfer the tokens from the first entity encrypted storage to a second entity encrypted storage. In some embodiments, the second entity encrypted storage is associated with a second segregated data structure 116B to hold tokens representing the asset available in the second segregated data structure 116B. In some embodiments, transferring the tokens from the first entity encrypted storage 116A to the second entity encrypted storage 116B represents a movement of the corresponding quantity of the asset from the first entity platform 120A to the second entity platform 120B.

In some embodiments, at step 4A, the second entity platform 120B may verify token delivery to the second entity encrypted storage 117B on the distributed crypto-ledger 115 and accept the transfer. In some embodiments, because the first segregated data structure 116A and the second segregated data structure 116B are part of the distributed asset network 100 associated with the common platform 110, the common platform 110 may track and verify, e.g., via the distributed crypto-ledger 115 the attribution to the entity platforms 120A through 120N of assets and quantities thereof. Thus, moving the quantity of the asset into the first segregated data structure 116A and minting and moving tokens to the second entity encrypted storage 117B may verifiably and immutably transfer attribution of the quantity of the asset to the second entity platform 120B. Thus, security of the transfer of the quantity of the asset may be maintained and actual movement of the quantity of the asset may be moved from the first segregated data structure 116A to the second segregated data structure 116B at a later time. Accordingly, the first user may receive system confirmation, via the user device 101, of successful transfer of the quantity of the asset.

In some embodiments, the second segregated data structure 116B may have a pool or balance of assets stored therein. Accordingly, in response to receiving the token at the second entity encrypted storage 117B, the second segregated data structure 116B may move a corresponding quantity of a corresponding asset to the second user profile 126B at step A5. Thus, the second user may be provided with the quantity of the asset of the transfer instruction due to the transfer of the token representing a tokenization of the quantity of the asset. In some embodiments, moving the corresponding quantity of a corresponding asset to the second user profile 126B is illustrated as occurring upon the token verification of step A4, though other arrangements may be employed. For example, the second user may be notified of successful transfer and that the second user profile 126B may be marked as receiving the corresponding quantity of a corresponding asset until the net transmission process (Process B) is complete, at which point the asset quantity may actually be moved to the second use profile 126B.

In some embodiments, in parallel and asynchronously with Process A, the common platform 110 may also cause the performance of Process B to transfer the quantity of the asset between the first entity platform 120A and the second entity platform 120B to satisfy the transfer of the token. For example, the transfer of the token may be reconciled or settled between the first segregated data structure 116A and the second segregated data structure 116B. In some embodiments, to improve the efficiency of the entity platforms 120A through 120N, the common platform 110 and the distributed asset network 100, the movement of the quantity of the asset between the first entity platform 120A and the second entity platform 120B may be aggregated with the movement of other quantities of other assets between the first entity platform 120A and the second entity platform 120B. Thus, the quantities of assets attributed to each of the first segregated data structure 116A and the second segregated data structure 116B may be netted to reduce the number of movements, reducing the number of operations required to satisfy the transfer of the tokens.

In some embodiments, to perform the net transmission of Process B, a net quantity of assets associated with multiple transmissions may be determined in order to move multiple assets between the first entity platform 120A and the second entity platform 120B. The multiple transmissions may include the movement of the quantity of the asset, and at least one additional movement of at least one quantity of at least one additional asset. In some embodiments, each movement is associated with a movement between the first entity platform 120A and the second entity platform 120B, where some may include movements from the first entity platform 120A to the second entity platform 120B, while some may include movement from the second entity platform 120B to the first entity platform 120A. In some embodiments, all of the movements may be satisfied and reconciled with associated transfers of tokens in a single net transmission that moves the net quantity.

In some embodiments, the net transmission engine 113 may determine a net quantity, value, amount, magnitude, or other attribute of the transfers of tokenized assets between any two entity platforms 120A through 120N to determine the aggregate assets to transfer between the two entity platforms 120A through 120N. The segregated data structures 116A through 116N of the entity platforms 120A through 120N may communicate with the net transmission execution system 200 according to instructions by the net transmission engine 113 to execute a net transmission the moves the aggregate assets between the two entity platforms 120A through 120N.

In some embodiments, the net transmission engine 113 may determine a time to initiate the net transmissions. For example, the net transmission engine 113 may initiate the net transmissions on a scheduled period of time (e.g., every minute, every five minutes, every ten minute, every 15 minutes, every 20 minutes, every 25 minutes, every 30 minutes, every 45 minutes, every hour, every two hours, every three hours, every four hours, every five hours, every six hours, every seven hours, every eight hours, every nine hours, every ten hours, every 11 hours, every 12 hours, once per day, once per week, once per two weeks, once per month, once per two months, once per three months, once per four months, once per six months, oncer per year, etc.). In some embodiments, the scheduled period of time may be adjusted and/or configured based on a volume of transfers being conducted over the distributed asset network 100 or by any other suitable metric to balance minimizing a number of net transmissions and minimizing a quantity of unsatisfied tokenized asset transfers, where an unsatisfied tokenized asset transfer refers to a transfer of a tokenized asset(s) without a transmission of the associated asset and/or asset amount/quantity/value/etc.

In some embodiments, the net transmission engine 113 may initiate the net transmissions may dynamically and/or algorithmically determine to initiate a net transmission based on the balance minimizing a number of net transmissions and minimizing a quantity of unsatisfied tokenized asset transfers. For example, where a quantity of unsatisfied tokenized asset transfers to or from a particular entity platform 120A through 120N exceeds a predetermined value, the net transmission engine 113 may initiate the net transmissions, or where a ratio of: unsatisfied tokenized asset transfers from a first particular entity platform to second particular entity platform; and, unsatisfied tokenized asset transfers from the second particular entity platform to the first particular entity platform, exceeds a predetermined value, the net transmission engine 113 may initiate the net transmissions.

In some embodiments, at step 1B, the common platform 110 may provide automated net transmission instructions based on the net quantity for the net transmission. The common platform 110 may provide the net transmission instructions to the nodes of the entity platforms 120A through 120N, including the first segregated data structure 116A and the second segregated data structure 116N. The net transmission settles, completes, or otherwise satisfies the transfer of the tokens. In some embodiments, therefore, the common platform 110 (e.g., using the net transmission engine 113) provides settlement instructions to the first segregated data structure 116A to transfer the quantity of the asset to the second segregated data structure 116B. For example, where the asset are dollars, the settlement instructions may cause the first segregated data structure 116A to transfer the dollars via, e.g., FedWire. In some embodiments, the transfer of the quantity of the asset may be combined with other transfers of other quantities of the asset based on other transfers of tokens between the first entity encrypted storage 117A and the second entity encrypted storage 117B. In some embodiments, the quantity of the asset may be netted with the other quantities of assets for a net settlement. In some embodiments, the ensure efficient net settlement, the common platform 110 may utilize metrics such as, e.g., a transfer quotient, predict behavior and/or predicted transfer quotients, segregated account balance, network traffic, time since a previous net settlement, among other metrics to intelligently determine a time for the transfer settlement of process B.

In some embodiments, at step 2B, upon the selection of the time and receiving the settlement instructions, the first segregated data structure 116A may transfer the netted quantity of the asset to the second segregated data structure 116B. Thus, the transfer of the quantity of the asset may be performed in parallel with the token transfer along with a transfer of other quantities of the asset to consolidate transfers for more efficient operation and communications.

In some embodiments, at step 3B, the second segregated data structure 116B may receive the quantity of the asset. As a result, the token transfer may be satisfied, and the second segregated data structure 116B may trigger the common platform 110 to burn the corresponding tokens from the second entity encrypted storage 117B. In some embodiments, the common platform 110 may constantly or periodically reconcile all segregated data structure balances of assets in real-time to ensure compliance with the token transfer equivalence. This process may also provide the first entity platform 120A with verification of the burning of the associated tokens.

In some embodiments, Process B may include the net transmission between first segregated data structure 116A and the second segregated data structure 116B, and/or net transmissions between some or all other segregated data structures 116C through 116N of the distributed asset network 100.

Figure 3:
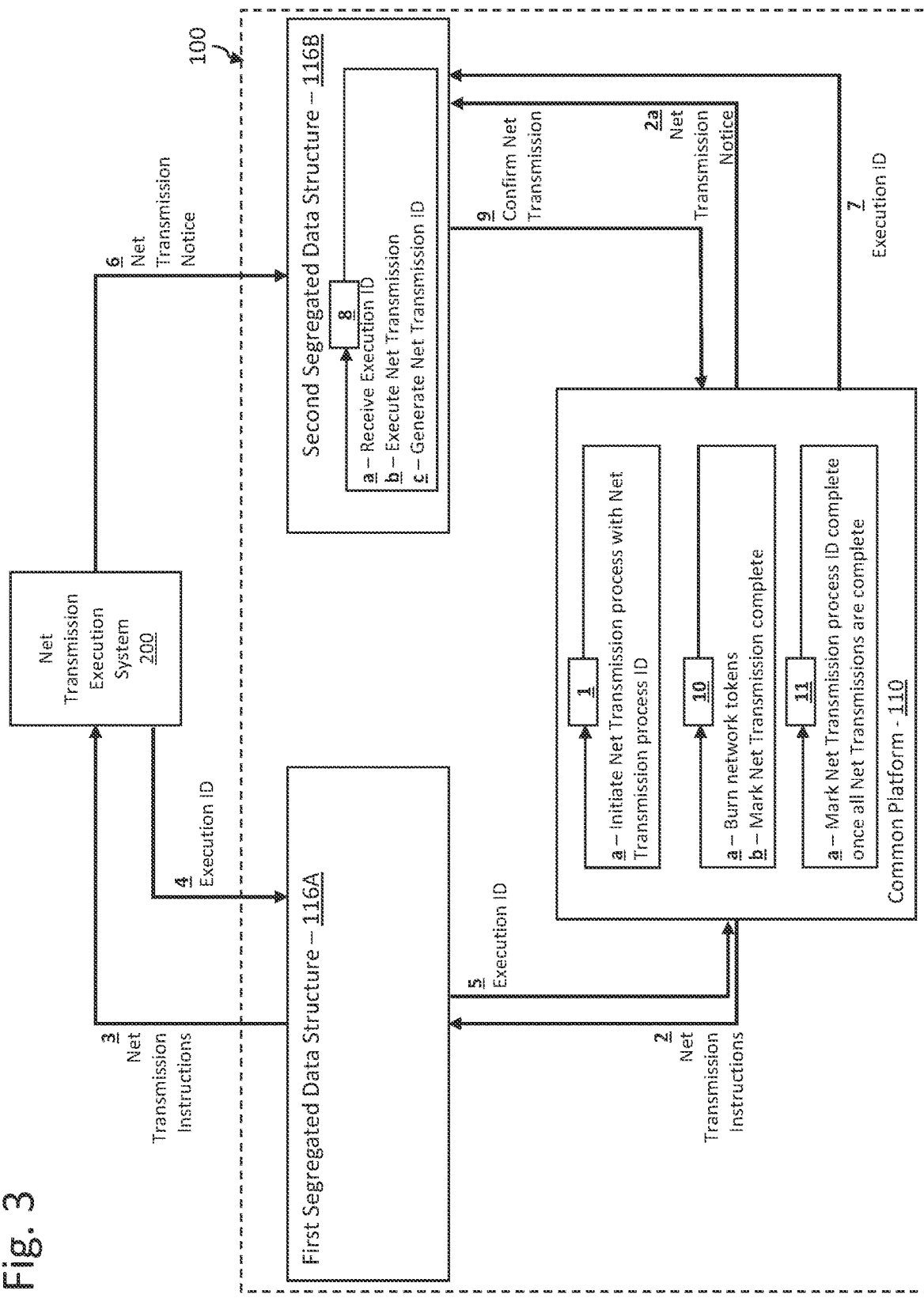
FIG. 3 is a diagram illustrating a net transmission process using the net transmission execution system 200 in accordance with one or more aspects of the embodiments of the present disclosure.

FIG. 3 is a diagram illustrating a net transmission process using the net transmission execution system 200 in accordance with one or more aspects of the embodiments of the present disclosure.

In some embodiments, a net transmission process (e.g., Process B as described above), may include a sequence of operations to perform and verify a net transmission of a quantity of assets between two or more entity platforms 120A through 120N.

In some embodiments, the common platform 110 may, at step 1a, initiate a net transmission process. In some embodiments, initiating the net transmission process may include determine that a net transmission is to occur and the net transmissions amongst the entity platforms 120A through 120N to satisfy all token transfers on the distributed cryptoledger 115. In some embodiments, the common platform 110 may generate a net transmission process identifier (ID) to identify the net transmission process, as well as a net transmission ID for each net transmission associated with the net transmission process.

In some embodiments, upon creating the net transmission process ID, including the net transmission IDs, the common platform 110 may issue at step 2 net transmission instructions. FIG. 3 depicts a net transmission between a first segregated data structure 116A and second segregated data structure 116B, but any number of entity platforms 120A through 120N may be involved using similar operations.

In some embodiments, the net transmission instructions may include net transmission parameters including, e.g., a sender and a recipient (e.g., the first segregated data structure 116A and the second segregated data structure 116B, respectively), and a net quantity of assets to move between the sender and the recipient. In some embodiments, the transmission instructions may cause the cause the first segregated data structure 116A to flag the assets and/or quantities thereof, e.g., by setting a metadata flag or producing a list or vector referencing the assets and/or quantities thereof. The flag may mark the assets and/or quantities thereof as subject to the net transmissions to reserve the assets and/or quantities thereof for transmission to the second segregated data structure 116B.

In some embodiments, the common platform 110 may also issue a notice to the second segregated data structure 116B including a net transmission notice at step 2*a*. The net transmission notice may include the net transmission parameters such that the second segregated data structure 116B may receive and log the net transmission notice in expectation for a net transmission conforming to the net transmission parameters.

In some embodiments, the first segregated data structure 116A may pass the net transmission instructions at step 3 to the net transmission execution system 200. In some embodiments, the net transmission execution system 200 may include a suitable computing system for executing a movement of assets between platforms, such as, e.g., FedWire for currency assets, a cloud storage system for data assets (e.g., file and/or media), or other suitable system or any combination thereof.

In some embodiments, the net transmission execution system 200 may receive the net transmission instructions and authenticate and execute the net transmission. Accordingly, the net transmission execution system 200 may produce an execution ID to identify the net transmission execution operation by the net transmission execution system 200. The net transmission execution system 200 may return the execution ID at step 4 to the first segregated data structure 116A, which may forward the execution ID to the common platform 110 at step 5.

In some embodiments, the net transmission execution system 200 may also provide a net transmission notice at step 6 to the second segregated data structure 116B. The net transmission notice may include, e.g., instructions and/or authorization execute the movement of the quantities of the assets. In some embodiments, the net transmission notice may include, e.g., the execution ID, the net transmission parameters, among other data associated with the execution of the net transmission or any combination thereof.

Moreover, in some embodiments, the common platform 110 may log the execution ID and forward the execution ID to the second segregated data structure 116B at step 7. Thus, both the common platform 110 and the second segregated data structure 116B may log the execution ID in order to validate an upcoming execution of the net transmission. Where the logged execution ID matches the execution ID of an executed net transmission, the second segregated data structure 116B and the common platform 110 may use the execution ID to identify the associated net transmission ID and verify the net transmission as executed.

Accordingly, in some embodiments, the second segregated data structure 116B may receive the net transmission notice from the net transmission execution system 200 as well as the execution ID from the common platform 110. Accordingly, at step 8, the second segregated data structure 116B may receive the execution ID (step 8*a*), and execute the net transmission associated with the execution ID (step 8*b*). In some embodiments, because the second segregated data structure 116B is segregated from the second entity platform 120B, executing the net transmission may include moving the quantities of the assets associated with the net transmission from the segregated data structure 116B to another data structure attributed to the second entity platform 120B. Doing so moves the quantities of the assets from the distributed asset network 100 to the second entity platform 120B.

In some embodiments, upon executing the net transmission, the second segregated data structure 116B may generate a net transmission ID (step 8*c*). In some embodiments, the common platform 110 and the second segregated data structure 116B may generate net transmission IDs using a common algorithm, such as, e.g., a hash or other suitable cryptographic algorithm, and/or any other technique for combining net transmission parameters into an identifier (e.g., concatenate the parameters, encode in a vector or string, etc.). Thus, the second segregated data structure 116B may return a confirmation of the net transmission at step 9 to the common platform 110, including the net transmission ID. By generating the net transmission ID using the same inputs and the same technique, the common platform 110 may compare the net transmission ID of the net transmission confirmation to the locally generated net transmission ID to confirm that the net transmission has been executed. In some embodiments, the common platform 110 may confirm that the net transmission has been executed without having a locally generated net transmission ID or without having the net transmission ID generated by the second segregated data structure 116B. In such a case, the common platform 110 may verify the source of the net transmission confirmation and verify the execution of the net transmission based on the confirmation being the second segregated data structure 116B. Additionally or alternatively, the second segregated data structure 116B may include with the confirmation of the net transmission the execution ID. The common platform 110 may use the execution ID to identify the net transmission associated with the net transmission confirmation.

In some embodiments, upon receiving the confirmation, the common platform may, at step 10*a*, burn the tokens in the second encrypted storage 117B associated with the second segregated data structure 116B. By burning the tokens in the second encrypted storage 117B and moving the quantities of the assets from the second segregated data structure 116B, the asset transfers and token transfers associated with the net transmission may be satisfied as indicated by the removal of the tokens. The common platform 110 may then, at step 10*b*, mark the net transmission as complete, e.g., by setting a flag in metadata associated with the net transmission ID and/or execution ID, by entering a data entry in a table or log associated with the net transmission ID and/or execution ID, or by any other suitable technique for marking data.

In some embodiments, once all net transmissions are complete, the common platform 110 may, at step 11*a*, mark the net transmission process ID as complete, thus completing the net transmissions across the distributed asset network 100. The common platform 110 may mark the net transmission process ID as complete, e.g., by setting a flag in metadata associated with the net transmission process ID, by entering a data entry in a table or log associated with the net transmission process ID, or by any other suitable technique for marking data.

Figure 4:
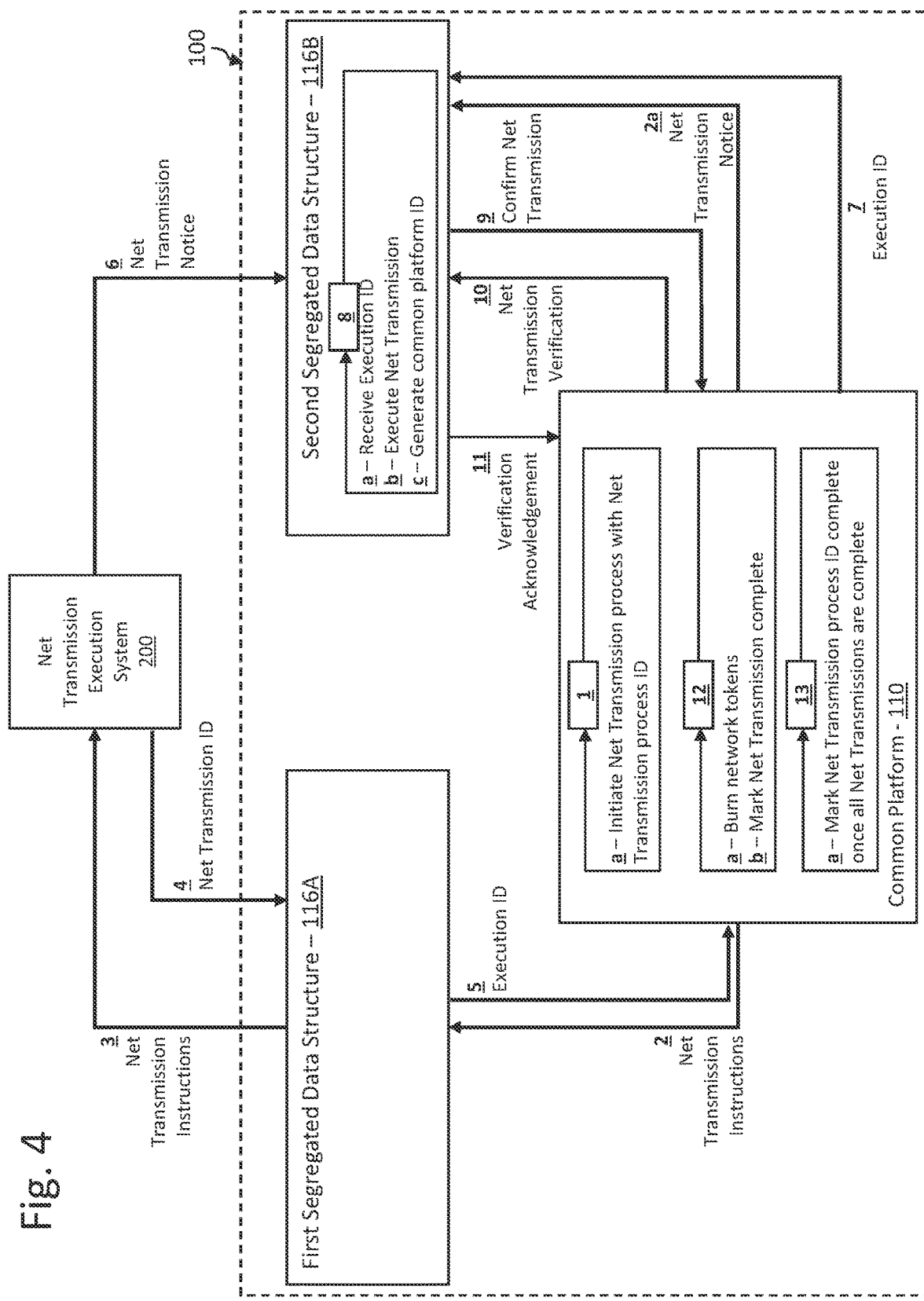
FIG. 4 is a diagram illustrating another net transmission process using the net transmission execution system 200 in accordance with one or more aspects of the embodiments of the present disclosure.

FIG. 4 is a diagram illustrating another net transmission process using the net transmission execution system 200 in accordance with one or more aspects of the embodiments of the present disclosure.

In some embodiments, a net transmission process (e.g., Process B as described above), may include a sequence of operations to perform and verify a net transmission of a quantity of assets between two or more entity platforms 120A through 120N.

In some embodiments, the common platform 110 may, at step 1*a*, initiate a net transmission process. In some embodiments, initiating the net transmission process may include determine that a net transmission is to occur and the net transmissions amongst the entity platforms 120A through 120N to satisfy all token transfers on the distributed cryptoledger 115. In some embodiments, the common platform 110 may generate a net transmission process identifier (ID) to identify the net transmission process, as well as a net transmission ID for each net transmission associated with the net transmission process.

In some embodiments, upon creating the net transmission process ID, including the net transmission IDs, the common platform 110 may issue at step 2 net transmission instructions. FIG. 3 depicts a net transmission between a first segregated data structure 116A and second segregated data structure 116B, but any number of entity platforms 120A through 120N may be involved using similar operations.

In some embodiments, the net transmission instructions may include net transmission parameters including, e.g., a sender and a recipient (e.g., the first segregated data structure 116A and the second segregated data structure 116B, respectively), and a net quantity of assets to move between the sender and the recipient. In some embodiments, the transmission instructions may cause the cause the first segregated data structure 116A to flag the assets and/or quantities thereof, e.g., by setting a metadata flag or producing a list or vector referencing the assets and/or quantities thereof. The flag may mark the assets and/or quantities thereof as subject to the net transmissions to reserve the assets and/or quantities thereof for transmission to the second segregated data structure 116B.

In some embodiments, the common platform 110 may also issue a notice to the second segregated data structure 116B including a net transmission notice at step 2*a*. The net transmission notice may include the net transmission parameters such that the second segregated data structure 116B may receive and log the net transmission notice in expectation for a net transmission conforming to the net transmission parameters.

In some embodiments, the first segregated data structure 116A may pass the net transmission instructions at step 3 to the net transmission execution system 200. In some embodiments, the net transmission execution system 200 may include a suitable computing system for executing a movement of assets between platforms, such as, e.g., FedWire for currency assets, a cloud storage system for data assets (e.g., file and/or media), or other suitable system or any combination thereof.

In some embodiments, the net transmission execution system 200 may receive the net transmission instructions and authenticate and execute the net transmission. Accordingly, the net transmission execution system 200 may produce an execution ID to identify the net transmission execution operation by the net transmission execution system 200. The net transmission execution system 200 may return the execution ID at step 4 to the first segregated data structure 116A, which may forward the execution ID to the common platform 110 at step 5.

In some embodiments, the net transmission execution system 200 may also provide a net transmission notice at step 6 to the second segregated data structure 116B. The net transmission notice may include, e.g., instructions and/or authorization execute the movement of the quantities of the assets. In some embodiments, the net transmission notice may include, e.g., the execution ID, the net transmission parameters, among other data associated with the execution of the net transmission or any combination thereof.

Moreover, in some embodiments, the common platform 110 may log the execution ID and forward the execution ID to the second segregated data structure 116B at step 7. Thus, both the common platform 110 and the second segregated data structure 116B may log the execution ID in order to validate an upcoming execution of the net transmission.

Where the logged execution ID matches the execution ID of an executed net transmission, the second segregated data structure 116B and the common platform 110 may use the execution ID to identify the associated net transmission ID and verify the net transmission as executed.

Accordingly, in some embodiments, the second segregated data structure 116B may receive the net transmission notice from the net transmission execution system 200 as well as the execution ID from the common platform 110. Accordingly, at step 8, the second segregated data structure 116B may receive the execution ID (step 8*a*), and execute the net transmission associated with the execution ID (step 8*b*). In some embodiments, because the second segregated data structure 116B is segregated from the second entity platform 120B, executing the net transmission may include moving the quantities of the assets associated with the net transmission from the segregated data structure 116B to another data structure attributed to the second entity platform 120B. Doing so moves the quantities of the assets from the distributed asset network 100 to the second entity platform 120B.

In some embodiments, upon executing the net transmission, the second segregated data structure 116B may generate a net transmission ID (step 8*c*). In some embodiments, the common platform 110 and the second segregated data structure 116B may generate net transmission IDs using a common algorithm, such as, e.g., a hash or other suitable cryptographic algorithm, and/or any other technique for combining net transmission parameters into an identifier (e.g., concatenate the parameters, encode in a vector or string, etc.). Thus, the second segregated data structure 116B may return a confirmation of the net transmission at step 9 to the common platform 110, including the net transmission ID. By generating the net transmission ID using the same inputs and the same technique, the common platform 110 may compare the net transmission ID of the net transmission confirmation to the locally generated net transmission ID to confirm that the net transmission has been executed. In some embodiments, the common platform 110 may confirm that the net transmission has been executed without having a locally generated net transmission ID or without having the net transmission ID generated by the second segregated data structure 116B. In such a case, the common platform 110 may verify the source of the net transmission confirmation and verify the execution of the net transmission based on the confirmation being the second segregated data structure 116B. Additionally or alternatively, the second segregated data structure 116B may include with the confirmation of the net transmission the execution ID. The common platform 110 may use the execution ID to identify the net transmission associated with the net transmission confirmation.

In some embodiments, to ensure that the net transmission of the net transmission ID and/or the execution ID has been executed, the common platform 110 may access the second segregated data structure 116B, e.g., via a database query, application programming interface (API) call, or other suitable message. The message may include a query at step 10 for net transmission verification. In some embodiments, the net transmission verification may include, e.g., the net transmission parameters, the net transmission ID, the execution ID, or any suitable combination thereof with an instruction to check with the execution of step 8*b* has been performed.

In some embodiments, the second segregated data structure 116B may return a response to the net transmission verification including a verification acknowledgement confirming net transmission execution or a failure indicating that the net transmission has not been executed.

In some embodiments, upon receiving the verification acknowledgement at step 11, the common platform may, at step 12a, burn the tokens in the second encrypted storage 117B associated with the second segregated data structure 116B. By burning the tokens in the second encrypted storage 117B and moving the quantities of the assets from the second segregated data structure 116B, the asset transfers and token transfers associated with the net transmission may be satisfied as indicated by the removal of the tokens. The common platform 110 may then, at step 12b, mark the net transmission as complete, e.g., by setting a flag in metadata associated with the net transmission ID and/or execution ID, by entering a data entry in a table or log associated with the net transmission ID and/or execution ID, or by any other suitable technique for marking data.

In some embodiments, once all net transmissions are complete, the common platform 110 may, at step 13a, mark the net transmission process ID as complete, thus completing the net transmissions across the distributed asset network 100. The common platform 110 may mark the net transmission process ID as complete, e.g., by setting a flag in metadata associated with the net transmission process ID, by entering a data entry in a table or log associated with the net transmission process ID, or by any other suitable technique for marking data.

In some embodiments, the common platform 110 may append a block to the distributed crypto-ledger 115 that records the completion of each of steps 1, 2, 5, 9, 11, 12 and 13, including recording each net transmission, each net transmission ID, each execution ID, and the net transmission process ID, along with the status of whether each net transmission and/or the net transmission process has completed. Thus, the distributed crypto-ledger 115 may maintain a record of the net transmission processes on the distributed asset network 100 alongside recording the transfer of tokens between encrypted storages.

Figure 5:
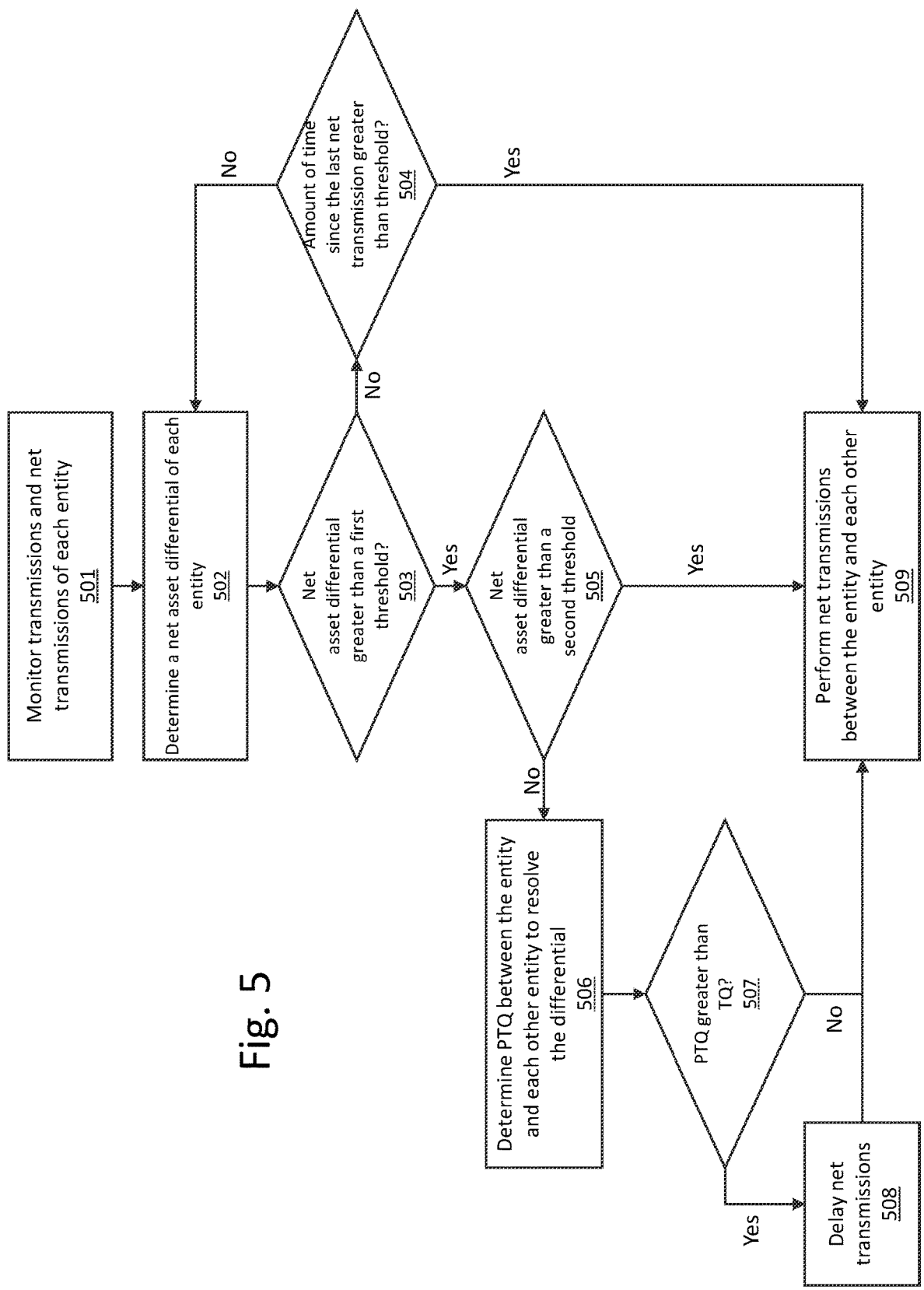
FIG. 5 illustrates a flowchart of an illustrative methodology for efficient net transfers of assets to satisfy token transfers across multiple entity platforms using asynchronous asset transfers in accordance with one or more embodiments of the present disclosure.

FIG. 5 illustrates a flowchart of an illustrative methodology for efficient net transfers of assets to satisfy token transfers across multiple entity platforms using asynchronous asset transfers in accordance with one or more embodiments of the present disclosure.

In some embodiments, a net transmission process (e.g., Process B above), may be triggered such that a combination of network resources and outstanding unsatisfied token transfers are minimized. As a result, the net transmission process may implement a triggering process that balances the network traffic used by performing net transmissions with unsatisfied token transfers.

In some embodiments, at step 501, the common platform 110 may monitor transmissions and net transmissions associated with each entity platform 120A through 120B and/or each segregated data structure 116A through 116N on the distributed asset network 100.

In some embodiments, the net transmission engine 113 may determine a time to initiate the net transmissions. For example, the net transmission engine 113 may initiate the net transmissions on a scheduled period of time (e.g., every minute, every five minutes, every ten minute, every 15 minutes, every 20 minutes, every 25 minutes, every 30 minutes, every 45 minutes, every hour, every two hours, every three hours, every four hours, every five hours, every six hours, every seven hours, every eight hours, every nine hours, every ten hours, every 11 hours, every 12 hours, once per day, once per week, once per two weeks, once per month, once per two months, once per three months, once per four months, once per six months, oncer per year, etc.). In some embodiments, the scheduled period of time may be adjusted and/or configured based on a volume of transfers being conducted over the distributed asset network 100 or by any other suitable metric to balance minimizing a number of net transmissions and minimizing a quantity of unsatisfied tokenized asset transfers, where an unsatisfied tokenized asset transfer refers to a transfer of a tokenized asset(s) without a transmission of the associated asset and/or asset amount/quantity/value/etc.

In some embodiments, the common platform 110 may utilize the distributed crypto-ledger 115 to determine tokens in entity encrypted storages indicative of a movement of assets that has completed via tokenized assets but has not completed with the movements of the assets themselves, thus indicating unsatisfied token transfers resulting in a differential in asset transfer obligations between entities.

In some embodiments, at step 502, the common platform 110 may determine an asset differential between two particular entities as a difference in a net quantity of first assets associated with a first transmissions to move the first assets from the first entity to a second entity of the two particular entities, and a net quantity of second assets associated with a second transmissions to move the second assets from the additional entity to the first entity. The transmissions of assets are determined based on the quantity of tokenized assets (e.g., tokens) that are present in the entity encrypted storages representing the transmissions of the assets.

In some embodiments, at step 503, the common platform 110 may initiate the net transmissions may dynamically and/or algorithmically determine to initiate a net transmission based on the balance minimizing a number of net transmissions and minimizing a quantity of unsatisfied tokenized asset transfers. For example, where a quantity of unsatisfied tokenized asset transfers to or from a particular entity platform 120A through 120N exceeds a predetermined value, the net transmission engine 113 may initiate the net transmissions, or where the asset differential between any particular pair of entity platforms 120A through 120N exceeds a predetermined value, the net transmission engine 113 may initiate the net transmissions.

For example, the common platform 110 may test the asset differential between each pair of entities against a first threshold. In some embodiments, the asset differential may be expressed a ratio. Accordingly, the first threshold may be a suitable maximum percentage, such as, e.g., 50%, 55%, 60%, 65%, 70%, 75%, 80%, 85%, 90%, 95%, 97%, 98%, 99% or other suitable threshold, such as any threshold in a range between, e.g., 50% and 100%.

In some embodiments, at step 504, where no asset differential between pairs of entities exceeds the first threshold, the common platform 110 may test if an amount of time since a previous net transmission process is greater than a threshold amount of time. In some embodiments, it may be advantageous to prevent longstanding asset differentials. Accordingly, where the amount of time exceeds the threshold amount of time, the common platform 110 may proceed to initiate the net transmissions of the net transmission process at step 509. In some embodiments, the threshold amount of time may be any suitable maximum amount of time for unsatisfied token transfers and/or asset differentials between entities, such as, e.g., one day, two days, three days, four days, five days, six days, one week, two weeks, three weeks, four weeks, one month, etc.

In some embodiments, where the asset differential does exceed the first asset differential threshold, the common platform 110 may proceed to execute the net transmissions of the net transmission process. However, to ensure that network resource usage is minimized, the common platform 110 may, at step 505, test the asset differential of each pair of entities against a second asset differential threshold. The second asset differential threshold may signify a greater threshold amount that immediately triggers the net transmissions of the net transmission process, such that the common platform 110 may optimize for network resource efficiency where the asset differentials are below the second asset differential threshold amount.

Accordingly, in some embodiments, at step 506, where the net asset differentials of each pair of entities is below the second asset differential threshold, the common platform 110 may determine a transfer quotient and a predicted transfer quotient of the net transmission process to determine a number of transmissions to offset the asset differential between each entity platform 120A through 120N, and a predicted number of transmissions to offset a future asset differential across the entity platforms 120A through 120N.

The term "transfer quotient" (TQ) refers to a total number of net transmissions needed to complete a net transmission process based on the number and quantity of token transfers that remain to be satisfied between each entity platform and each other entity platform at a current time. The transfer quotient may be a number that is derived and updated in real-time.

The term "predicted transfer quotient" (PTQ) refers to a transfer quotient predicted for a future time based on patterns and trends from historical and current token movements across the distributed asset network 100.

In some embodiments, the PTQs can include any suitable future time points, such as, e.g., $PTQ_5$: PTQ in next 5 min, $PTQ_{15}$: PTQ in next 15 min, $PTQ_{30}$: PTQ in next 30 min, $PTQ_{60}$: PTQ in next 60 min, $PTQ_{120}$: PTQ in next 120 min, $PTQ_{180}$: PTQ in next 180 min, $PTQ_{240}$: PTQ in next 240 min, $PTQ_{300}$: PTQ in next 300 min, $PTQ_{360}$: PTQ in next 360 min, $PTQ_{420}$: PTQ in next 420 min, $PTQ_{480}$: PTQ in next 480 min, $PTQ_{540}$: PTQ in next 540 min, $PTQ_{600}$: PTQ in next 600 min, $PTQ_{660}$: PTQ in next 660 min, $PTQ_{720}$: PTQ in next 720 min, or other suitable future time point or any combination thereof.

In some embodiments, the PTQ may be predicted using past TQs and a suitable prediction model, such as a machine learning model, statistical model (e.g., regression model, Bayesian model, monte Carlo model, etc.), or any other suitable prediction model or any combination thereof.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  a. define Neural Network architecture/model,
  b. transfer the input data to the exemplary neural network model,
  c. train the exemplary model incrementally,
  d. determine the accuracy for a specific number of timesteps,
  e. apply the exemplary trained model to process the newly-received input data,
  f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

For example, in some embodiments, the PTQ may be predicted using, e.g., a regression model having a regression layer that correlates current and historical data to a predicted future value. In some embodiments, the regression model ingests a feature vector that encodes features representative of asset transfer behaviors such as, e.g., a frequency, average quantity, or other metrics or any combination thereof for each entity platform in the distributed asset network 100. In some embodiments, the regression model processes the feature vector with parameters to produces a prediction of PTQ. In some embodiments, the parameters of the regression model may be implemented in a suitable machine learning model including a prediction machine learning model, such as, e.g., Linear Regression, Logistic Regression, Ridge Regression, Lasso Regression, Polynomial Regression, Bayesian Linear Regression (e.g., Naive Bayes regression), a convolutional neural network (CNN), a recurrent neural network (RNN), decision trees, random forest, support vector machine (SVM), K-Nearest Neighbors, or any other suitable algorithm for predicting output values based on input values. In some embodiments, for computational efficiency while preserving accuracy of predictions, the regression model may advantageously include a random forest model.

In some embodiments, the regression model processes the features encoded in the feature vector by applying the parameters of the prediction machine learning model to produce a model output vector. In some embodiments, the model output vector may be decoded to generate one or more numerical output values indicative of PTQ. In some embodiments, the model output vector may include or may be decoded to reveal the output value(s) based on a modelled correlation between the feature vector and a target output.

In some embodiments, the parameters of the regression model may be trained based on known outputs. For example, the asset transfer behaviors may be paired with a target value or known value to form a training pair, such as a historical asset transfer behavior and an observed result and/or human annotated value, such as the TQ and/or PTQ.

In some embodiments, the historical asset transfer behaviors may be accessed in, e.g., a database of the associated entity platform, in a log or record on the common platform 110, recorded on the distributed crypto-ledger 115 or in any other suitable storage location and/or structure. The historical asset transfer behaviors may include each asset and each asset quantity transferred between segregated data structures 116A through 116N, each associated token transfer between the associated entity encrypted storages, each net transmission associated with each asset quantity transfer and/or token transfer, among other data associated with historical movements or any combination thereof.

In some embodiments, the regression model may include a transmission quantity prediction model that predicts a future number and/or quantity of asset transfers. Alternatively, or in addition, the transmission quantity prediction model may predict a predicted asset differential for each pair of entities, and/or a future PTQ. In some embodiments, the PTQ may be derived from a predicted number and/or quantity of asset transfers and/or from the predicted asset differential.

In some embodiments, the asset transfer behaviors may be provided to the regression model, e.g., encoded in a feature vector, to produce a predicted output value. In some embodiments, an optimizer associated with the regression model may then compare the predicted output value with the known output of a training pair including the historical asset transfer behaviors to determine an error of the predicted output value. In some embodiments, the optimizer may employ a loss function, such as, e.g., Hinge Loss, Multiclass SVM Loss, Cross Entropy Loss, Negative Log Likelihood, or other suitable classification loss function to determine the error of the predicted output value based on the known output.

In some embodiments, the known output may be obtained after the regression model produces the prediction, such as in online learning scenarios. In such a scenario, the regression model may receive the asset transfer behaviors and generate the model output vector to produce an output value representing the PTQ. Subsequently, a user may provide feedback by, e.g., modifying, adjusting, removing, and/or verifying the output value via a suitable feedback mechanism, such as a user interface device (e.g., keyboard, mouse, touch screen, user interface, or other interface mechanism of a user device or any suitable combination thereof). The feedback may be paired with the asset transfer behaviors to form the training pair and the optimizer may determine an error of the predicted output value using the feedback.

In some embodiments, based on the error, the optimizer may update the parameters of the regression model using a suitable training algorithm such as, e.g., backpropagation for a prediction machine learning model. In some embodiments, backpropagation may include any suitable minimization algorithm such as a gradient method of the loss function with respect to the weights of the prediction machine learning model. Examples of suitable gradient methods include, e.g., stochastic gradient descent, batch gradient descent, mini-batch gradient descent, or other suitable gradient descent technique. As a result, the optimizer may update the parameters of the regression model based on the error of predicted labels in order to train the regression model to model the correlation between asset transfer behaviors and PTQ in order to produce more accurate output values based on new asset transfer behaviors.

In some embodiments, the common platform 110 may trigger the net transmissions of the net transmission process upon the PTQ and/or the TQ exceeding a threshold amount. Alternatively, or in addition, in some embodiments, at step 507, where the PTQ is less than or equal to the TQ, the net transmission process may progress to execute the net transmissions at step 509 (e.g., as described above with reference to FIGS. 2, 3 and/or 4).

In some embodiments, at step 508, where the PTQ is greater than the TQ, the net transmission process may be delayed for a period of time. Upon the delay elapsing, the net transmission process may progress to execute the net transmissions at step 509 (e.g., as described above with reference to FIGS. 2, 3 and/or 4).

Figure 6:
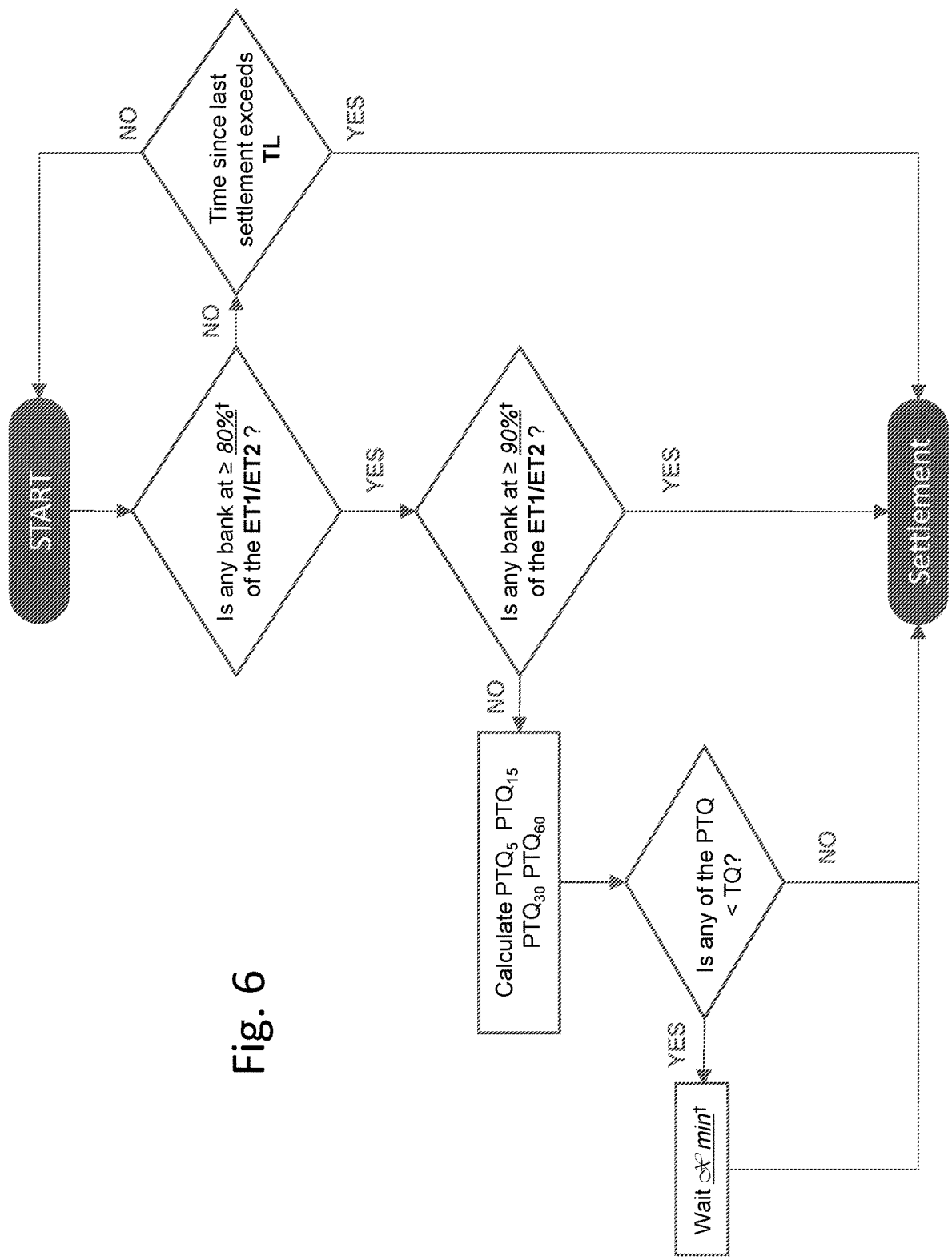
FIG. 6 illustrates a flowchart of the methodology for efficient asset-token settlement across multiple entity-specific platforms using asynchronous asset transfers for a net settlement of currency transfers in accordance with one or more embodiments of the present disclosure.

FIG. 6 illustrates a flowchart of the methodology for efficient asset-token settlement across multiple entity-specific platforms using asynchronous asset transfers for a net settlement of currency transfers in accordance with one or more embodiments of the present disclosure.

In some embodiments, in conjunction with a transfer of value on the digital ledgers from a first user of First member entity to a second user of Second member entity, there is a need to "settle" the credit afforded by the entities to the users (based on the digital ledger) by sending real currency from one entity to another.

In some embodiments, there may be more than two entities interacting on the distributed asset network 100 via the common platform 110, managing a series of private platforms, such as private digital ledgers. On a periodic basis, the common platform 110 may perform an "intelligent" net settlement across all entities. The goal is to minimize the exposure of any one entity to the credit of another entity, while also minimizing the number of actual money transfer transactions. The reason being, a) no entity wants to be over exposed for any significant time to the risk of a default by another entity on the distributed asset network 100, and b) the money transfers are slow and costly transactions.

In some embodiments, variables that may be incorporated for the intelligent settlement algorithm are:
  Timing—How often the distributed asset network 100 settlement operation is triggered;
  Amount of Exposure—As any one member entity approaches its upper limits to exposure it will trigger a network settlement operation;
  Transfer Quotient—A number that is derived and updated in real-time that represents the total number of transfers that would have to occur during the settlement cycle should it occur at that point in time;
  ·Predicted Transfer Quotient—A transfer quotient for a future point in time based on historical data of transfers that have occurred between clients of the entities on the distributed asset network 100 at during the same period of time In some embodiments, the common platform 110 may include a process running that keeps track of the above metrics on a real-time basis. All variables may be configurable, so that the process may be tuned from time to time as new data is generated.

In some embodiments, the logic for triggering the settlement process may be hierarchical, with the highest priority variables able to trigger a settlement cycle first. In some embodiments, the triggers may include, in hierarchical order:

1. If any entity's exposure to any other entity traverses 10% of max exposure, a network settlement process is triggered
2. If the time since the last settlement process passes (Configurable variable), a network settlement process is triggered.

In some embodiments, once a network settlement process (e.g., Process B above) is triggered then the logic may use the transfer quotient and the predicted transfer quotient. For example, if the predicted transfer quotient for a future period of time (5 mins, 15 mins, 30 mins, 45 mins, 60 mins, or other suitable period or any combination thereof, or any configurable value) is less than the current time transfer quotient, then the settlement process may be delayed until that time period, thus minimizing the number of money transfer transactions.

In some embodiments, parameters going into the settlement algorithm may include:
a. Time since last settlement (TL);
b. The max amount of time allowed between settlements for each client;
c. Exposure Tolerance;
d. Overall Exposure Tolerance (ET1):
   i. Max allowed on the combined total of exposures from all the counterparty entities. For a network of n entities, this is the total of $E_1+E_2+E_3+\ldots E_{n-1}$:
e. Counterparty Exposure Tolerance (ET2):
   i. Max allowed on the exposure with individual counterparty entity. For a network of n entities, there would be (n–1) ET2 for each entity;
f. Transfer Quotient (TQ):
   i. At any point in time, the total number of transfers required to settle all entities in the distributed asset network 100;
g. Predicted Transfer Quotient (PTQ):
   i. Based on previous statistics, predict the total number of transfers required to settle all entities within the next predetermined and/or dynamically established time period.

In some embodiments, the PTQs can include any suitable future time points, such as, e.g., $PTQ_5$: PTQ in next 5 min, $PTQ_{15}$: PTQ in next 15 min, $PTQ_{30}$: PTQ in next 30 min, $PTQ_{60}$: PTQ in next 60 min, $PTQ_{120}$: PTQ in next 120 min, $PTQ_{180}$: PTQ in next 180 min, $PTQ_{240}$: PTQ in next 240 min, $PTQ_{300}$: PTQ in next 300 min, $PTQ_{360}$: PTQ in next 360 min, $PTQ_{420}$: PTQ in next 420 min, $PTQ_{480}$: PTQ in next 480 min, $PTQ_{540}$: PTQ in next 540 min, $PTQ_{600}$: PTQ in next 600 min, $PTQ_{660}$: PTQ in next 660 min, $PTQ_{720}$: PTQ in next 720 min, or other suitable future time point or any combination thereof.

In some embodiments, the PTQ may be predicted using past TQs and a suitable prediction model, such as a machine learning model, statistical model (e.g., regression model, Bayesian model, monte Carlo model, etc.), or any other suitable prediction model or any combination thereof.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
a. define Neural Network architecture/model,
b. transfer the input data to the exemplary neural network model,
c. train the exemplary model incrementally,
d. determine the accuracy for a specific number of timesteps,
e. apply the exemplary trained model to process the newly-received input data,
f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

Figure 7:
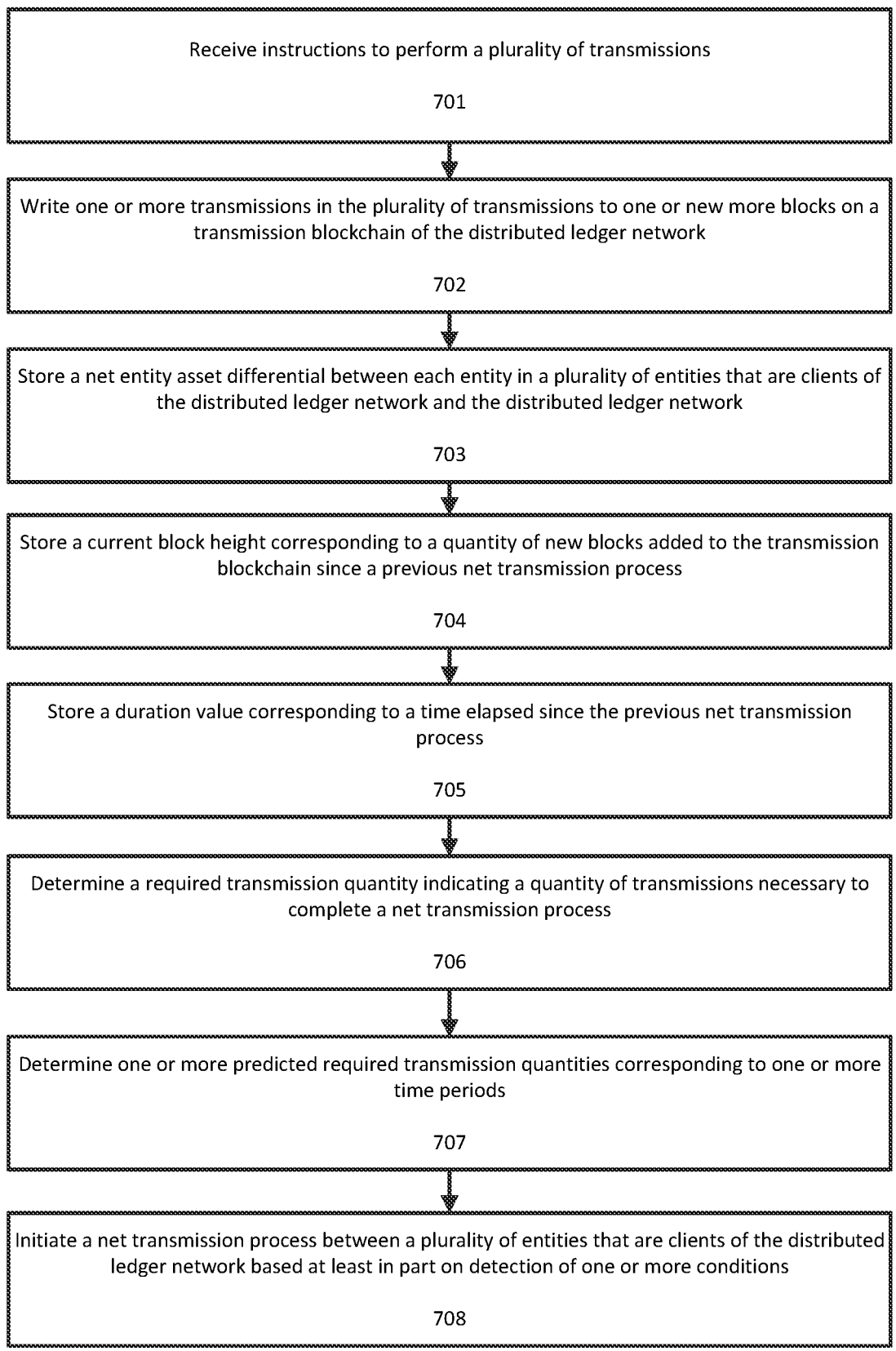
FIG. 7 illustrates a flowchart for a method executed by a controller of a distributed ledger network for initiating a net transmission among a plurality of clients of the distributed ledger network according to an exemplary embodiment.

FIG. 7 illustrates a flowchart for a method executed by a controller of a distributed ledger network for initiating a net transmission among a plurality of clients of the distributed ledger network according to an exemplary embodiment. As discussed previously, the clients of the distributed ledger network are members of the blockchain based distributed ledger network, each having their own blockchain and associated tokens.

At step 701 a plurality of instructions to perform a plurality of transmissions are received. Each transmissions includes instruction parameters for movement of a first quantity of first entity-specific tokens corresponding to a first entity that is a client of the distributed ledger network to a second quantity of second entity-specific tokens corresponding to a second entity that is a client of the distributed ledger network. These transmissions can be inter-institution transfers from one institution that is a member of the network to another institution that is also a member of the network. As each entity/institution has its own blockchain, the first entity-specific tokens can be stored on a first entity-specific blockchain and the second entity-specific tokens can be stored on a second entity-specific blockchain.

At step 702 one or more transmissions in the plurality of transmissions are written to one or more new blocks on a transmission blockchain of the distributed ledger network, each new block storing a subset of the plurality of transmissions. The transmission blockchain can store token-based transmissions between entities/institutions prior to actual settlement of funds between the institutions.

At step 703 a net entity asset differential between each entity in the plurality of entities that are clients of the distributed ledger network and the distributed ledger network is stored. Each net entity asset differential is determined based at least in part on quantities of tokens transferred between a corresponding entity and the plurality of entities during the one or more transmissions. The net entity asset differential indicates the network credit exposure of each entity to the entire network and can be utilized to ensure that no entity has too large of a credit exposure to the entire network.

FIG. 8 illustrates an example of the net entity asset differential determination process according to an exemplary embodiment. As shown in box 801, a series of transmissions between entities (in this case, banks) are received by the network. Each of these transmissions are added to the transmission blockchain. Box 802 illustrates the computation of sending amounts (SSA) and receiving amounts (RSA) for each entity and each transmission. The net outgoing and incoming amounts for each entity are combined to determine an overall net entity asset differential for each entity. For example, as shown in box 802, Bank 1 has an overall net entity asset differential of −900 (900 owed to the bank from the network) and Bank 4 has an overall net entity asset differential of 600 (600 owed to the network).

Returning to FIG. 7, at step 704 a current block height corresponding to a quantity of new blocks added to the transmission blockchain since a previous net transmission (i.e., net settlement) process is stored. Using the example shown in FIG. 8, if a net transmission had been performed prior to receiving the transmissions in block 801, then seven new blocks would be added to the transmission blockchain corresponding to the transmissions in block 801, and the current block height would be seven.

At step 705 of FIG. 7, a duration value corresponding to a time elapsed since the previous net transmission process can also be stored. This duration value tracks the time elapsed and can be used to trigger a new net transmission (settlement) if too much time has passed since the previous net transmission.

At step 706 a required transmission quantity (RTQ) indicating a quantity of transmissions necessary to complete a net transmission process between the plurality of entities that are clients of the distributed ledger network is determined. The required transmission quantity is the minimum quantity of transmissions that would be required to settle the transmissions between entities that have been received since the last net transmission (i.e., since the previous settlement). The required transmission quantity is also referred to earlier in this disclosure as the transfer quotient (TQ).

Using the example of FIG. 8, at the end of transmissions 801, Bank 1 has a net inflow of 900, Bank 2 has a net outflow of 900, Bank 3 has net inflow of 2000, Bank 4 has a net outflow of 600, and Bank 5 has a net outflow of 1400. In this case, net transmission (settlement) can be effected with the following transmissions:
  900 from Bank 2 to Bank 1
  600 from Bank 4 to Bank 3
  1400 from Bank 5 to Bank 3

Therefore, the required transmission quantity, or RTQ, for the transmissions in box 801 would be three (since three transmissions are required to effect the settlement).

Returning to FIG. 7, one or more predicted required transmission quantities (PRTQ) corresponding to one or more time intervals are determined. Each predicted required transmission quantity indicates a predicted quantity of transmissions necessary to complete a net transmission process between the plurality of entities that are clients of the distributed ledger network after a corresponding time interval. The predicted required transmission quantity is also referred to earlier in this disclosure as the predicted transfer quotient (PTQ).

As discussed previously, the PRTQs can be determined for multiple different time intervals, such as 60 minutes, 2 hours, 4 hours, 8 hours, etc. The purpose of each of the PRTQs is to estimate how many transmissions are likely to occur over a corresponding time period and to utilize this data in determining when to trigger net transmission, as will be discussed in greater detail below.

Figure 9:
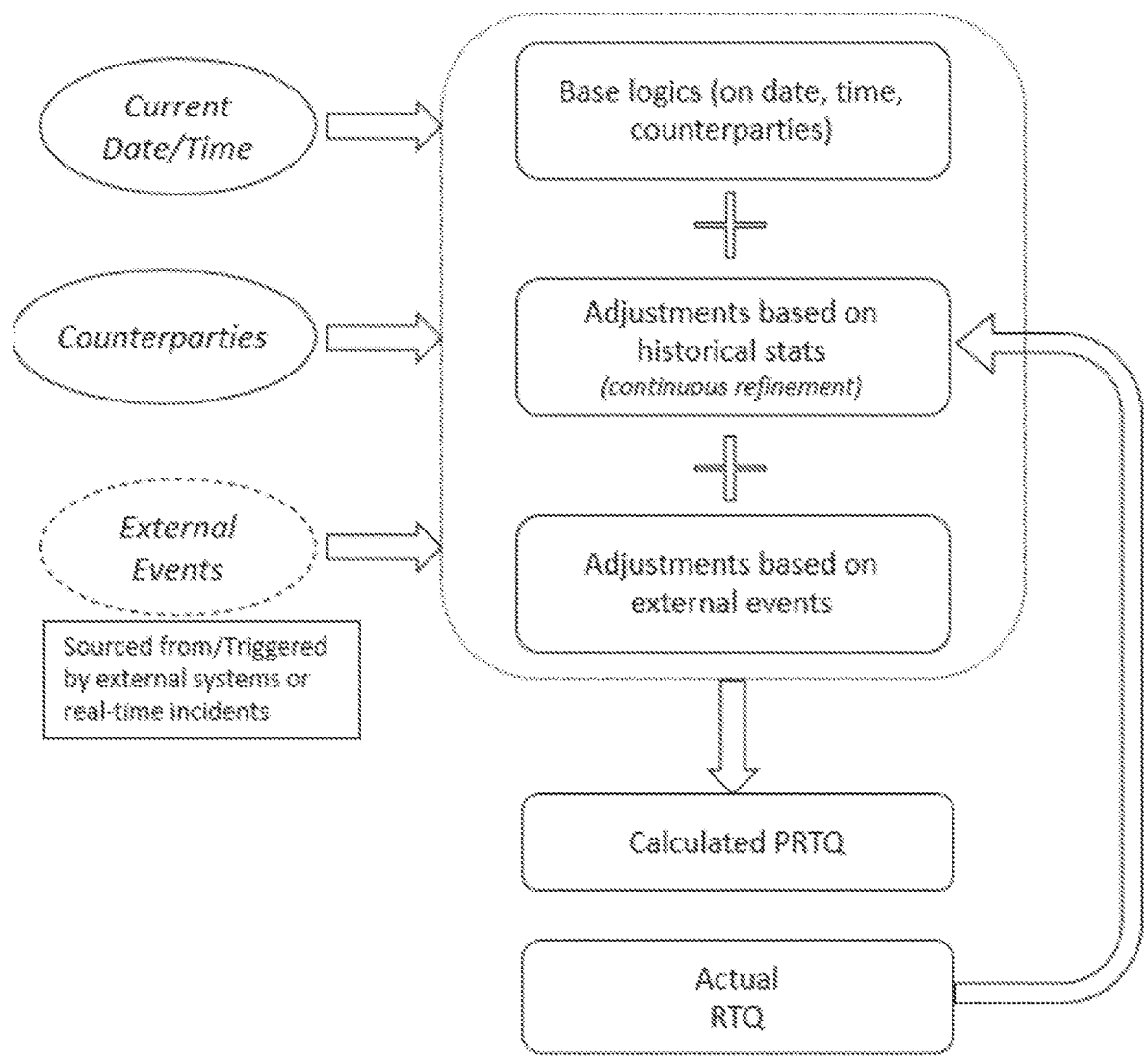
FIG. 9 illustrates a chart showing the different factors that are used to determine each PRTQ, according to an exemplary embodiment.

FIG. 9 illustrates a chart showing the different factors that are used to determine each PRTQ, according to an exemplary embodiment. As shown in the chart, the determination of each PRTQ can take inputs such as date/time inputs, counterparties interaction, and external events, as well as historical data and records feedback, such as the average transmissions on certain dates, days of the week, or time periods. Counterparties interaction can include predictive logics governing the transaction processing between two specific counterparties (such as pre-set limits, client segments, EOD processing time, etc.). Date/time inputs can include (predicting incoming payments based on locale, time-zone difference, cut-offs, holidays, special activity days, etc.). Feedback from historical information can include feedback of the actual required transmission quantity and intelligence to derive future calculation and adjustment of PRTQ. External event triggers can include one or more APIs and/or feeds that are able to accept external event information to adjust the calculation of PRTQ. External events can be systematic feeds or real-time incidents. The determination of each PRTQ can include determining probabilities and estimates based on date, time, counterparties, adjusting estimates based on historical data, and adjusting estimates based upon external events. Additionally, actual RTQ or previous RTQ values can be fed back into the system to improve predictions. All of these factors together can be utilized to compute PRTQ values for particular time intervals.

Returning to FIG. 7, at step 708 a net transmission process is initiated between a plurality of entities that are clients of the distributed ledger network based at least in part on detection of one or more conditions in a plurality of conditions. The plurality of conditions can include, for example, the duration value exceeding a threshold duration value, the current block height meeting or exceeding a threshold block height, the net entity asset differential exceeding a threshold entity asset differential, and/or the required transmission quantity matching or exceeding the one or more predicted required transmission quantities. The threshold duration value, threshold block height, and threshold entity asset differential can be set by an administrator, set to some default value, adjusted based on risk tolerances and relevant regulations, or determined automatically (e.g., to minimize risk and maximize efficiency).

For example, the step of initiating a net transmission process between a plurality of entities that are clients of the distributed ledger network based at least in part on detection of one or more conditions in a plurality of conditions can include initiating the net transmission process between the plurality of entities that are clients of the distributed ledger network based at least in part on a determination that at least one net entity asset differential exceeds the threshold entity asset differential. The net entity asset differential exceeding the threshold entity asset differential can indicate that the credit exposure for at least one entity is too high of a value to maintain without effecting net transmission (settlement) of the outstanding transmissions on the transmission blockchain.

The step of initiating a net transmission process between a plurality of entities that are clients of the distributed ledger network based at least in part on detection of one or more conditions can also be related to the determined predicted transfer quotients. The step (707) of determining one or more predicted transfer quotients corresponding to one or more time intervals can include determining a plurality of predicted required transmission quantities corresponding to a plurality of time intervals. The plurality of predicted required transmission quantities can then be utilized when determining whether to initiate net transmission.

Figure 10:
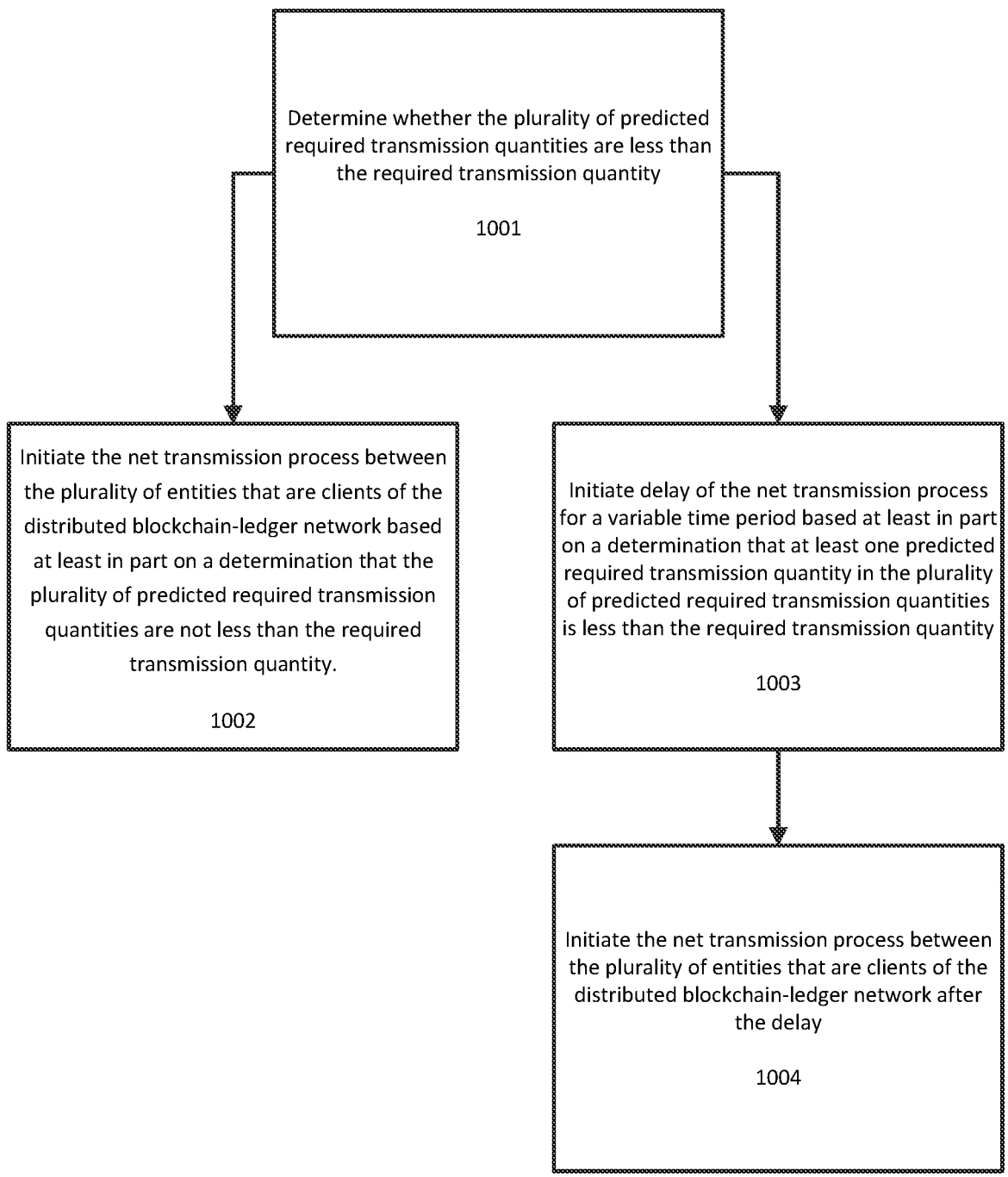
FIG. 10 illustrates a flowchart for initiating net transmission between a plurality of entities that are clients of the distributed ledger network based at least in part on detection of one or more conditions in a plurality of conditions according to an exemplary embodiment.

FIG. 10 illustrates a flowchart for initiating net transmission between a plurality of entities that are clients of the distributed ledger network based at least in part on detection of one or more conditions in a plurality of conditions according to an exemplary embodiment.

At step 1001 it is determined whether that the plurality of predicted required transmission quantities (PRTQs) are less than the required transmission quantity (RTQ). In other words, it is determined whether the number of transmissions currently required to effect net transmission (i.e., settlement) is greater than or equal to the number of transmissions that will be required to effect net transmission after some future time interval, according to the prediction models.

If the plurality of predicted required transmission quantities (PRTQs) are not less than the required transmission quantity (RTQ), then at step 1002 the net transmission process is initiated between the plurality of entities that are clients of the distributed ledger network based at least in part on a determination that the plurality of predicted required transmission quantities are not less than the required transmission quantity. Net transmission is initiated in this case, as the current RTQ exceeds the PRTQs, and there is no benefit to waiting to effect net transmission.

If at least one of the plurality of predicted required transmission quantities is less than the required transmission quantity, then at step 1003 a delay of the net transmission process is initiated for a variable time period based at least in part on a determination that at least one predicted required transmission quantity in the plurality of predicted required transmission quantities is less than the required transmission quantity. The delay and variable time period can be determined dynamically, based on a number of factors. The variable time period can be a configurable threshold based on, for example, user preferences, risk tolerances, the difference between a particular predicted required transmission quantity that is less than the required transmission quantity and the required transmission quantity, or other factors. At step 1004 the net transmission process between the plurality of entities that are clients of the distributed ledger network is initiated after the delay and the variable time period.

Figure 11:
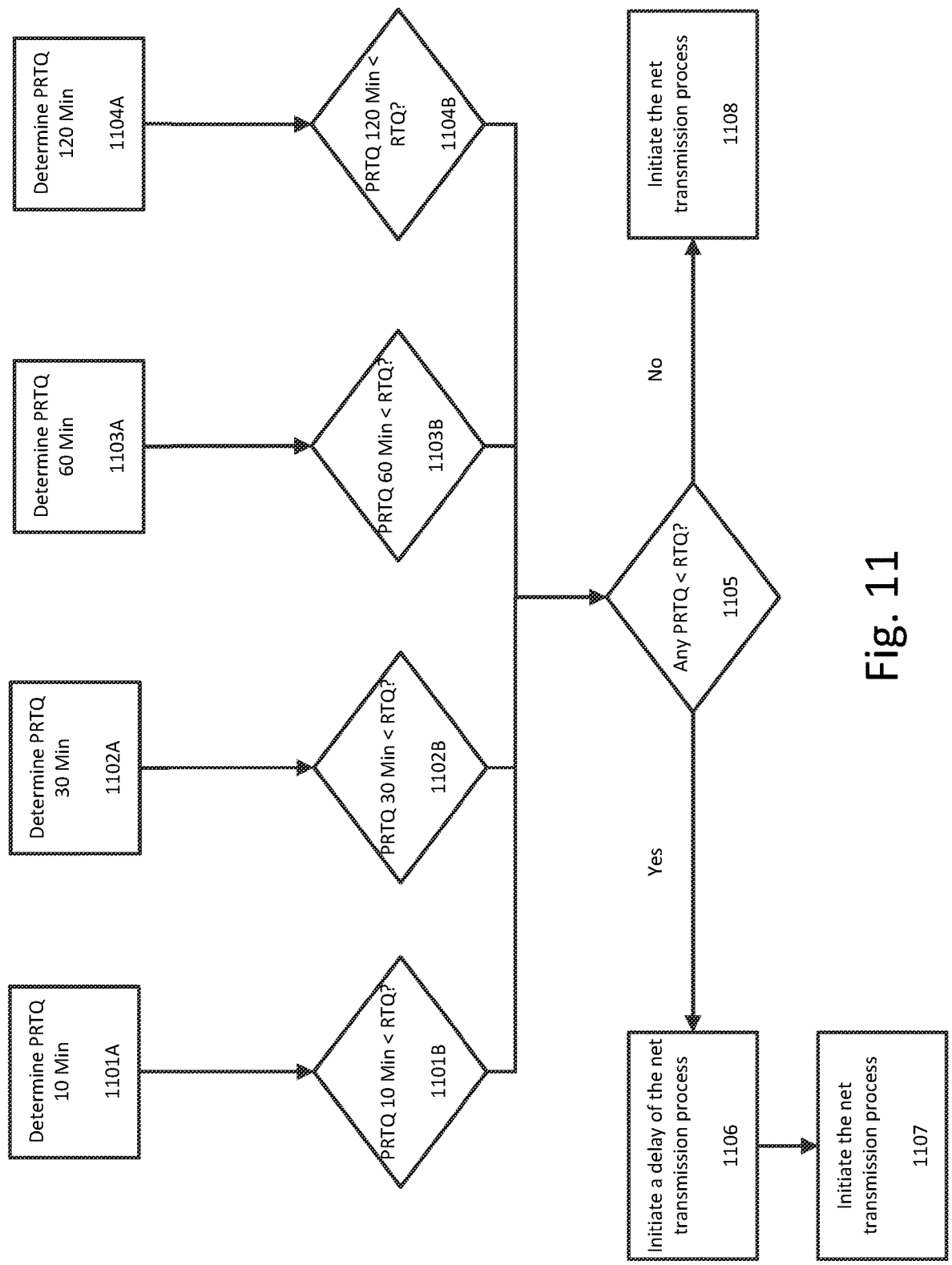
FIG. 11 illustrates an example of the PRTQ determination and delay implementation process according to an exemplary embodiment.

FIG. 11 illustrates an example of the PRTQ determination and delay implementation process according to an exemplary embodiment. At steps 1101A-1104A, PRTQ values are determined for multiple different time intervals, including 10 minutes, 30 minutes, 60 minutes, and 120 minutes. At steps 1101B-1104B it is determined whether each of the determined PRTQ values is less than the current RTQ value. At step 1105 it is determined whether any PRTQ is less than the current RTQ value. If all of the PRTQs are greater than or equal to the RTQ, then at step 1108 the net transmission process is initiated. Otherwise, if any PRTQ is less than the RTQ, then at step 1106 a delay of the net transmission process is initiated for a variable time period, as discussed above. After this delay, at step 1007 the net transmission process is initiated.

Figure 12A:
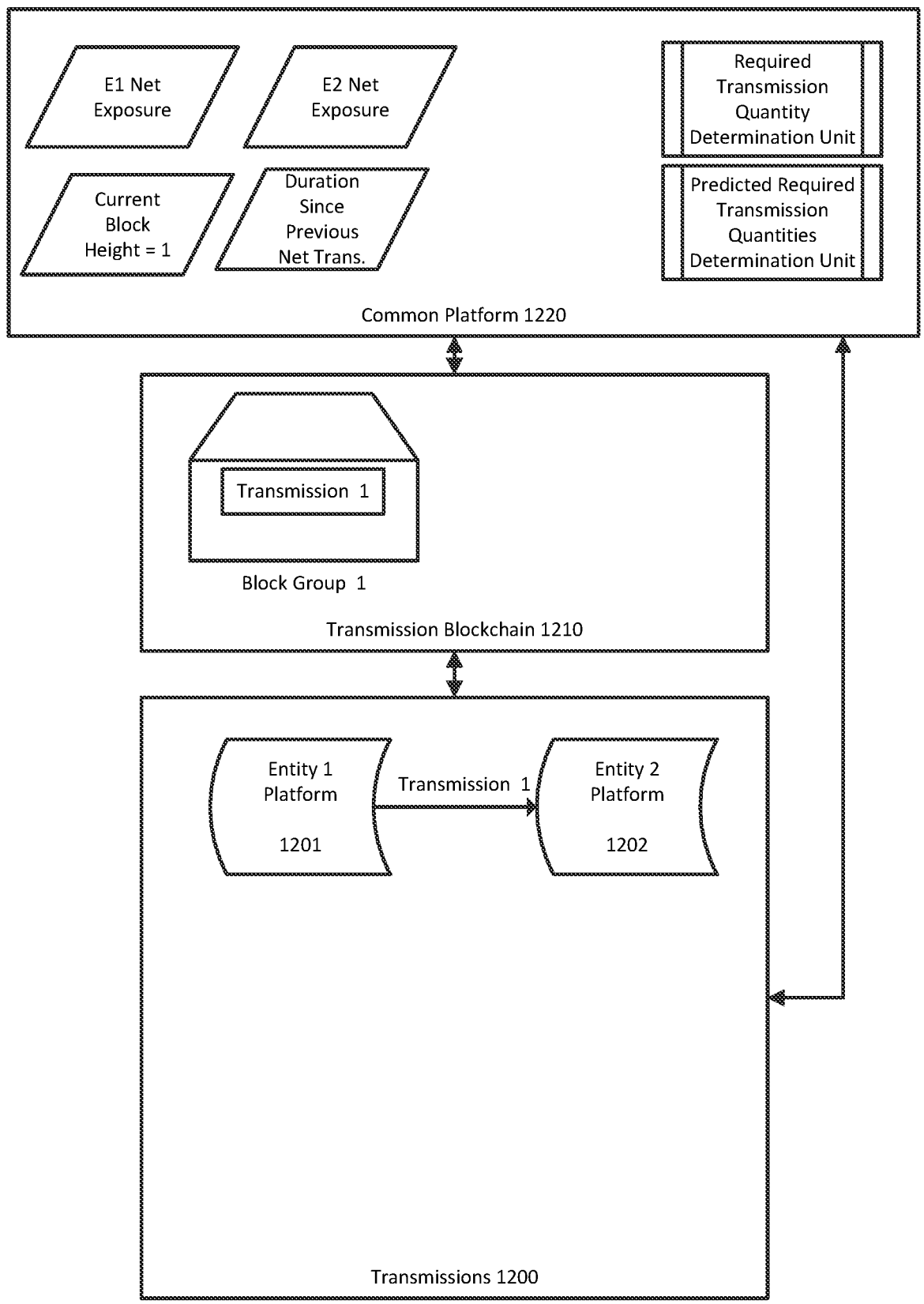
FIGS. 12A-12C illustrate an example of the net transmission initiation process according to an exemplary embodiment.
Figure 12B:
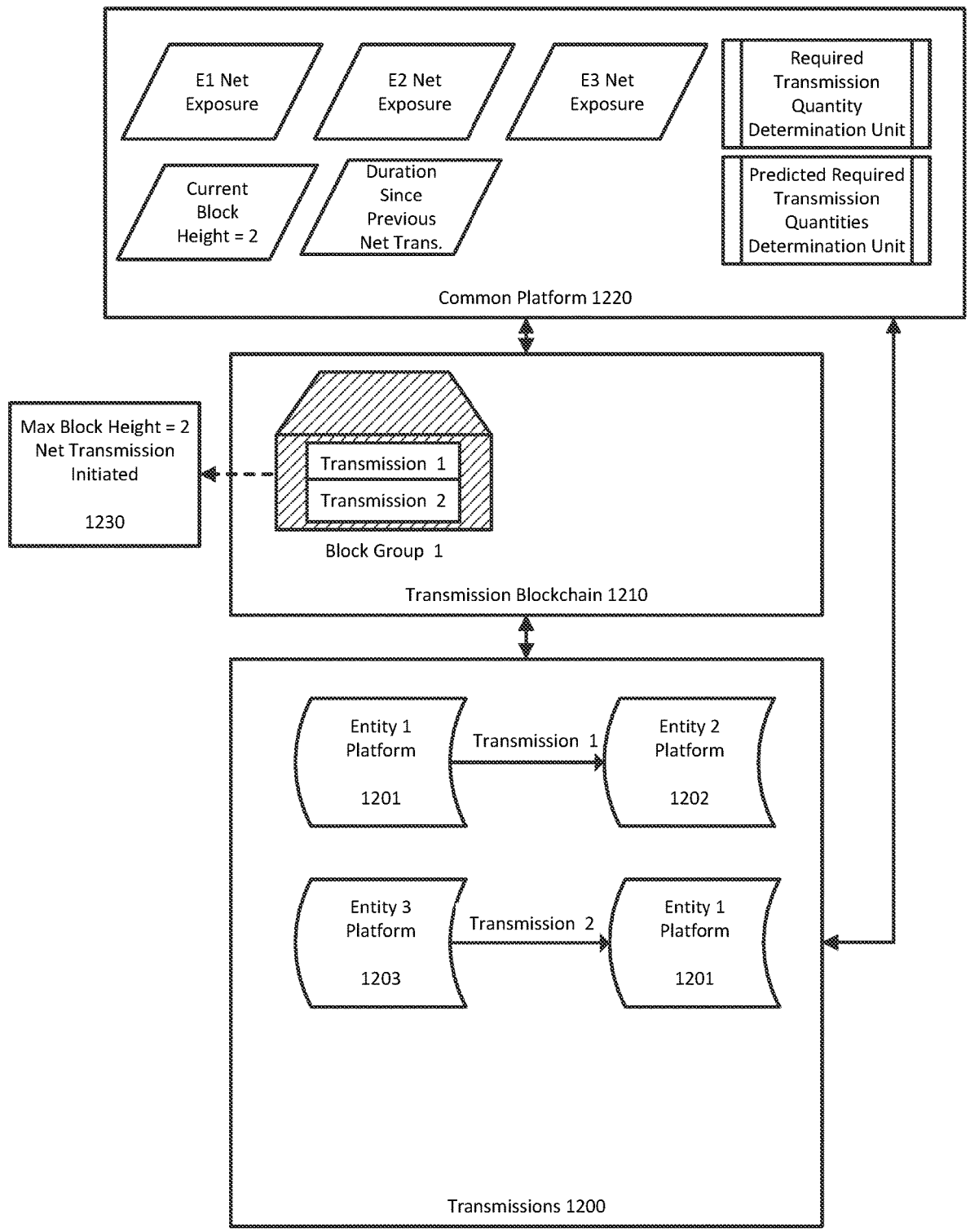
Figure 12C:
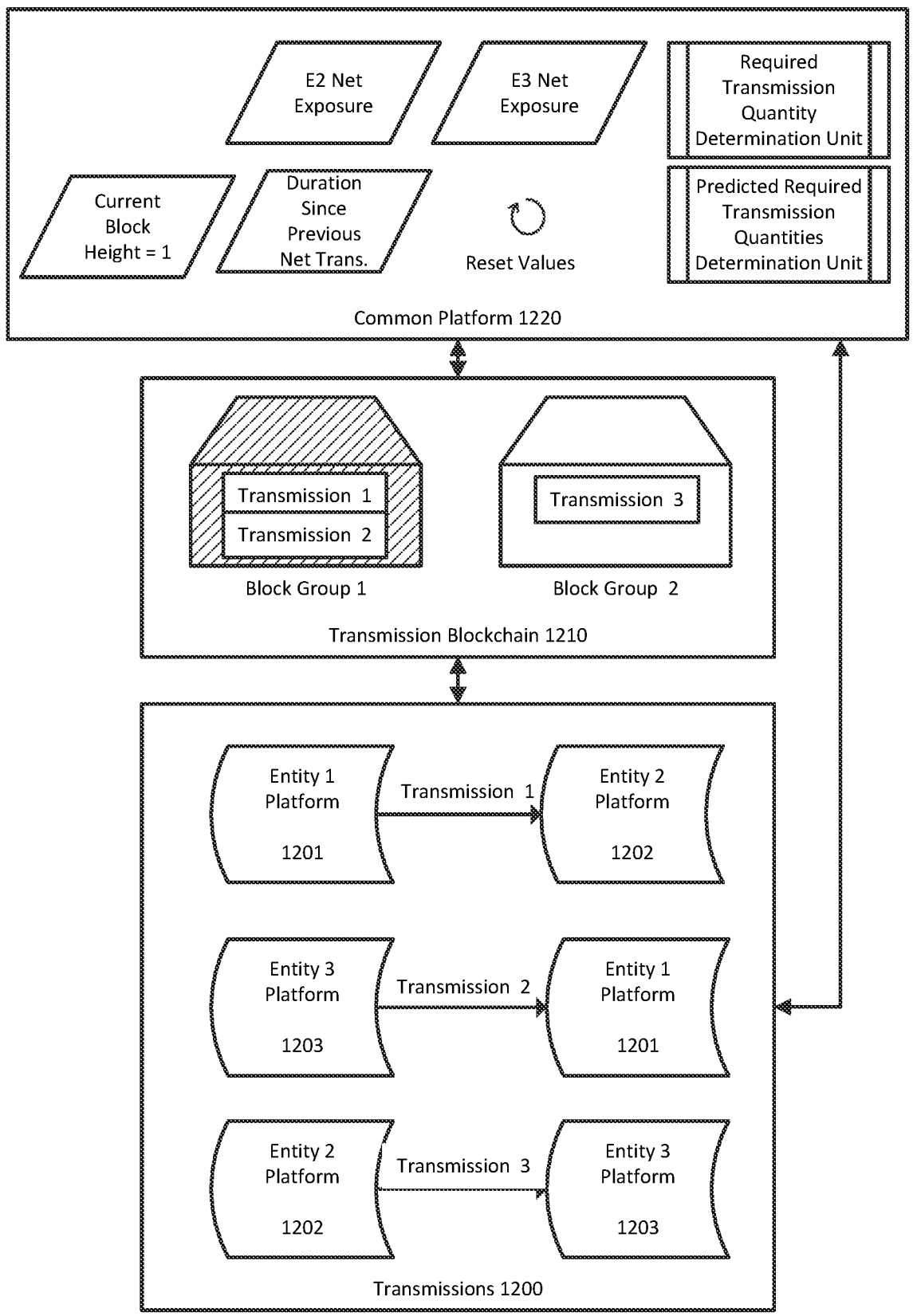

FIGS. 12A-12C illustrate an example of the net transmission initiation process according to an exemplary embodiment. As shown in FIG. 12A, the system includes a common platform 1220 of the distributed ledger network that tracks the net exposure (net entity asset differential) for each entity that has made transmissions since the previous net transmission. In this case, that includes a net exposure for Entity 1 (1201) (E1 Net Exposure) and a net exposure for Entity 2 (1202) (E2 Net Exposure). The common platform 1220 also tracks the current block height of the transmission blockchain (which is currently 1 in FIG. 12A) and the duration since a previous net transmission. Additionally, the common platform 1220 includes a required transmission quantity determination unit that computes the current required transmission quantity to effect net transmission (net settlement) and a predicted required transmission quantities determination unit that utilizes the predictive logic previously discussed to determine one or more PRTQs.

Also shown in FIG. 12A are the transmissions 1200 that have been performed on the network. In this case, a single transmission has occurred between entity 1 (1201) and entity 2 (1202). Additionally, FIG. 12A illustrates a transmission blockchain 1210 storing the transmissions performed since the last net transmissions. The transmission blockchain stores new transmissions as new blocks on the transmission blockchain. In this case, transmission 1 has been added as a new block to the blockchain, resulting in a current block height of one. The blocks are shown grouped into a block group, in order to delineate those blocks for which net transmission has been performed from blocks for which net transmission has not been performed. In this case, there is a single block group (Block Group 1) containing a single block (Transmission 1) correspond to the transmission between Entity 1 (1201) and Entity 2 (1202). The grouping of transmissions into a block group is for the purpose of explanation only and is used to refer to transmissions that have been processed but for which net transmission/net settlement has not been effected yet.

FIG. 12B illustrates the system of FIG. 12A after receiving a second transmission between Entity 3 (1203) and Entity 1 (1201), as shown in the transmissions box 1200. The common platform 1220 will now also track the net entity asset differential (i.e., net exposure) for Entity 3 (E3 Net Exposure). Additionally, the second transmission is added as a new block to the transmission blockchain 1210, resulting in a current block height of 2.

For the purpose of this example, it is assumed that the maximum block height (i.e., the threshold block height) is two. Since the current block height of two meets or exceeds this threshold block height of two, net transmission is initiated, as shown in box 1230. This net transmission will result in transmission 1 and transmission 2 being settled by the system.

FIG. 12C illustrates the system of FIG. 12B after receiving a third transmission between Entity 2 (1202) and Entity 3 (1203). As shown in the transmission blockchain 1210, the third transmission is added to the transmission blockchain as a new block. It is shown within a new block group (Block Group 2) to distinguish it from Block Group 1, for which net transmission has already been effected, but it is understood that the term block group is used for the purposes of explanation only, to delineate the transmissions for which net transmission has been effected from the transmissions for which net transmission has not been effected.

Additionally, since transmission 3 is the first transmission since net transmission was effected, the values on the common platform 1220 are reset. The current block height is set to one (corresponding to the number of blocks in block group 2), the duration is reset to the duration since the previous net transmission, and the required transmission quantities and predicted required transmission quantities are determined again. Since transmission 3 involves only Entity 2 (1202) and Entity 3 (1203), the common platform tracks the net exposure for each of these (E2 Net Exposure and E3 Net Exposure) but not for Entity 1 (1201), which has not had any transmissions since net transmission was effected.

Figure 13:
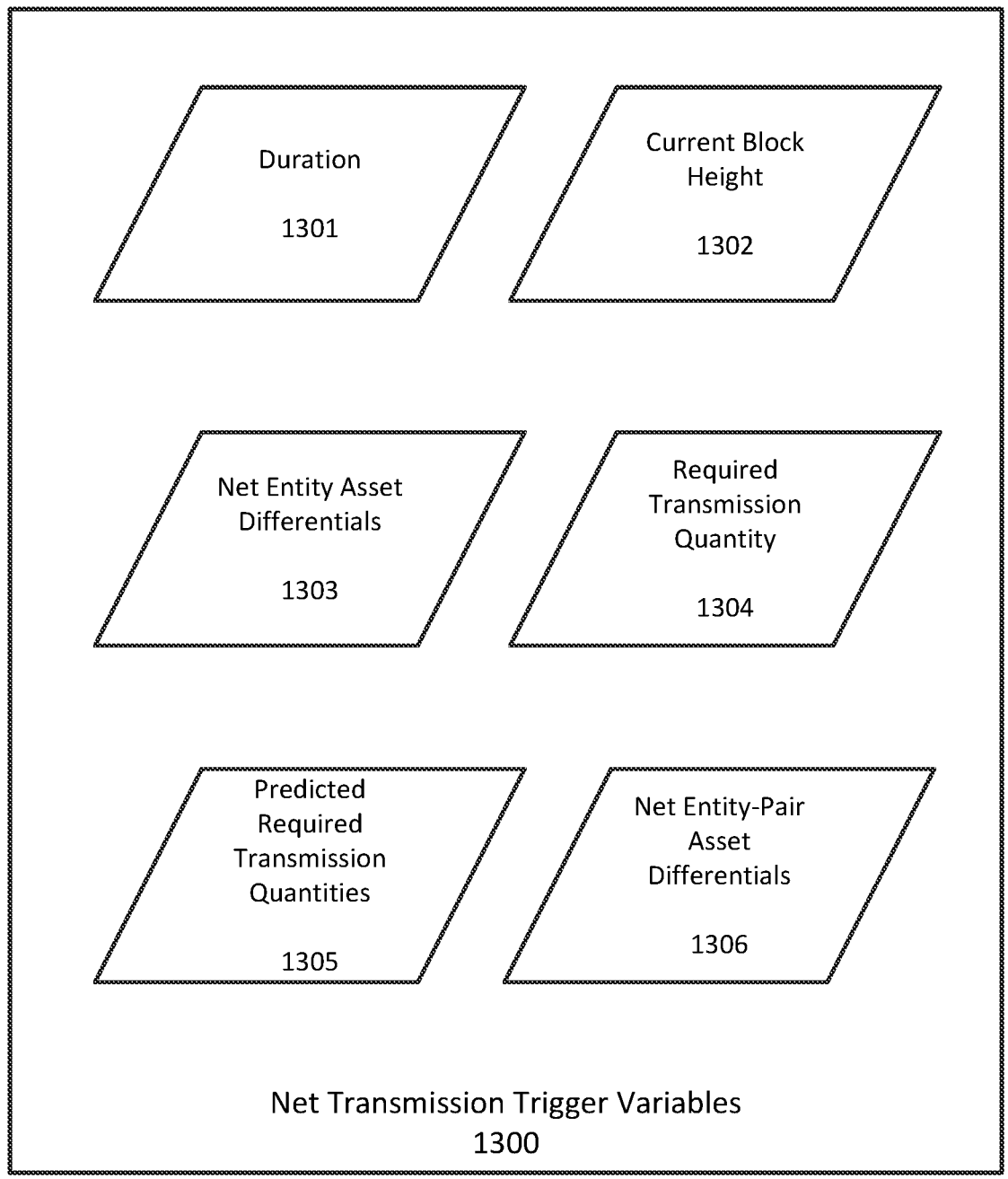
FIG. 13 illustrates variables that can be used to trigger net transmission according to an exemplary embodiment.

FIG. 13 illustrates variables that can be used to trigger net transmission according to an exemplary embodiment. As shown in FIG. 13, the net transmission trigger variables 1300 include duration since the previous net transmission was effected 1301. In this case, a new net transmission can be effected if enough time has passed since the previous net transmission.

Net transmission trigger variables 1300 also include the current block height 1302. As discussed previously, the current block height 1302 can be compared to a threshold block height to determine whether to initiate net transmission.

Net transmission trigger variables 1300 also include the required transmission quantity 1304 and one or more predicted required transmission quantities 1305. As explained earlier, net transmission can be initiated based at least in part on the required transmission quantity matching or exceeding the one or more predicted required transmission quantities.

Net transmission trigger variables 1300 further include net entity asset differentials 1303, which track the exposure of each entity to the network as a whole. This is based on the transmissions on the transaction blockchain that have not yet been settled through the net transmission process. When the net entity asset differential for any entity exceeds a predetermined value or threshold, this condition can also result in initiation of the net transmission process, in order to reduce the overall exposure.

As shown in the FIG. 13, the system can also store, as part of the net transmission trigger variables 1300, at least one net entity-pair asset differential 1306 between at least one pair of entities in a plurality of entities that are clients of the distributed ledger network. The at least one net entity-pair asset differential is determined based at least in part on quantities of tokens transferred between at least two or more entities in the plurality of entities during transmissions and measures the counterparty exposure between pairs of parties. Unlike the net entity asset differentials, which track exposure for each entity to the network as a whole, the net entity-pair asset differentials track exposure for each entity to other entities.

When net entity-pair asset differentials are utilized, the step (708 in FIG. 7) of initiating a net transmission process between a plurality of entities that are clients of the distributed ledger network based at least in part on detection of one or more conditions in a plurality of conditions can include initiating the net transmission process between the plurality of entities that are clients of the distributed ledger network based at least in part on a determination that at least one net entity-pair asset differential in the plurality of net entity-pair asset differentials exceeds a threshold entity-pair asset differential.

Figure 14A:
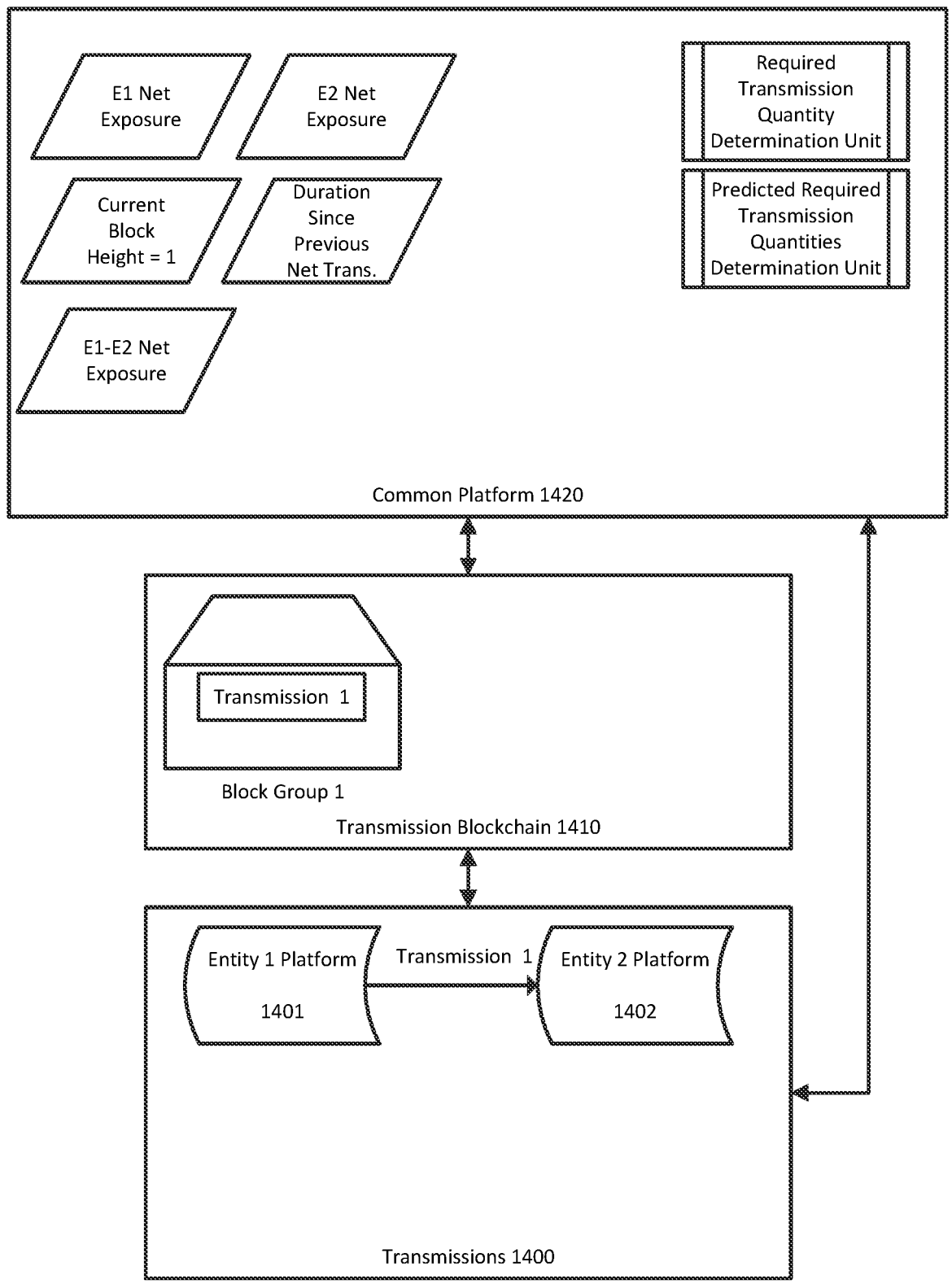
FIGS. 14A-14B illustrate an example of net entity-pair asset differential tracking as part of the system for initiating a net transmission according to an exemplary embodiment.
Figure 14B:
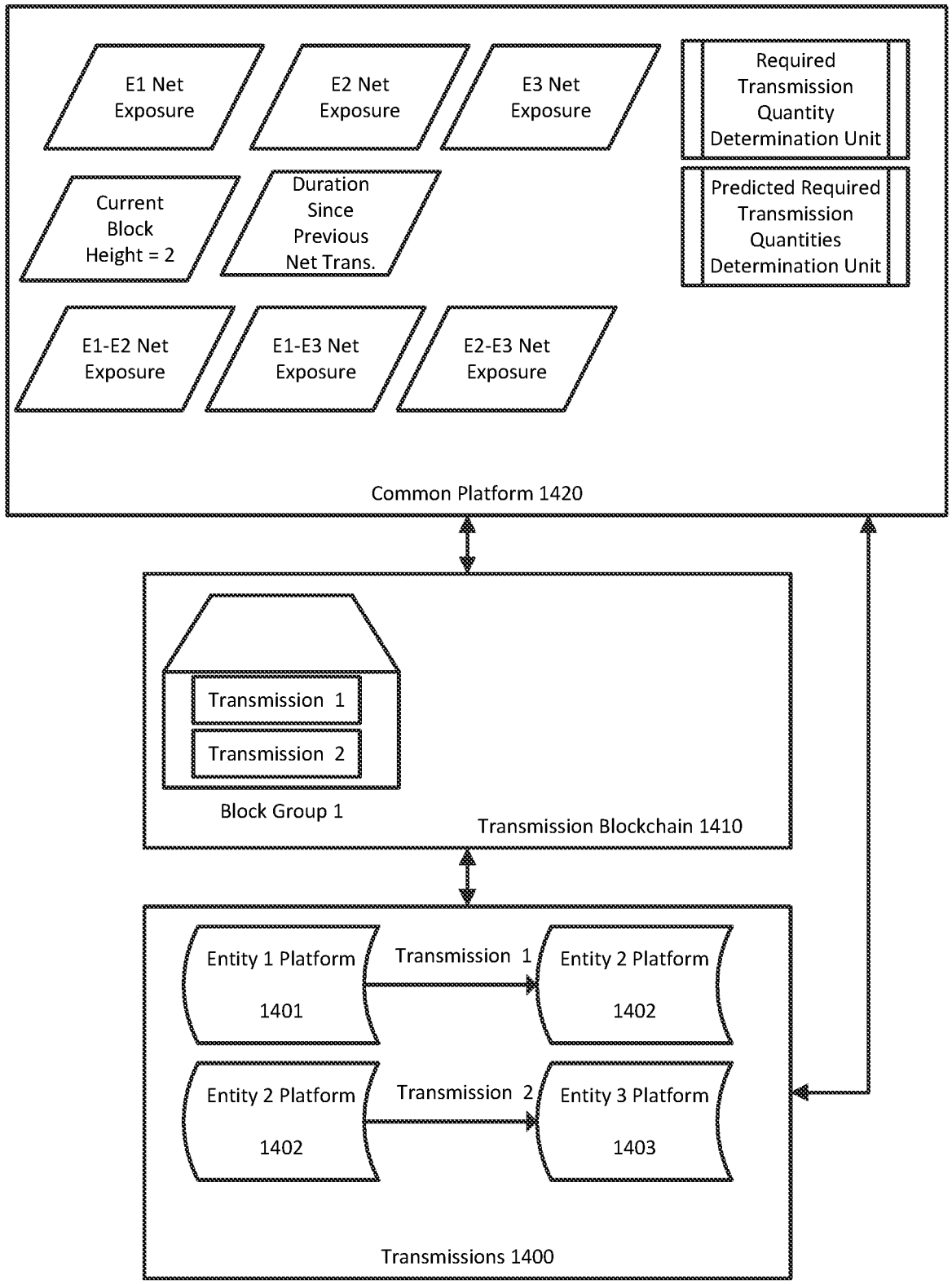

FIGS. 14A-14B illustrate an example of net entity-pair asset differential tracking as part of the system for initiating a net transmission according to an exemplary embodiment. FIG. 14A is similar to FIG. 12A and includes a transmissions box 1400 showing transmissions, a transmission blockchain 1410 with each transmission written to a new block, and a common platform 1420 that tracks the net exposure (net entity asset differential) of each entity, the current block height, duration since a previous net transmission, and RTQ and PRTQ values.

Additionally, the common platform 1420 also tracks the net entity-pair asset differentials for received transmissions. In this case, the only transmission is between Entity 1 (1401) and Entity 2 (1402), so the only net entity-pair asset differential that is tracked is the E1-E2 Net Exposure.

FIG. 14B illustrates the system of FIG. 14A after receipt of a second transmission between Entity 2 (1402) and Entity 3 (1403). The second transmission is shown in box 1400 and added to the transmission blockchain 1410. Note that while it is not shown in this figure, if the block height threshold is two, then this addition would result in initiation of net transmission (settlement). The current block height value in common platform 1420 is also updated to indicate a block height of two.

As shown in common platform 1420, the net entity asset differential is tracked for each of the three entities (E1 Net Exposure, E2 Net Exposure, E3 Net Exposure). Additionally, the net entity-pair asset differential for Entity 1 and Entity 2 (E1-E2 Net Exposure) is updated. Since the second transmission introduces Entity 3 (1403) to the transmission blockchain, it is also necessary to create and track entity-pair asset differentials involving Entity 3. This results in the tracking of net entity-pair asset differential for Entity 1 and Entity 3 (E1-E3 Net Exposure) and Entity 2 and Entity 3 (E2-E3 Net Exposure).

An advantage of the present system is that the usage of a transmission blockchain storing transmissions that have been processed in individual blocks of a block chain permits net transmission/net settlement of processed transmissions on a rolling basis, such that net transmission can be effected without having to delay processing of new transmissions/transactions while the net transmission/net settlement process completes.

Figure 15:
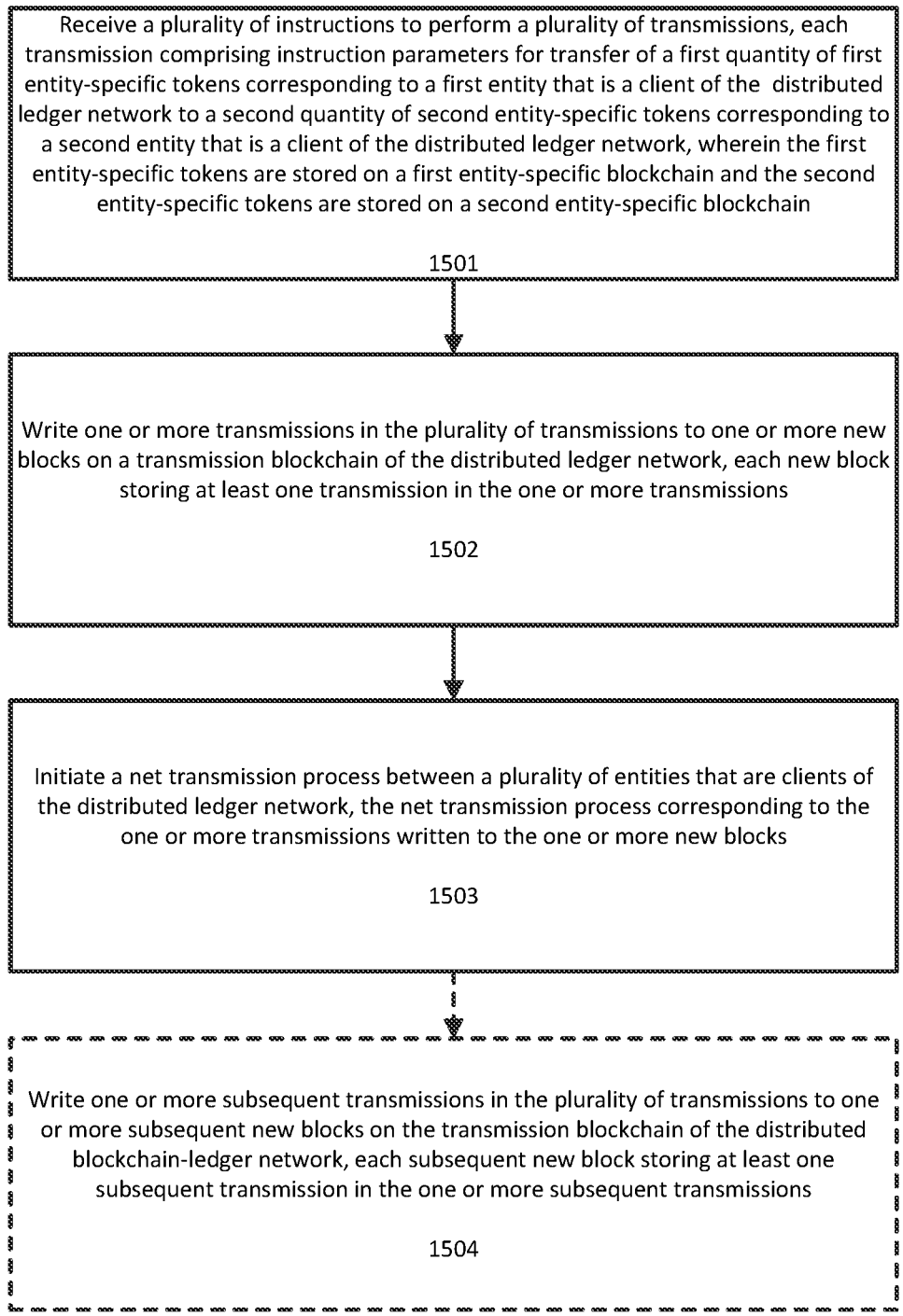
FIG. 15 illustrates a flowchart for uninterrupted transmission processing and continuous net transmission among a plurality of clients of a distributed ledger network according to an exemplary embodiment.

FIG. 15 illustrates a flowchart for uninterrupted transmission processing and continuous net transmission among a plurality of clients of a distributed ledger network according to an exemplary embodiment. The steps shown in FIG. 15 can be performed by a controller of the distributed ledger network.

At step 1501 a plurality of instructions to perform a plurality of transmissions are received. Each transmission includes instruction parameters for transfer of a first quantity of first entity-specific tokens corresponding to a first entity that is a client of the distributed ledger network to a second quantity of second entity-specific tokens corresponding to a second entity that is a client of the distributed ledger network. These transmissions can be inter-institution transfers from one institution that is a member of the network to another institution that is also a member of the network. As each entity/institution has its own blockchain, the first entity-specific tokens can be stored on a first entity-specific blockchain and the second entity-specific tokens can be stored on a second entity-specific blockchain.

At step 1502 one or more transmissions in the plurality of transmissions are written to one or more new blocks on a transmission blockchain of the distributed ledger network, each new block storing at least one transmission in the one or more transmissions. The transmission blockchain can store token-based transmissions between entities/institutions prior to actual settlement of funds between the institutions.

At step 1503 a net transmission process is initiated between a plurality of entities that are clients of the distributed ledger network, the net transmission process corresponding to the one or more transmissions written to the one or more new blocks. The step of initiating the net transmission process is described in greater detail below, with reference to FIGS. 16-19. As discussed earlier in this application with respect to net transmission, the net transmission process can be initiated based at least in part on detection of one or more conditions in a plurality of conditions. The plurality of conditions can include, for example, a duration value (since a previous net transmission) exceeding a threshold duration value, the current block height meeting or exceeding a threshold block height, a net entity asset differential exceeding a threshold entity asset differential, a required transmission quantity matching or exceeding the one or more predicted required transmission quantities, and/or at least one net entity-pair asset differential exceeding a threshold entity-pair asset differential. The threshold duration value, threshold block height, threshold entity asset differential, and/or threshold entity-pair asset differential can be set by an administrator, set to some default value, adjusted based on risk tolerances and relevant regulations, or determined automatically (e.g., to minimize risk and maximize efficiency).

The controller can be configured to continue processing transmissions/transactions during the net transmission/net settlement process, without requiring any pause for the net transmission process to complete. In particular, the controller can be configured to write one or more subsequent transmissions in the plurality of transmissions to one or more subsequent new blocks on the transmission blockchain prior to termination of the net transmission process.

At optional step 1504 one or more subsequent transmissions in the plurality of transmissions are written to one or more subsequent new blocks on the transmission blockchain of the distributed blockchain-ledger network, each subsequent new block storing at least one subsequent transmission in the one or more subsequent transmissions. As discussed above, the one or more subsequent transmissions in the plurality of transmissions are written to the one or more subsequent new blocks on the transmission blockchain prior to completion of the net transmission process.

Figure 16:
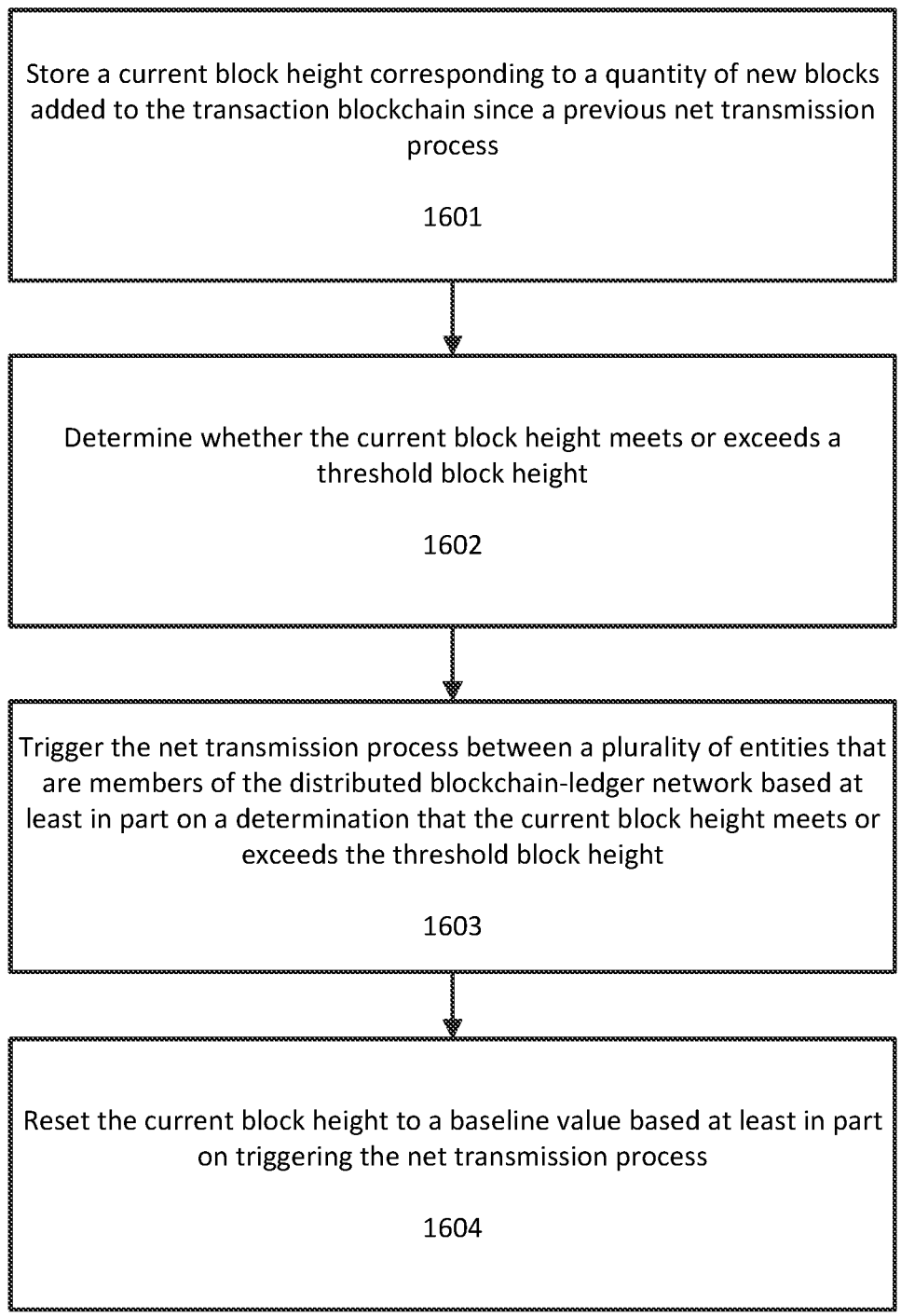
FIG. 16 illustrates a flowchart for initiating a net transmission process between a plurality of entities that are clients of the distributed blockchain-ledger network according to an exemplary embodiment.

FIG. 16 illustrates a flowchart for initiating a net transmission process between a plurality of entities that are clients of the distributed blockchain-ledger network according to an exemplary embodiment. At step 1601 a current block height is stored corresponding to a quantity of new blocks added to the transaction blockchain since a previous net transmission process. For example, if three transmissions were processed since a previous net transmission process, these three transmissions would be stored in three new blocks on the transaction blockchain and the current block height would be three.

At step 1602 a determination is made regarding whether the current block height meets or exceeds a threshold block height. The threshold block height corresponds to a minimum block height required to initiate the net transmission/net settlement process. The threshold block height can be a fixed value, set by an administrator of the network, or a dynamic value that changes based on one or more variables, such as time of day, day of the week, calendar date, week, month, quarter, network traffic and transmissions on the network. For example, the threshold block height can be dynamically adjusted based on the average frequency of transmissions on particular days.

At step 1603 the net transmission process between the plurality of entities that are clients of the distributed blockchain-ledger network is triggered based at least in part on a determination that the current block height meets or exceeds the threshold block height. The net transmission process is described in greater detail below and results in settlement of the transmissions/transactions stored on the transaction blockchain that have not previously been settled.

At step 1604 the current block height is reset to a baseline value based at least in part on initiating the net transmission process. The baseline value is typically zero. The current block height would then continue to be incremented from this baseline value after processing additional transmissions, as described above.

Figure 17A:
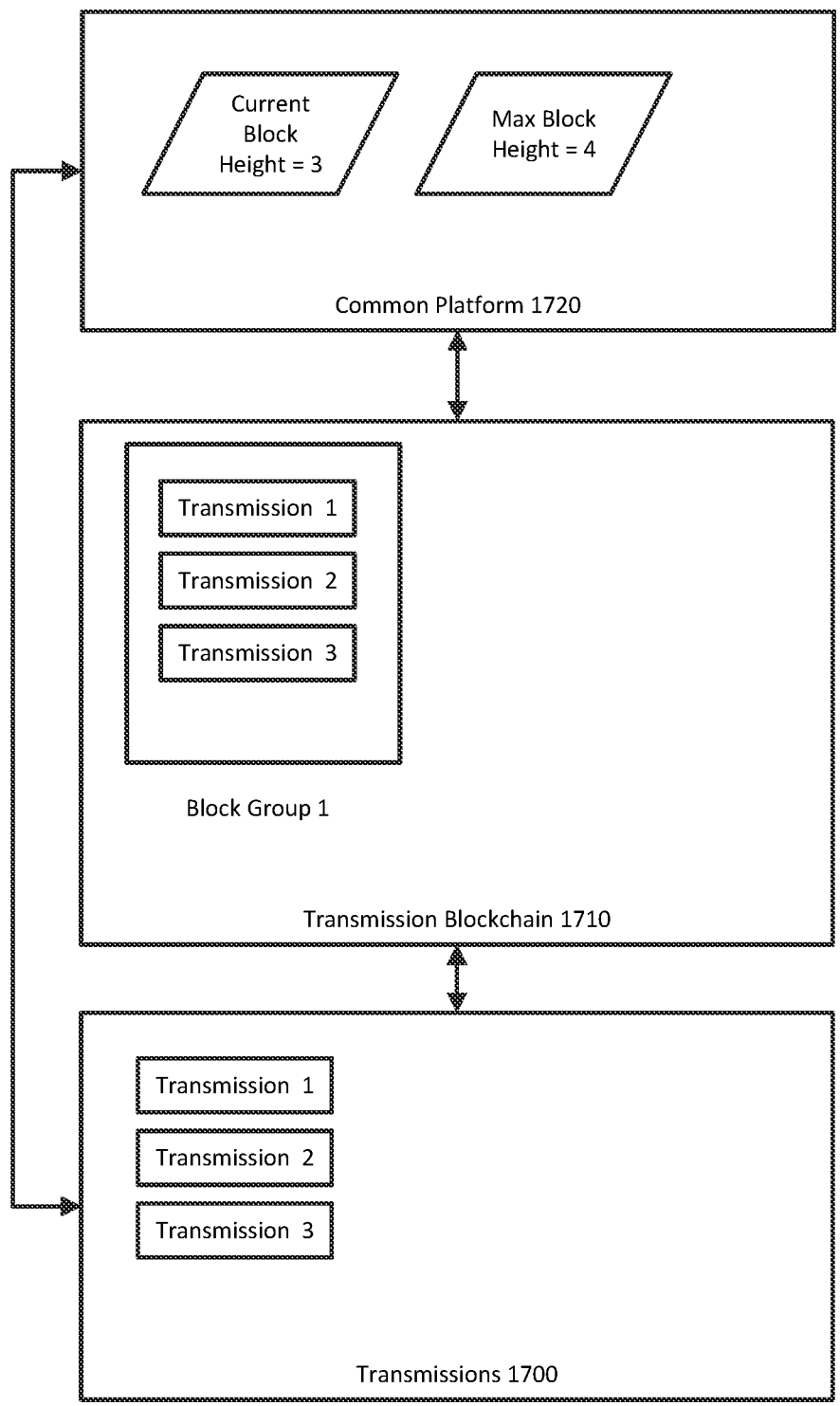
FIGS. 17A-17C illustrate an example of uninterrupted transmission processing and continuous net transmission according to an exemplary embodiment.
Figure 17B:
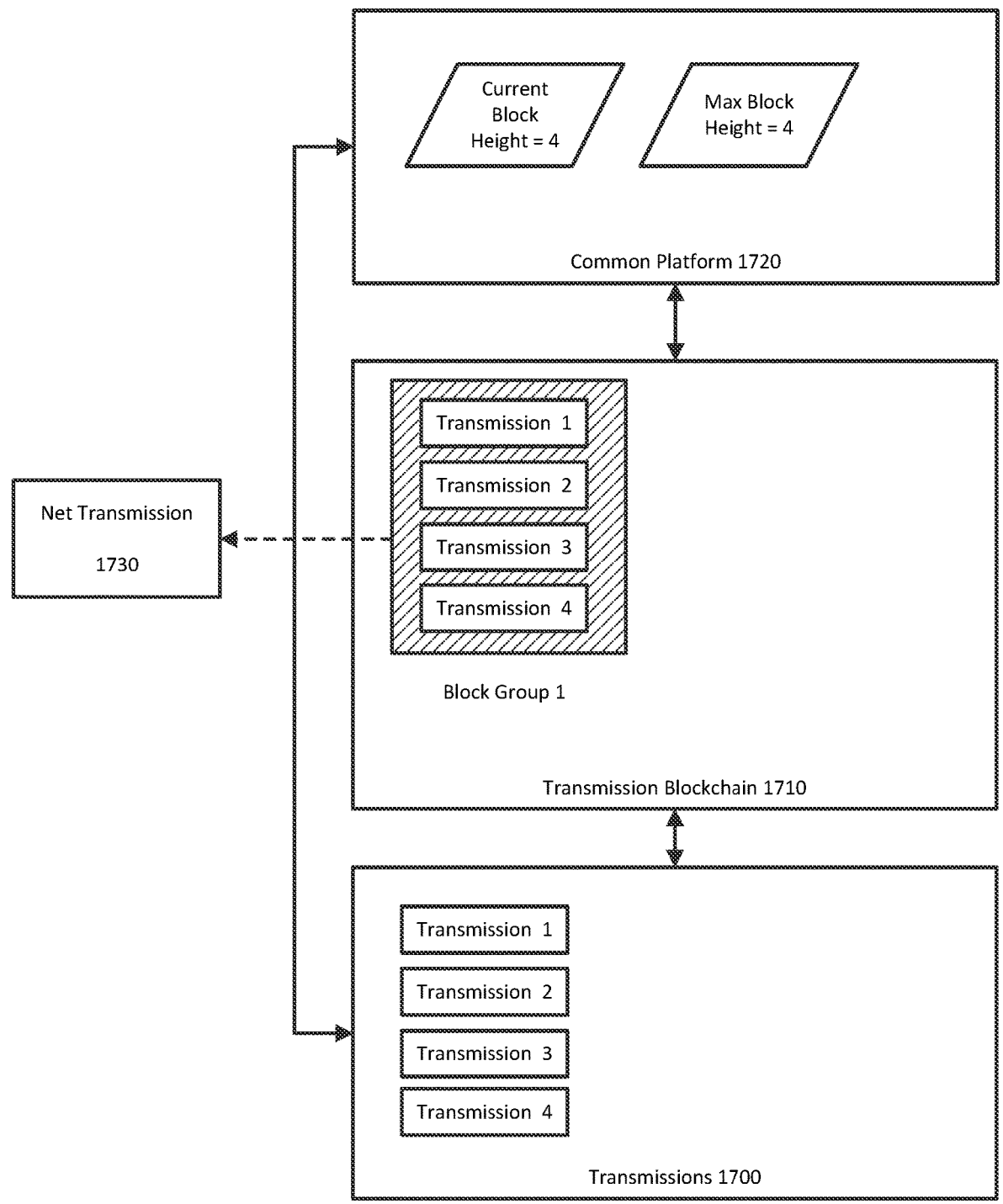
Figure 17C:
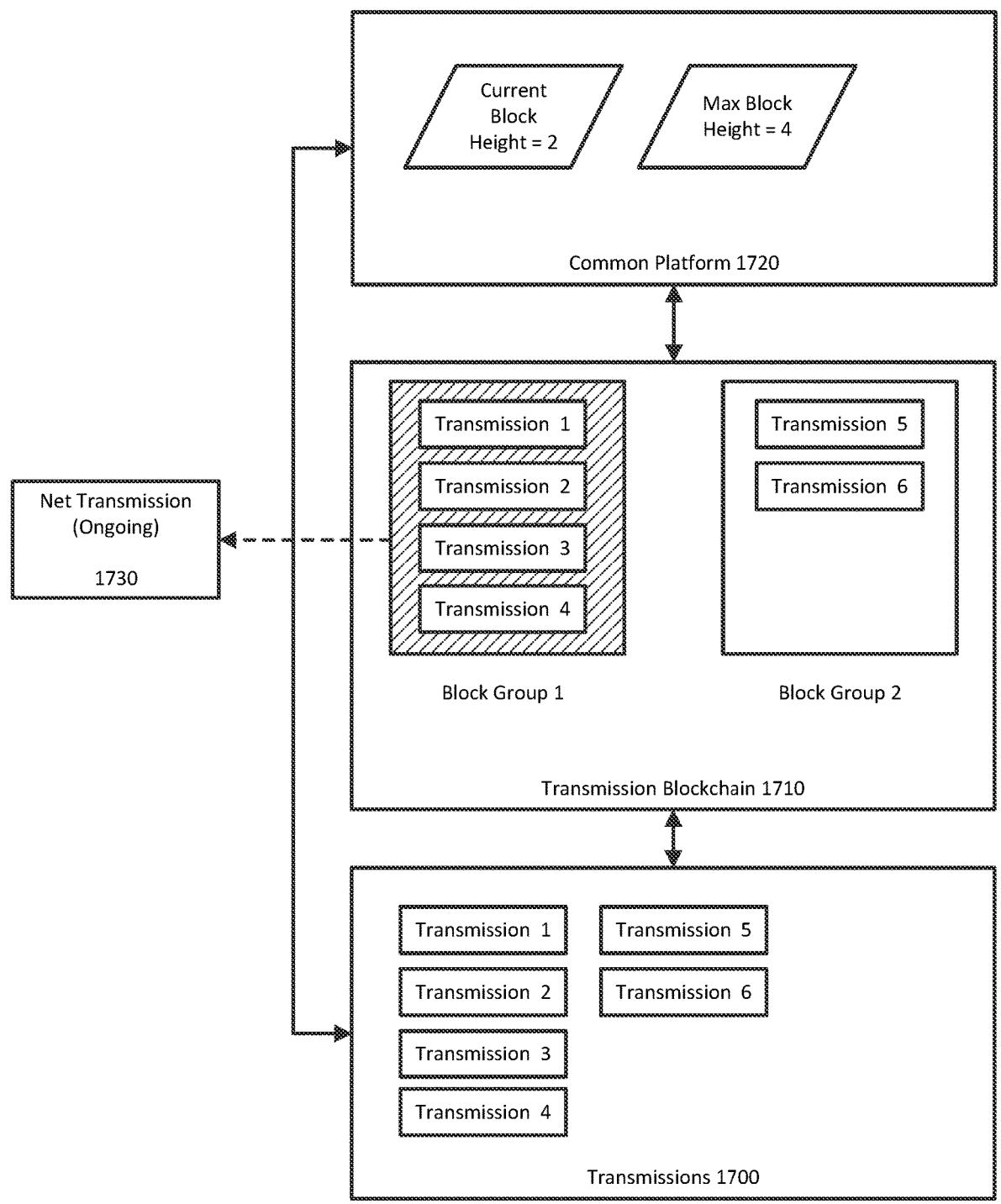

FIGS. 17A-17C illustrate an example of uninterrupted transmission processing and continuous net transmission according to an exemplary embodiment. As shown in FIG. 17A, the system can include a common platform 1720. The common platform 1720 includes memory storing a current block height and maximum block height (i.e., threshold block height). In the example of FIG. 17A, the current block height is currently at three (corresponding to the three transmissions on the transmission blockchain) and the maximum block height is four.

The system also includes a transmission blockchain 1710 storing three transmissions (transmissions 1-3) that have been processed. These three transmissions are denoted as "block group 1" but this grouping is for the purpose of explanation only and is used to refer to transmissions that have been processed but for which net transmission/net settlement has not been effected yet. Box 1700 shows the three transmissions that have been processed.

FIG. 17B illustrates the system after processing an additional transmission/transaction, transmission 4, shown in box 1700. After processing transmission 4, the transmission is added to transmission blockchain 1710. Additionally, the current block height on the common platform 1720 is incremented to a value of four. Since the current block height of four meets the maximum block height of four, a net transmission 1730 is initiated to settle the transmissions in the transmission blockchain 1710.

FIG. 17C illustrates the system after processing two additional transmissions/transactions, transmission 5 and transmission 6, that are received after initiation of the net transmission process 1730 but before the net transmission process 1730 has completed. As shown in FIG. 17C, transmission 5 and transmission 6 are added to the transmission blockchain 1710. These transmissions are shown within "Block Group 2" for purposes of explanation only, to distinguish them from the other transmissions for which net transmission has already been initiated. It is understood that a logical grouping of transmissions into blocks on the transmission blockchain 1710 is not required in the system. For example, the common platform 1720 can store variables or flags corresponding to the transmissions indicating whether net transmission has been initiated for those transmissions.

Referring to FIG. 17C, the current block height on common platform 1720 is reset to baseline (zero) and then updated to indicate the number of new transmissions added to the transmission blockchain 1710 since the net transmission was initiated. In this case, since two new transmissions were processed, the current block height is set to two. As shown in FIG. 17C, the processing of the new transmissions 1700, the addition of the new transmissions to the transmission blockchain 1710 and the updating of the current block height on the common platform 1720 all occur while the net transmission process 1730 is ongoing.

Although FIGS. 17A-17C show the initiation of the net transmission process in response to the current block height meeting or exceeding the threshold block height (maximum block height), it is understood that the net transmission process can be initiated based at least in part on detection of one or more conditions in a plurality of conditions, including a duration value (since a previous net transmission) exceeding a threshold duration value, the current block height meeting or exceeding a threshold block height, a net entity asset differential exceeding a threshold entity asset differential, a required transmission quantity matching or exceeding the one or more predicted required transmission quantities, and/or the at least one net entity-pair asset differential exceeding a threshold entity-pair asset differential.

In this manner, the processes described with respect to FIGS. 17A-17C allow for uninterrupted transmission processing and continuous net transmission among a plurality of clients of the distributed ledger network.

FIGS. 18A-18D illustrate another example of uninterrupted transmission processing and continuous net transmission according to an exemplary embodiment. In the example shown in FIGS. 18A-18D, net transmission can initiated based on any one of the above mentioned conditions.

Figure 18A:
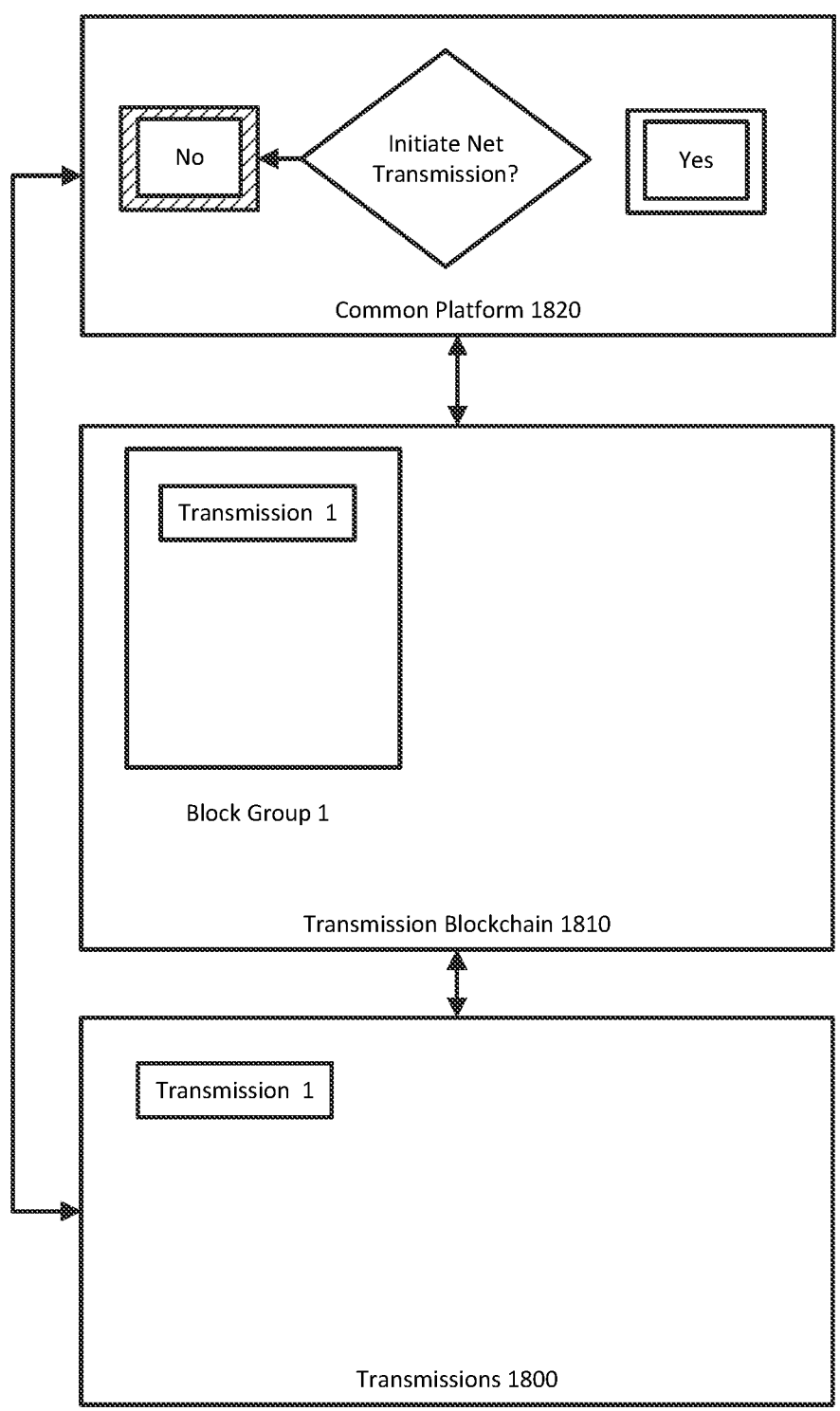
FIGS. 18A-18D illustrate another example of uninterrupted transmission processing and continuous net transmission according to an exemplary embodiment.

FIG. 18A illustrates a common platform 1820, a transmission blockchain 1810 including a single transmission (transmission 1), and a transmissions box showing all transmissions that have been processed. The transmission in the transmission blockchain has not yet been settled via the net transmission process.

As shown in FIG. 18A, the common platform 1820 tracks whether to initiate net transmission. All the variables and conditions used to make this determination are not shown in the figure, but it is understood that the common platform can store all the necessary variables and software to make this determination, such as duration, threshold duration, current block height, block height threshold, net entity asset differentials, threshold entity asset differential, required transmission quantity, predicted required transmission quantities, entity-pair asset differentials, and/or a threshold entity-pair asset differential. At the stage shown in FIG. 18A, a determination to initiate net transmission has not yet been made.

Figure 18B:
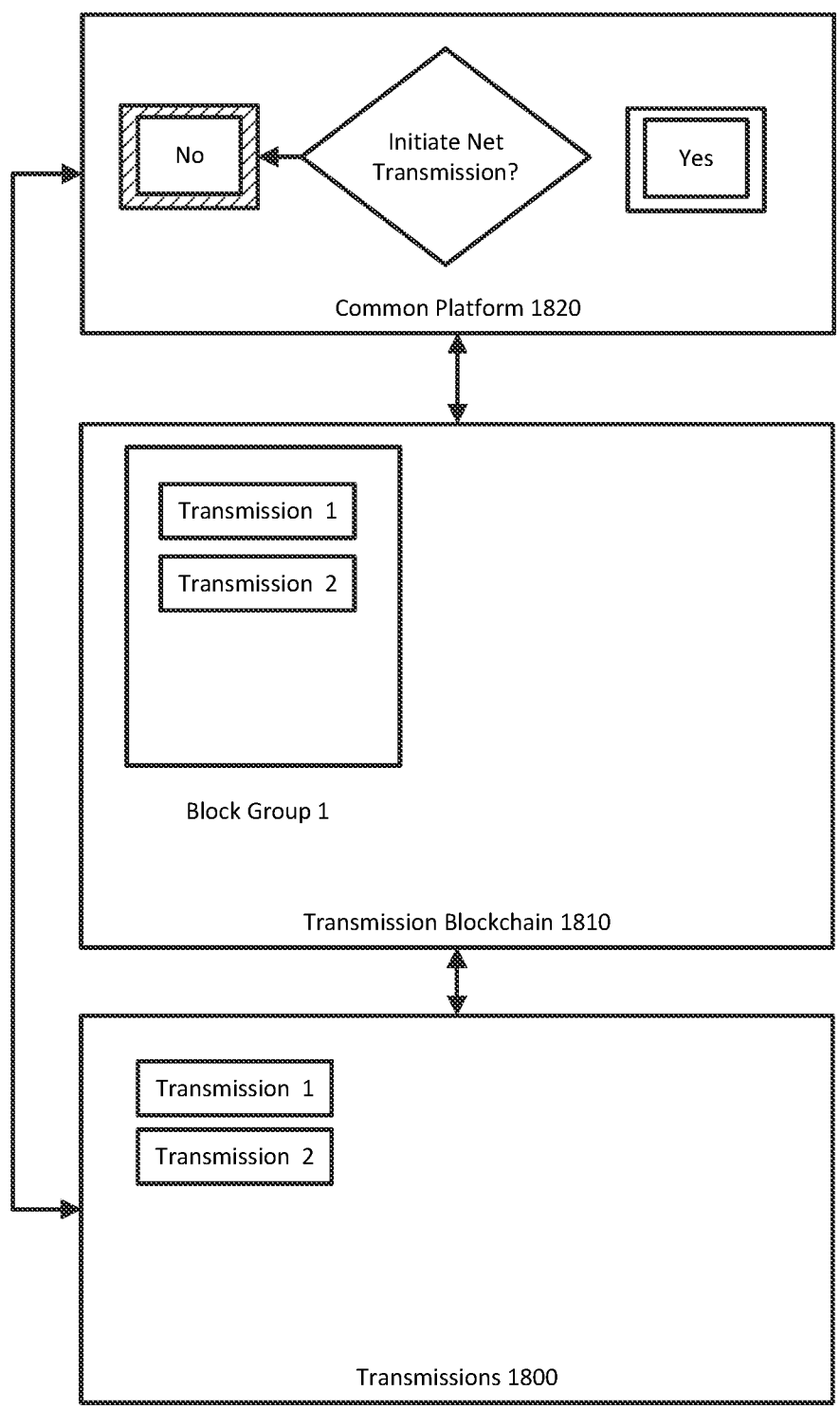

In FIG. 18B, a second transmission (transmission 2) is processed and added to the transmission blockchain 1810. The common platform evaluates all the conditions and does not initiate net transmission.

Figure 18C:
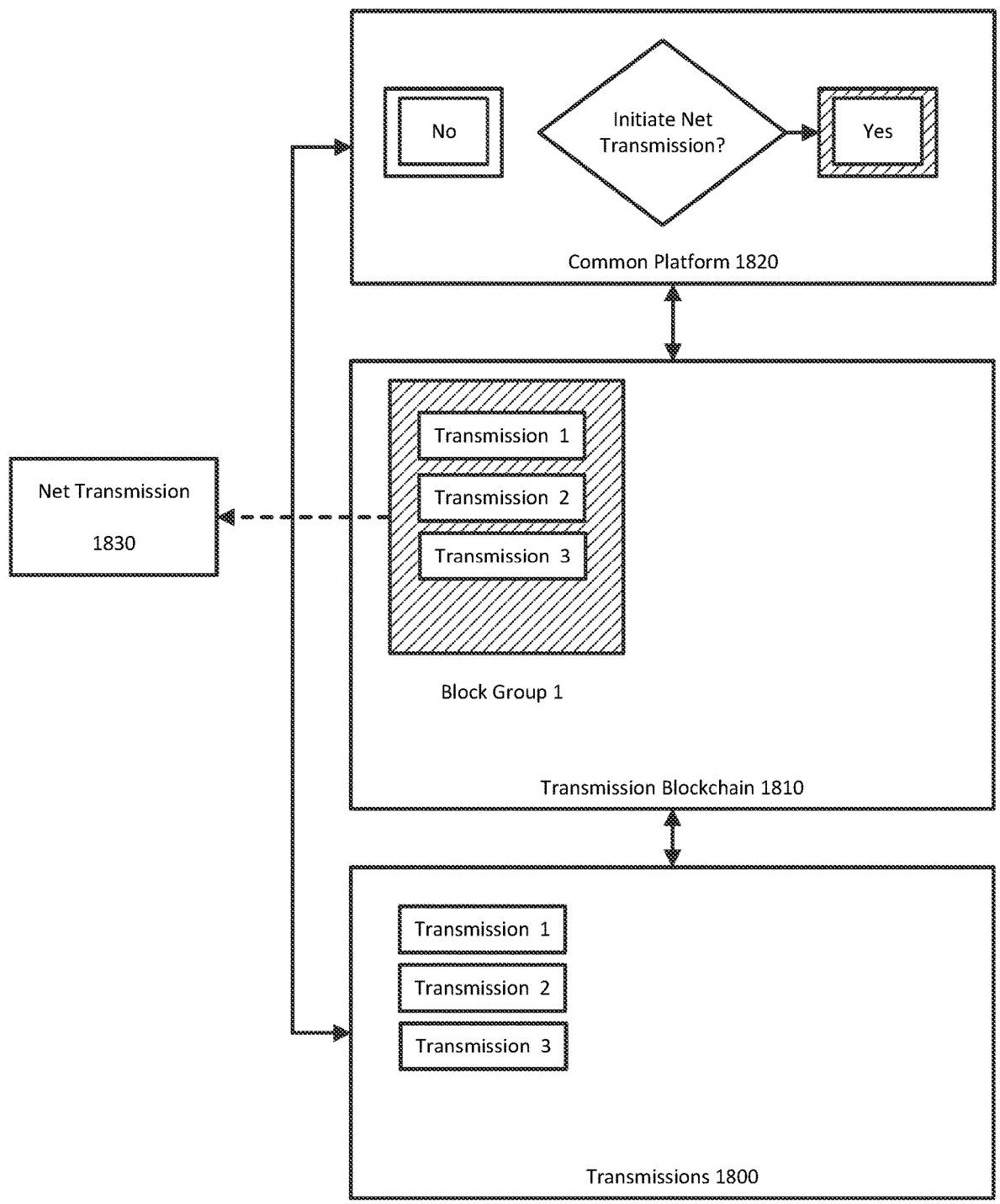

Similarly, in FIG. 18C, a third transmission (transmission 3) is processed and added to the transmission blockchain 1810. As shown in FIG. 18C, the common platform 1820 makes a determination to initiate net transmission. As discussed above, this determination can be based on one or more conditions in a plurality of conditions. For example, the common platform can determine that the duration value exceeds a duration threshold or that a net entity asset differential exceeds a threshold net entity asset differential. The net transmission 1830 is then initiated to perform the net settlement of the outstanding transmissions on the transmission block chain 1810 (transmissions 1-3).

Figure 18D:
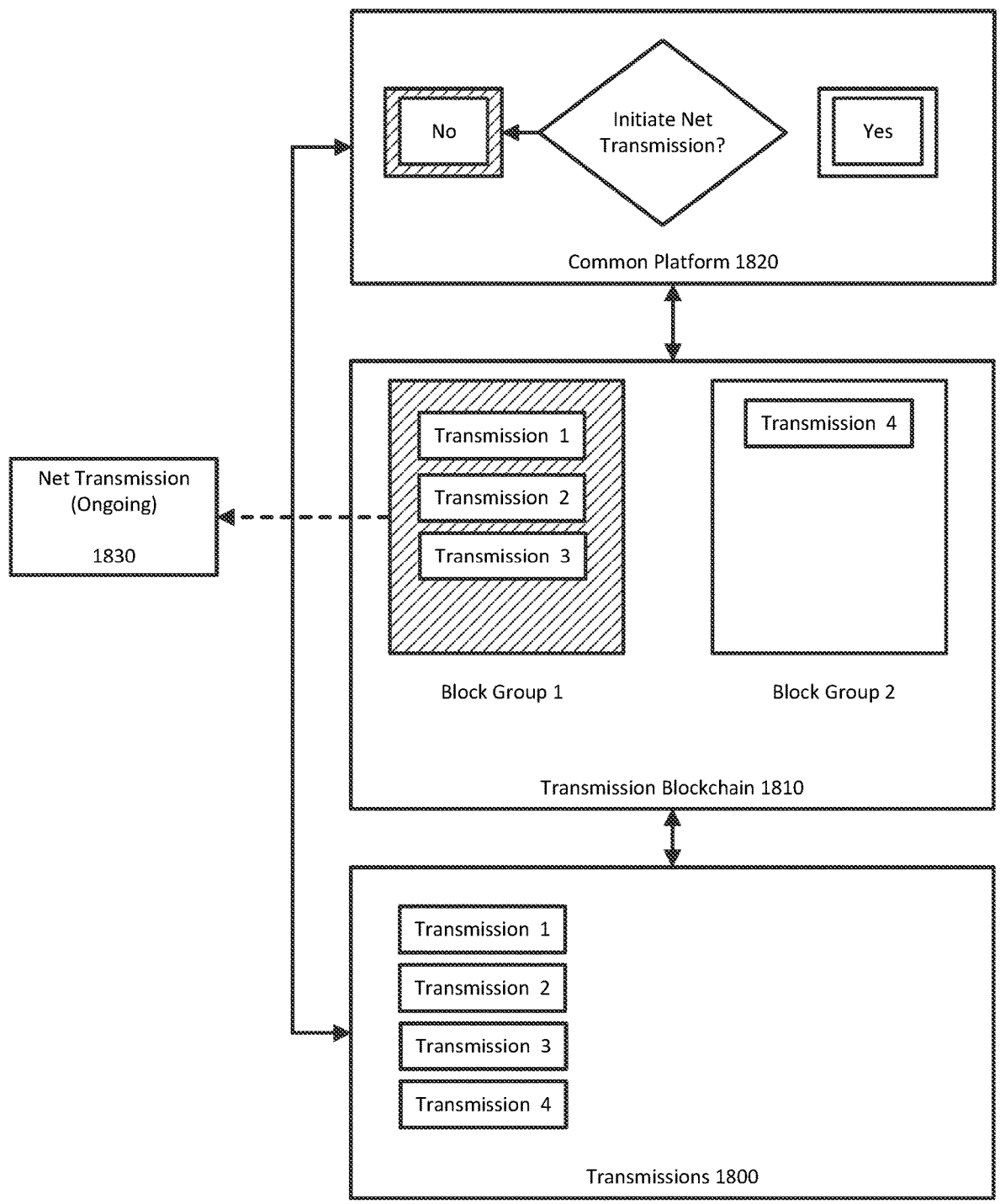

FIG. 18D illustrates processing of another transmission (transmission 4) after initiation of the net transmission process 1830 but prior to the completion of that process. This transmission is also added to the transmission blockchain 1810. It is shown in "Block Group 2" to distinguish it from the transmissions for which net transmission was already initiated, but it is understood that the block group designation is for purposes of explanation only and that the transmissions are not required to be logically grouped on the transmission blockchain.

As shown in FIG. 18D, the common platform assesses the relevant conditions and determines whether to initiate another net transmission, resulting in a determination not to initiate another net transmission. However, in certain situations, the common platform can determine that another net transmission is required even when a previous net transmission is in process, resulting in two net transmission processes being executed at least partially in parallel.

As further shown in FIG. 18D, the processing of the new transmissions 1800, the addition of the new transmissions to the transmission blockchain 1810 and the assessment of whether to initiate another net transmission on the common platform 1820 all occur while the net transmission process 1830 is ongoing. In this manner, the processes described with respect to FIGS. 18A-18D allow for uninterrupted transmission processing and continuous net transmission among a plurality of clients of the distributed ledger network.

Figure 19:
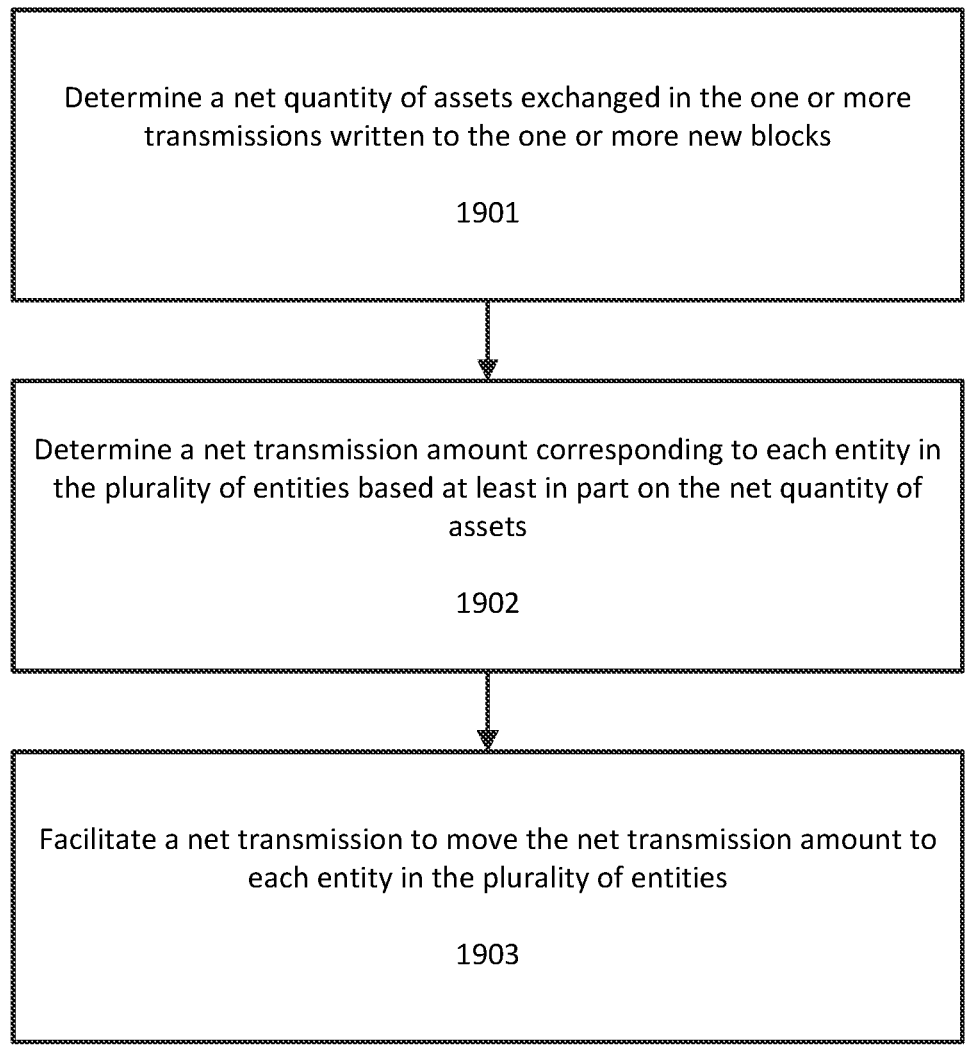
FIG. 19 illustrates a flowchart for facilitating the net transmission process according to an exemplary embodiment.

FIG. 19 illustrates a flowchart for facilitating the net transmission process according to an exemplary embodiment. The steps shown in FIG. 19 can be performed by a controller of the distributed ledger network.

At step 1901 a net quantity of assets exchanged in the one or more transmissions written to the one or more new blocks are determined. At step 1902 a net transmission amount corresponding to each entity in the plurality of entities is determined based at least in part on the net quantity of assets. At step 1903 a net transmission to move the net transmission amount to each entity in the plurality of entities is facilitated. An example of this process is described above with respect to FIG. 8.

Figure 20:
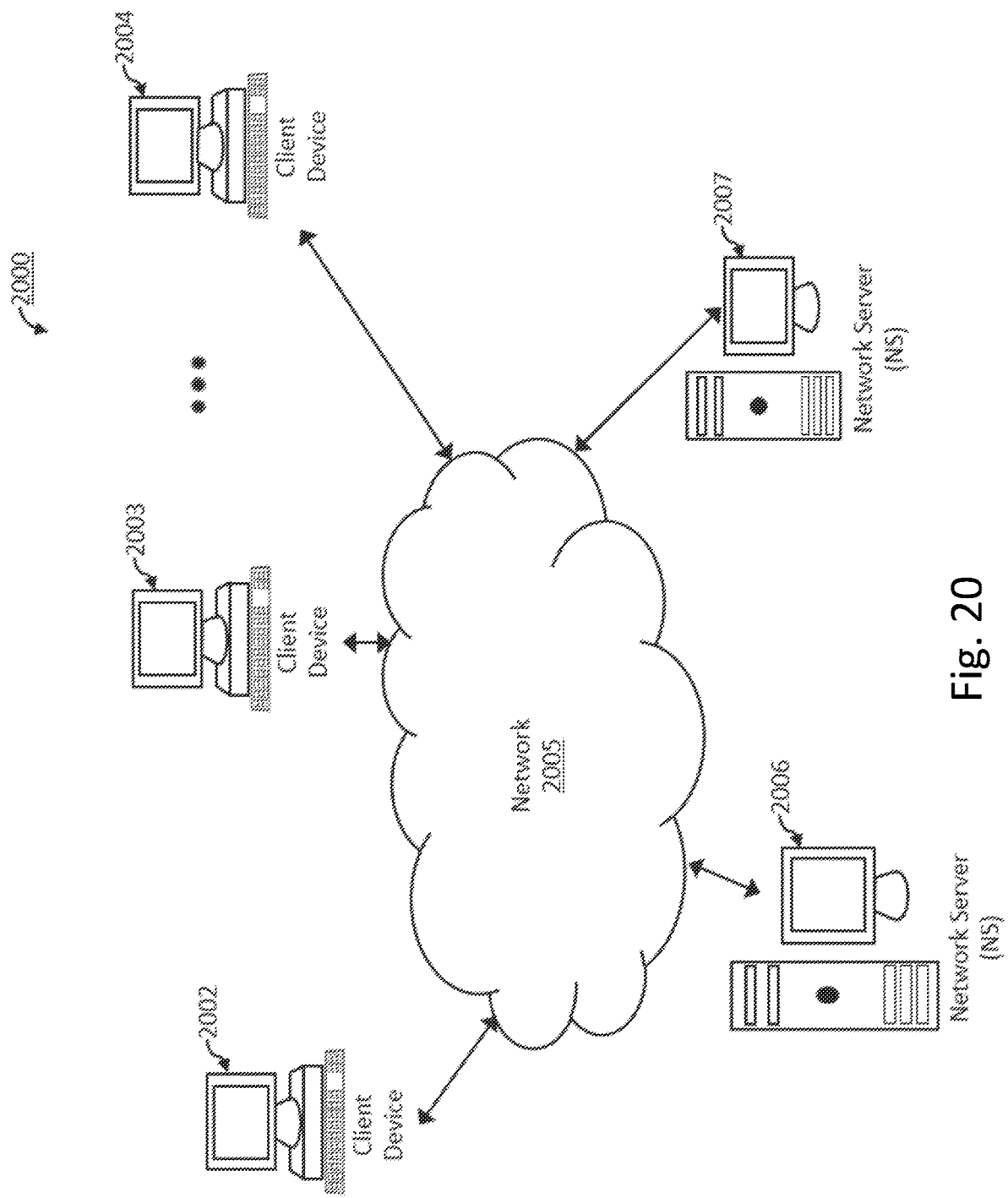
FIG. 20 depicts a block diagram of an exemplary computer-based system and platform for distributed segregated data structures for network-wide net transmissions of assets to satisfy aggregates of tokenized asset transfers in accordance with one or more embodiments of the present disclosure.

FIG. 20 depicts a block diagram of an exemplary computer-based system and platform 2000 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 2000 may be configured to manage a large number of members and concurrent transactions, as detailed herein. In some embodiments, the exemplary computer-based system and platform 2000 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 20, member computing device 2002, member computing device 2003 through member computing device 2004 (e.g., clients) of the exemplary computer-based system and platform 2000 may include virtually any computing device capable of receiving and sending a message over a network (e.g., cloud network), such as network 2005, to and from another computing device, such as servers 2006 and 2007, each other, and the like. In some embodiments, the member devices 2002-2004 may be personal computers, multiprocessor systems, microprocessor-based or programmable consumer electronics, network PCs, and the like. In some embodiments, one or more member devices within member devices 2002-2004 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more member devices within member devices 2002-2004 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 2002-2004 may include may run one or more applications, such as Internet browsers, mobile applications, voice calls, video games, videoconferencing, and email, among others. In some embodiments, one or more member devices within member devices 2002-2004 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 2002-2004 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 2002-2004 may be specifically programmed include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the exemplary network 2005 may provide network access, data transport and/or other services to any computing device coupled to it. In some embodiments, the exemplary network 2005 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 2005 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 2005 may include and implement, as an alternative or in conjunction with one or more of the above, a WiMAX architecture defined by the WiMAX forum. In some embodiments and, optionally, in combination of any embodiment described above or below, the exemplary network 2005 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 2005 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 2005 may also include mass storage, such as network attached storage (NAS), a storage area network (SAN), a content delivery network (CDN) or other forms of computer or machine-readable media.

In some embodiments, the exemplary server 2006 or the exemplary server 2007 may be a web server (or a series of servers) running a network operating system, examples of which may include but are not limited to Apache on Linux or Microsoft IIS (Internet Information Services). In some embodiments, the exemplary server 2006 or the exemplary server 2007 may be used for and/or provide cloud and/or network computing. Although not shown in FIG. 20, in some embodiments, the exemplary server 2006 or the exemplary server 2007 may have connections to external systems like email, SMS messaging, text messaging, ad content providers, etc. Any of the features of the exemplary server 2006 may be also implemented in the exemplary server 2007 and vice versa.

In some embodiments, one or more of the exemplary servers 2006 and 2007 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/entity-related services servers, travel services servers, or any similarly suitable service-base servers for users of the member computing devices 2001-2004.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 21:
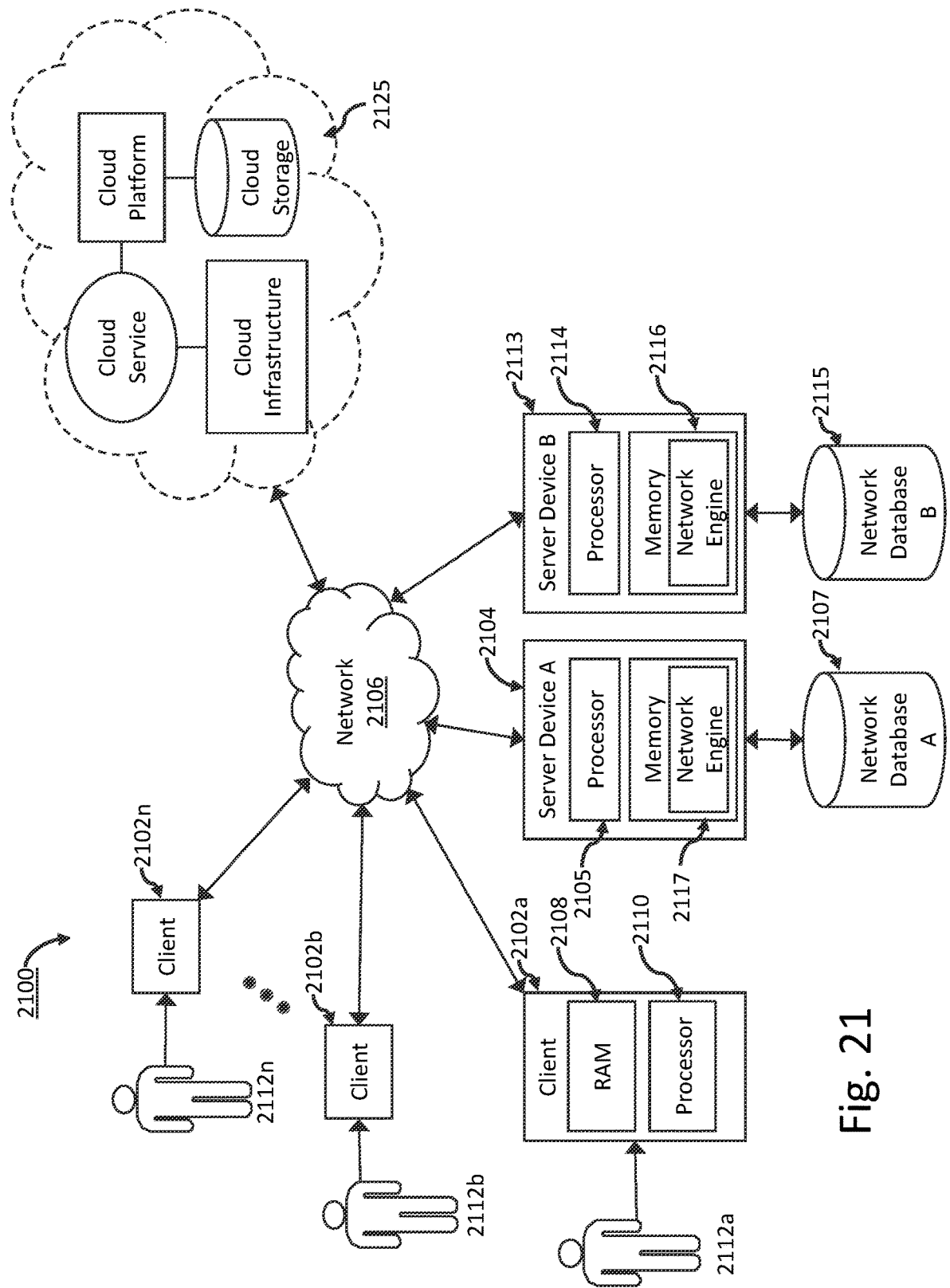
FIG. 21 depicts a block diagram of another exemplary computer-based system and platform for distributed segregated data structures for network-wide net transmissions of assets to satisfy aggregates of tokenized asset transfers in accordance with one or more embodiments of the present disclosure.

FIG. 21 depicts a block diagram of another exemplary computer-based system and platform 2100 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 2102a, member computing device 2102b through member computing device 2102n shown each at least includes a computer-readable medium, such as a random-access memory (RAM) 2108 coupled to a processor 2110 or FLASH memory. In some embodiments, the processor 2110 may execute computer-executable program instructions stored in memory 2108. In some embodiments, the processor 2110 may include a microprocessor, an ASIC, and/or a state machine. In some embodiments, the processor 2110 may include, or may be in communication with, media, for example computer-readable media, which stores instructions that, when executed by the processor 2110, may cause the processor 2110 to perform one or more steps described herein. In some embodiments, examples of computer-readable media may include, but are not limited to, an electronic, optical, magnetic, or other storage or transmission device capable of providing a processor, such as the processor 2110 of client 2102a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 2102a through 2102n may also comprise a number of external or internal devices such as a mouse, a CD-ROM, DVD, a physical or virtual keyboard, a display, or other input or output devices. In some embodiments, examples of member computing devices 2102a through 2102n (e.g., clients) may be any type of processor-based platforms that are connected to a network 2106 such as, without limitation, personal computers, digital assistants, personal digital assistants, smart phones, pagers, digital tablets, laptop computers, Internet appliances, and other processor-based devices. In some embodiments, member computing devices 2102a through 2102n may be specifically programmed with one or more application programs in accordance with one or more principles/methodologies detailed herein. In some embodiments, member computing devices 2102a through 2102n may operate on any operating system capable of supporting a browser or browser-enabled application, such as Microsoft™, Windows™, and/or Linux. In some embodiments, member computing devices 2102a through 2102n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 2102a through 2102n, user 2112a, user 2112b through user 2112n, may communicate over the exemplary network 2106 with each other and/or with other systems and/or devices coupled to the network 2106. As shown in FIG. 21, exemplary server devices 2104 and 2113 may include processor 2105 and processor 2114, respectively, as well as memory 2117 and memory 2116, respectively. In some embodiments, the server devices 2104 and 2113 may be also coupled to the network 2106. In some embodiments, one or more member computing devices 2102a through 2102n may be mobile clients.

In some embodiments, at least one database of exemplary databases 2107 and 2115 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 22:
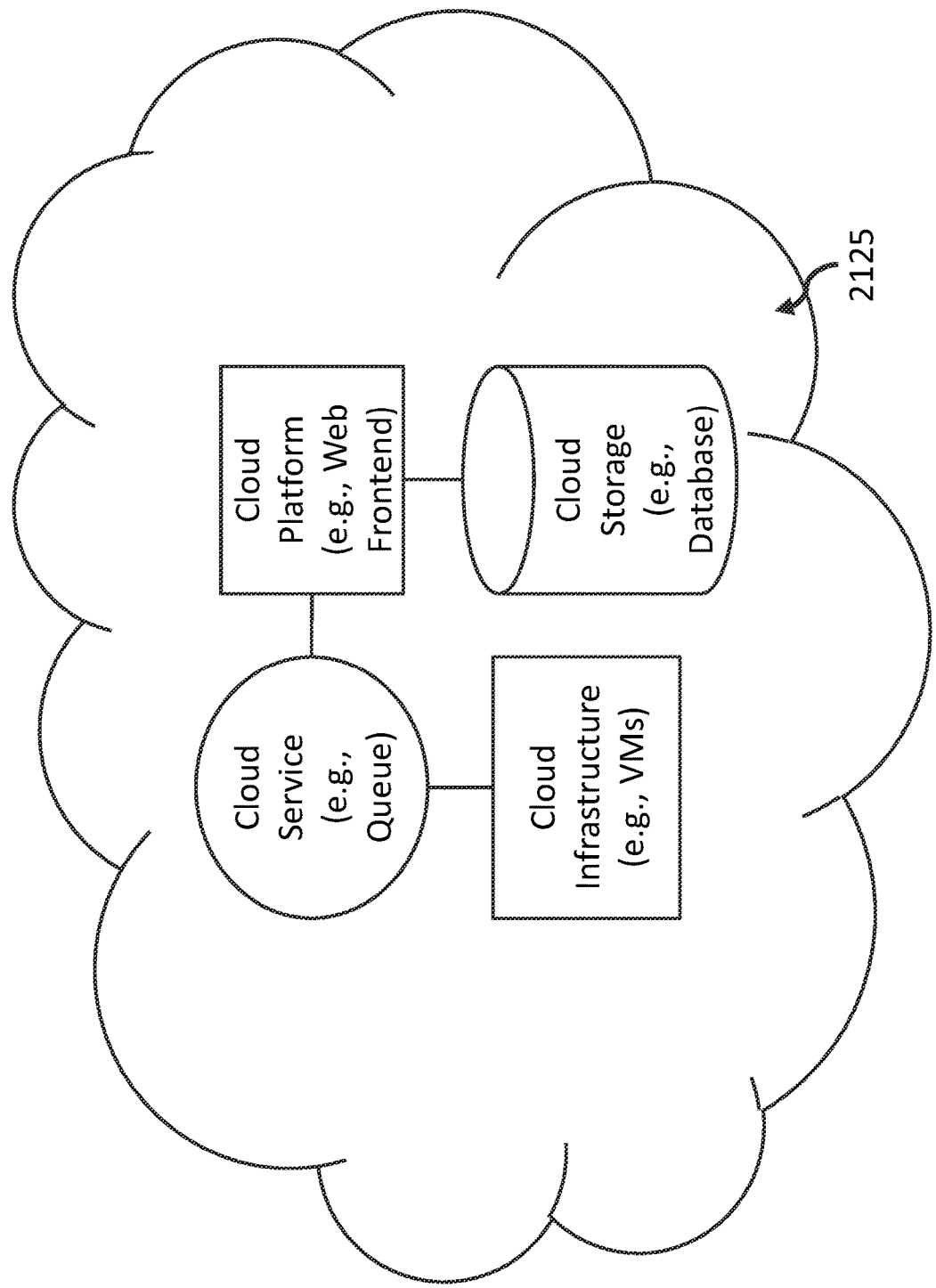
FIG. 22 depicts illustrative schematics of an exemplary implementation of the cloud computing/architecture(s) in which embodiments of a system for distributed segregated data structures for network-wide net transmissions of assets to satisfy aggregates of tokenized asset transfers may be specifically configured to operate in accordance with some embodiments of the present disclosure.
Figure 23:
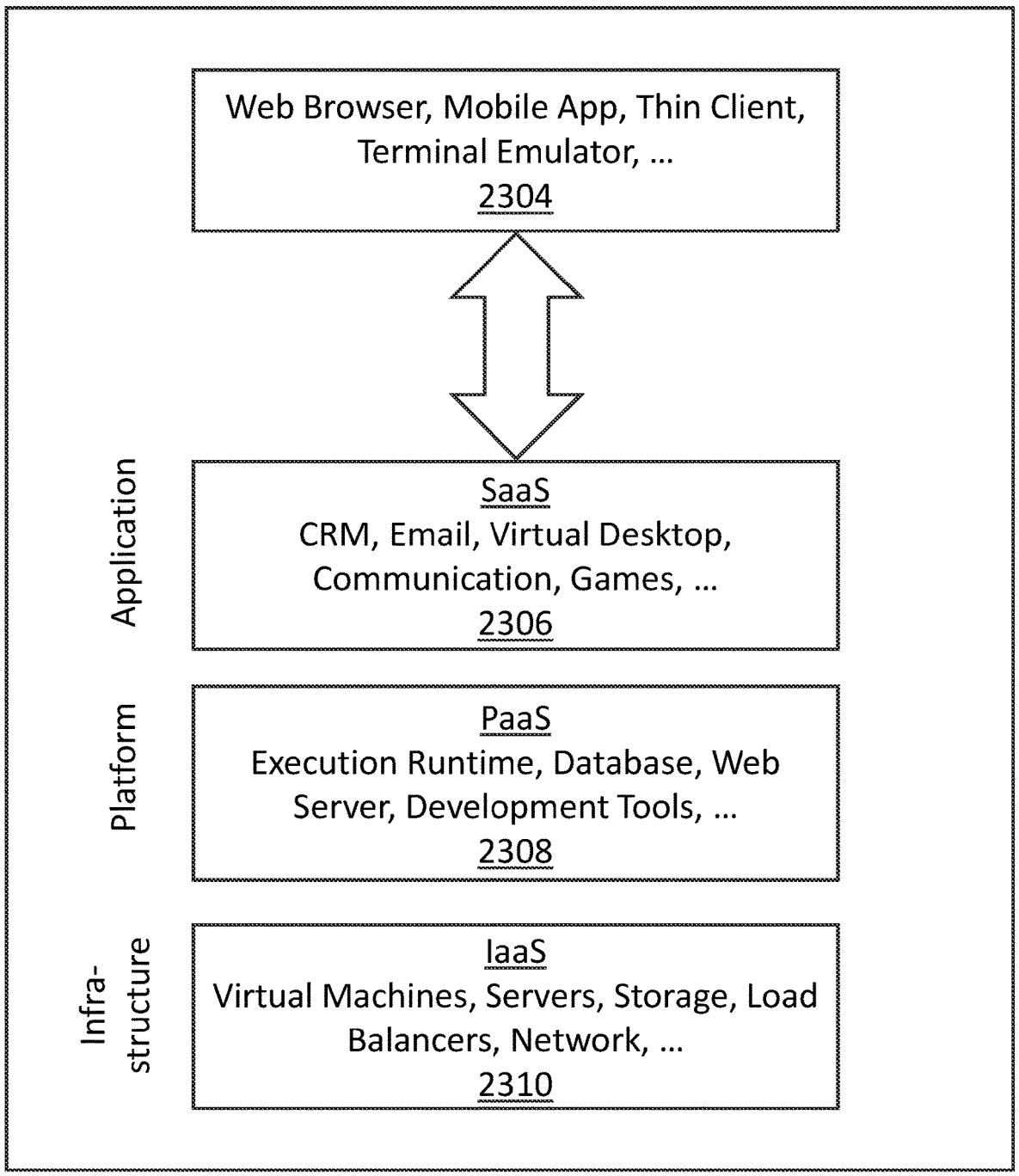
FIG. 23 depicts illustrative schematics of another exemplary implementation of the cloud computing/architecture(s) in which embodiments of a system for distributed segregated data structures for network-wide net transmissions of assets to satisfy aggregates of tokenized asset transfers may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 2125 such as, but not limiting to: infrastructure a service (IaaS) 2310, platform as a service (PaaS) 2308, and/or software as a service (SaaS) 2306 using a web browser, mobile app, thin client, terminal emulator or other endpoint 2304. FIGS. 22 and 23 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method executed by one or more computing devices of a controller of a distributed ledger network for initiating a net transmission among a plurality of clients of the distributed ledger network, the method comprising:
    receiving, by the controller, a plurality of instructions to perform a plurality of transmissions, each transmission comprising instruction parameters for movement of a first quantity of first entity-specific tokens corresponding to a first entity that is a client of the distributed ledger network to a second quantity of second entity-specific tokens corresponding to a second entity that is a client of the distributed ledger network, wherein the first entity-specific tokens are stored on a first entity-specific blockchain and the second entity-specific tokens are stored on a second entity-specific blockchain;
    writing, by the controller, one or more transmissions in the plurality of transmissions to one or more new blocks on a transmission blockchain of the distributed ledger network, each new block storing a subset of the plurality of transmissions;
    storing, by the controller, a net entity asset differential between each entity in the plurality of entities that are clients of the distributed ledger network and the distributed ledger network, each net entity asset differential being determined based at least in part on quantities of tokens transferred between a corresponding entity and the plurality of entities during the one or more transmissions;
    storing, by the controller, a current block height corresponding to a quantity of new blocks added to the transmission blockchain since a previous net transmission process;
    storing, by the controller, a duration value corresponding to a time elapsed since the previous net transmission process;
    determining, by the controller, a required transmission quantity indicating a quantity of transmissions necessary to complete a net transmission process between the plurality of entities that are clients of the distributed ledger network;
    determining, by the controller, one or more predicted required transmission quantities corresponding to one or more time intervals, each predicted required transmission quantity indicating a predicted quantity of transmissions necessary to complete a net transmission process between the plurality of entities that are clients of the distributed ledger network after a corresponding time interval; and
    initiating, by the controller, a net transmission process between a plurality of entities that are clients of the distributed ledger network based at least in part on detection of one or more conditions in a plurality of conditions, the plurality of conditions comprising:
        the duration value exceeding a threshold duration value;
        the current block height meeting or exceeding a threshold block height;
        the net entity asset differential exceeding a threshold entity asset differential; and
        the required transmission quantity matching or exceeding the one or more predicted required transmission quantities.

2. The method of claim 1, wherein initiating a net transmission process between a plurality of entities that are clients of the distributed ledger network based at least in part on detection of one or more conditions in a plurality of conditions comprises:
    initiating the net transmission process between the plurality of entities that are clients of the distributed ledger network based at least in part on a determination that at least one net entity asset differential exceeds the threshold entity asset differential.

3. The method of claim 1, wherein determining one or more predicted transfer quotients corresponding to one or more time intervals comprises:
    determining a plurality of predicted required transmission quantities corresponding to a plurality of time intervals.

4. The method of claim 3, wherein initiating a net transmission process between a plurality of entities that are clients of the distributed ledger network based at least in part on detection of one or more conditions in a plurality of conditions comprises:
    determining whether that the plurality of predicted required transmission quantities are less than the required transmission quantity; and
    initiating the net transmission process between the plurality of entities that are clients of the distributed ledger network based at least in part on a determination that the plurality of predicted required transmission quantities are not less than the required transmission quantity.

5. The method of claim 3, wherein initiating a net transmission process between a plurality of entities that are clients of the distributed ledger network based at least in part on detection of one or more conditions in a plurality of conditions comprises:
    determining whether that the plurality of predicted required transmission quantities are less than the required transmission quantity;
    initiating a delay of the net transmission process for a variable time period based at least in part on a determination that at least one predicted required transmission quantity in the plurality of predicted required transmission quantities is less than the required transmission quantity; and initiating the net transmission process between the plurality of entities that are clients of the distributed ledger network after the delay.

6. The method of claim 1, further comprising:
storing, by the controller, at least one net entity-pair asset differential between at least one pair of entities in a plurality of entities that are clients of the distributed ledger network, the at least one net entity-pair asset differential being determined based at least in part on quantities of tokens transferred between at least two or more entities in the plurality of entities during the one or more transmissions;
wherein the plurality of conditions further comprise the at least one net entity-pair asset differential exceeding a threshold entity-pair asset differential.

7. The method of claim 6, wherein storing at least one net entity-pair asset differential between at least one pair of entities in a plurality of entities that are clients of the distributed ledger network comprises:
storing a plurality of net entity-pair asset differentials between all pairs of entities in the plurality of entities that are clients of the distributed ledger network.

8. The method of claim 6, wherein initiating a net transmission process between a plurality of entities that are clients of the distributed ledger network based at least in part on detection of one or more conditions in a plurality of conditions comprises:
initiating the net transmission process between the plurality of entities that are clients of the distributed ledger network based at least in part on a determination that at least one net entity-pair asset differential in the plurality of net entity-pair asset differentials exceeds a threshold entity-pair asset differential.

9. A controller of a distributed ledger network for initiating a net transmission among a plurality of clients of the distributed ledger network, the controller comprising:
one or more processors; and
one or more memories operatively coupled to at least one of the one or more processors and having instructions stored thereon that, when executed by at least one of the one or more processors, cause at least one of the one or more processors to:
receive a plurality of instructions to perform a plurality of transmissions, each transmission comprising instruction parameters for movement of a first quantity of first entity-specific tokens corresponding to a first entity that is a client of the distributed ledger network to a second quantity of second entity-specific tokens corresponding to a second entity that is a client of the distributed ledger network, wherein the first entity-specific tokens are stored on a first entity-specific blockchain and the second entity-specific tokens are stored on a second entity-specific blockchain;
write one or more transmissions in the plurality of transmissions to one or more new blocks on a transmission blockchain of the distributed ledger network, each new block storing a subset of the plurality of transmissions;
store a net entity asset differential between each entity in the plurality of entities that are clients of the distributed ledger network and the distributed ledger network, each net entity asset differential being determined based at least in part on quantities of tokens transferred between a corresponding entity and the plurality of entities during the one or more transmissions;
store a current block height corresponding to a quantity of new blocks added to the transmission blockchain since a previous net transmission process;
store a duration value corresponding to a time elapsed since the previous net transmission process;
determine a required transmission quantity indicating a quantity of transmissions necessary to complete a net transmission process between the plurality of entities that are clients of the distributed ledger network;
determine one or more predicted required transmission quantities corresponding to one or more time intervals, each predicted required transmission quantity indicating a predicted quantity of transmissions necessary to complete a net transmission process between the plurality of entities that are clients of the distributed ledger network after a corresponding time interval; and
initiate a net transmission process between a plurality of entities that are clients of the distributed ledger network based at least in part on detection of one or more conditions in a plurality of conditions, the plurality of conditions comprising:
the duration value exceeding a threshold duration value;
the current block height meeting or exceeding a threshold block height;
the net entity asset differential exceeding a threshold entity asset differential; and
the required transmission quantity matching or exceeding the one or more predicted required transmission quantities.

10. The controller of claim 9, wherein the instructions that, when executed by at least one of the one or more processors, cause at least one of the one or more processors to initiate a net transmission process between a plurality of entities that are clients of the distributed ledger network based at least in part on detection of one or more conditions in a plurality of conditions further cause at least one of the one or more processors to:
initiate the net transmission process between the plurality of entities that are clients of the distributed ledger network based at least in part on a determination that at least one net entity asset differential exceeds the threshold entity asset differential.

11. The controller of claim 9, wherein the instructions that, when executed by at least one of the one or more processors, cause at least one of the one or more processors to determine one or more predicted transfer quotients corresponding to one or more time intervals further cause at least one of the one or more processors to:
determine a plurality of predicted required transmission quantities corresponding to a plurality of time intervals.

12. The controller of claim 11, wherein the instructions that, when executed by at least one of the one or more processors, cause at least one of the one or more processors to initiate a net transmission process between a plurality of entities that are clients of the distributed ledger network based at least in part on detection of one or more conditions in a plurality of conditions further cause at least one of the one or more processors to:
determine whether that the plurality of predicted required transmission quantities are less than the required transmission quantity; and initiate the net transmission process between the plurality of entities that are clients of the distributed ledger network based at least in part on a determination that the plurality of predicted required transmission quantities are not less than the required transmission quantity.

13. The controller of claim 11, wherein the instructions that, when executed by at least one of the one or more processors, cause at least one of the one or more processors to initiate a net transmission process between a plurality of entities that are clients of the distributed ledger network based at least in part on detection of one or more conditions in a plurality of conditions further cause at least one of the one or more processors to:
  determine whether that the plurality of predicted required transmission quantities are less than the required transmission quantity;
  initiate a delay of the net transmission process for a variable time period based at least in part on a determination that at least one predicted required transmission quantity in the plurality of predicted required transmission quantities is less than the required transmission quantity; and
  initiate the net transmission process between the plurality of entities that are clients of the distributed ledger network after the delay.

14. The controller of claim 9, wherein at least one of the one or more memories has further instructions stored thereon that, when executed by at least one of the one or more processors, cause at least one of the one or more processors to:
  store, by the controller, at least one net entity-pair asset differential between at least one pair of entities in a plurality of entities that are clients of the distributed ledger network, the at least one net entity-pair asset differential being determined based at least in part on quantities of tokens transferred between at least two or more entities in the plurality of entities during the one or more transmissions;
  wherein the plurality of conditions further comprise the at least one net entity-pair asset differential exceeding a threshold entity-pair asset differential.

15. The controller of claim 14, wherein the instructions that, when executed by at least one of the one or more processors, cause at least one of the one or more processors to store at least one net entity-pair asset differential between at least one pair of entities in a plurality of entities that are clients of the distributed ledger network further cause at least one of the one or more processors to:
  store a plurality of net entity-pair asset differentials between all pairs of entities in the plurality of entities that are clients of the distributed ledger network.

16. The controller of claim 14, wherein the instructions that, when executed by at least one of the one or more processors, cause at least one of the one or more processors to initiate a net transmission process between a plurality of entities that are clients of the distributed ledger network based at least in part on detection of one or more conditions in a plurality of conditions further cause at least one of the one or more processors to:
  initiate the net transmission process between the plurality of entities that are clients of the distributed ledger network based at least in part on a determination that at least one net entity-pair asset differential in the plurality of net entity-pair asset differentials exceeds a threshold entity-pair asset differential.

17. At least one non-transitory computer-readable medium storing computer-readable instructions for initiating a net transmission among a plurality of clients of a distributed ledger network that, when executed by one or more computing devices of a controller of the distributed ledger network, cause the controller to:
  receive a plurality of instructions to perform a plurality of transmissions, each transmission comprising instruction parameters for movement of a first quantity of first entity-specific tokens corresponding to a first entity that is a client of the distributed ledger network to a second quantity of second entity-specific tokens corresponding to a second entity that is a client of the distributed ledger network, wherein the first entity-specific tokens are stored on a first entity-specific blockchain and the second entity-specific tokens are stored on a second entity-specific blockchain;
  write one or more transmissions in the plurality of transmissions to one or more new blocks on a transmission blockchain of the distributed ledger network, each new block storing a subset of the plurality of transmissions;
  store a net entity asset differential between each entity in the plurality of entities that are clients of the distributed ledger network and the distributed ledger network, each net entity asset differential being determined based at least in part on quantities of tokens transferred between a corresponding entity and the plurality of entities during the one or more transmissions;
  store a current block height corresponding to a quantity of new blocks added to the transmission blockchain since a previous net transmission process;
  store a duration value corresponding to a time elapsed since the previous net transmission process;
  determine a required transmission quantity indicating a quantity of transmissions necessary to complete a net transmission process between the plurality of entities that are clients of the distributed ledger network;
  determine one or more predicted required transmission quantities corresponding to one or more time intervals, each predicted required transmission quantity indicating a predicted quantity of transmissions necessary to complete a net transmission process between the plurality of entities that are clients of the distributed ledger network after a corresponding time interval; and
  initiate a net transmission process between a plurality of entities that are clients of the distributed ledger network based at least in part on detection of one or more conditions in a plurality of conditions, the plurality of conditions comprising:
    the duration value exceeding a threshold duration value;
    the current block height meeting or exceeding a threshold block height;
    the net entity asset differential exceeding a threshold entity asset differential; and
    the required transmission quantity matching or exceeding the one or more predicted required transmission quantities.

18. The at least one non-transitory computer-readable medium of claim 17, wherein the instructions that, when executed by the controller, cause the controller to initiate a net transmission process between a plurality of entities that are clients of the distributed ledger network based at least in part on detection of one or more conditions in a plurality of conditions further cause the controller to:
  initiate the net transmission process between the plurality of entities that are clients of the distributed ledger network based at least in part on a determination that at least one net entity asset differential exceeds the threshold entity asset differential.

19. The at least one non-transitory computer-readable medium of claim 17, wherein the instructions that, when executed by the controller, cause the controller to determine one or more predicted transfer quotients corresponding to one or more time intervals further cause the controller to:
determine a plurality of predicted required transmission quantities corresponding to a plurality of time intervals.

20. The at least one non-transitory computer-readable medium of claim 19, wherein the instructions that, when executed by the controller, cause the controller to initiate a net transmission process between a plurality of entities that are clients of the distributed ledger network based at least in part on detection of one or more conditions in a plurality of conditions further cause the controller to:
determine whether that the plurality of predicted required transmission quantities are less than the required transmission quantity; and
initiate the net transmission process between the plurality of entities that are clients of the distributed ledger network based at least in part on a determination that the plurality of predicted required transmission quantities are not less than the required transmission quantity.

21. The at least one non-transitory computer-readable medium of claim 19, wherein the instructions that, when executed by the controller, cause the controller to initiate a net transmission process between a plurality of entities that are clients of the distributed ledger network based at least in part on detection of one or more conditions in a plurality of conditions further cause the controller to:
determine whether that the plurality of predicted required transmission quantities are less than the required transmission quantity;
initiate a delay of the net transmission process for a variable time period based at least in part on a determination that at least one predicted required transmission quantity in the plurality of predicted required transmission quantities is less than the required transmission quantity; and
initiate the net transmission process between the plurality of entities that are clients of the distributed ledger network after the delay.

22. The at least one non-transitory computer-readable medium of claim 17, further storing computer-readable instructions that, when executed by the controller, cause the controller to:
store at least one net entity-pair asset differential between at least one pair of entities in a plurality of entities that are clients of the distributed ledger network, the at least one net entity-pair asset differential being determined based at least in part on quantities of tokens transferred between at least two or more entities in the plurality of entities during the one or more transmissions;
wherein the plurality of conditions further comprise the at least one net entity-pair asset differential exceeding a threshold entity-pair asset differential.

23. The at least one non-transitory computer-readable medium of claim 22, wherein the instructions that, when executed by the controller, cause the controller to store at least one net entity-pair asset differential between at least one pair of entities in a plurality of entities that are clients of the distributed ledger network further cause the controller to:
store a plurality of net entity-pair asset differentials between all pairs of entities in the plurality of entities that are clients of the distributed ledger network.

24. The at least one non-transitory computer-readable medium of claim 22, wherein the instructions that, when executed by the controller, cause the controller to initiate a net transmission process between a plurality of entities that are clients of the distributed ledger network based at least in part on detection of one or more conditions in a plurality of conditions further cause the controller to:
initiate the net transmission process between the plurality of entities that are clients of the distributed ledger network based at least in part on a determination that at least one net entity-pair asset differential in the plurality of net entity-pair asset differentials exceeds a threshold entity-pair asset differential.

* * * * *